United States Patent
Li

(10) Patent No.: US 11,947,524 B2
(45) Date of Patent: Apr. 2, 2024

(54) TRANSACTION PROCESSING METHOD AND APPARATUS, COMPUTER DEVICE, AND STORAGE MEDIUM

(71) Applicant: Tencent Technology (Shenzhen) Company Limited, Guangdong (CN)

(72) Inventor: Haixiang Li, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 131 days.

(21) Appl. No.: 17/721,092

(22) Filed: Apr. 14, 2022

(65) Prior Publication Data
US 2022/0245133 A1    Aug. 4, 2022

Related U.S. Application Data

(63) Continuation of application No. PCT/CN2021/093167, filed on May 11, 2021.

(30) Foreign Application Priority Data

May 20, 2020 (CN) .......................... 202010431659.8

(51) Int. Cl.
 *G06F 16/23* (2019.01)
(52) U.S. Cl.
 CPC ................. *G06F 16/2379* (2019.01)
(58) Field of Classification Search
 CPC .................................. G06F 16/2379
 See application file for complete search history.

(56) References Cited

U.S. PATENT DOCUMENTS

| 2006/0173885 A1* | 8/2006 | Moir ................ G06F 9/466 |
| 2010/0228929 A1* | 9/2010 | Detlefs ............. G06F 9/467 |
| | | 711/E12.002 |

(Continued)

FOREIGN PATENT DOCUMENTS

| CA | 2285019 A1 * | 7/1999 | ......... G06F 16/2343 |
| CN | 102354289 A | 2/2012 | |

(Continued)

OTHER PUBLICATIONS

Ranshous et al., "Anomaly detection in dynamic networks: a survey", https://wires.onlinelibrary.wiley.com/doi/pdf/10.1002/wics.1347, Jun. 2015, pp. 223-241. (Year: 2015).*

(Continued)

*Primary Examiner* — Matthew J Ellis
(74) *Attorney, Agent, or Firm* — Crowell & Moring LLP

(57) ABSTRACT

A transaction processing method and apparatus, a computer device, and a storage medium, improve transaction processing efficiency. When read and write operations of a target transaction are executed, a concurrent transaction of a target transaction can be obtained and used to determine whether a data anomaly exists based on read-write sets of the concurrent transaction and the target transaction. The read-write sets of the concurrent transaction and the target transaction can be merged to commit the target transaction. In this way, various data anomalies can be comprehensively detected, and data state consistency is ensured. The transaction processing method does not rely completely on locking technology nor on dependency graph technology, thereby preventing system concurrency from being limited, improving querying speed and modification speed of data, and improving transaction processing efficiency.

20 Claims, 8 Drawing Sheets

---

A node device obtains, in a case that read and write operations of a target transaction are executed, at least one concurrent transaction of the target transaction, the at least one concurrent transaction and the target transaction performing read and write operations on a same data item during transaction execution — 901

The node device determines, according to read-write sets of the at least one concurrent transaction and the target transaction, whether a data anomaly exists between the at least one concurrent transaction and the target transaction — 902

The node device merges the read-write sets of the at least one concurrent transaction and the target transaction in a case that the data anomaly does not exist between the at least one concurrent transaction and the target transaction, to commit the target transaction — 903

(56) References Cited

U.S. PATENT DOCUMENTS

| | | | |
|---|---|---|---|
| 2012/0191679 A1 | | 7/2012 | Takebe |
| 2014/0325271 A1 | | 10/2014 | Ajitomi et al. |
| 2016/0171002 A1 | * | 6/2016 | Bendel .................. G06F 16/219 707/714 |
| 2016/0292212 A1 | | 10/2016 | Cheriton |
| 2018/0158034 A1 | * | 6/2018 | Hunt ...................... G06Q 20/00 |

FOREIGN PATENT DOCUMENTS

| | | |
|---|---|---|
| CN | 105389161 A | 3/2016 |
| CN | 111143389 A | 5/2020 |
| CN | 111159252 A | 5/2020 |
| CN | 111708615 A | 9/2020 |
| CN | 111736964 A | 10/2020 |
| JP | 2012-155498 A | 8/2012 |
| JP | 2014-215894 A | 11/2014 |
| WO | WO 2021/233167 A1 | 11/2021 |

OTHER PUBLICATIONS

Prisyazhnyy et al. https://sitano.github.io/theory/databases/2019/07/30/tx-isolation-anomalies/#g2-anti-dependency-cycles-write-skew-on-predicate-read, Jul. 30, 2019 (Year: 2019).*

Bhargava et al., "Concurrency Control in Database Systems", https://www.cs.purdue.edu/homes/bb/cs542-11Spr/cc.pdf, Feb. 1999 (Year: 1999).*

Zellag et al. "Consistency anomalies in multi-tier architectures: automatic detection and prevention", https://link.springer.com/article/10.1007/s00778-013-0318-x, Jun. 4, 2013 (Year: 2013).*

Li, Gen, and Jason J. Jung. "Deep learning for anomaly detection in multivariate time series: Approaches, applications, and challenges." Information Fusion 91 (2023): 93-102. (Year: 2023).*

International Search Report with English translation and Written Opinion for priority application No. PCT/CN2021/093167 dated Aug. 11, 2021, 4p in Chinese language.

Search Report for Chinese application No. 202010431659.8 dated Apr. 27, 2021, 2p, in Chinese language.

First Office Action for Chinese application No. 202010431659.8 dated May 10, 2021, 7p, in Chinese language.

Concise Explanation of Relevancy.

Notice of Reasons for Refusal for corresponding Japanese application No. 2022-540557 dated Jul. 18, 2023, 5p, in Japanese language.

English language translation of Notice of Reasons for Refusal for corresponding application No. 2022-540557 dated Jul. 18, 2023, 4p.

Extended European Search Report for application No. EP 21809132.0 dated Sep. 16, 2022, 11p.

Zellag, Kamal et al., "Consistency anomalies in multi-tier architectures: automatic detection and prevention", *VLDB Journal*, Springer Verlag, vol. 23, No. 1, Feb. 1, 2014, pp. 147-172, DE.

* cited by examiner

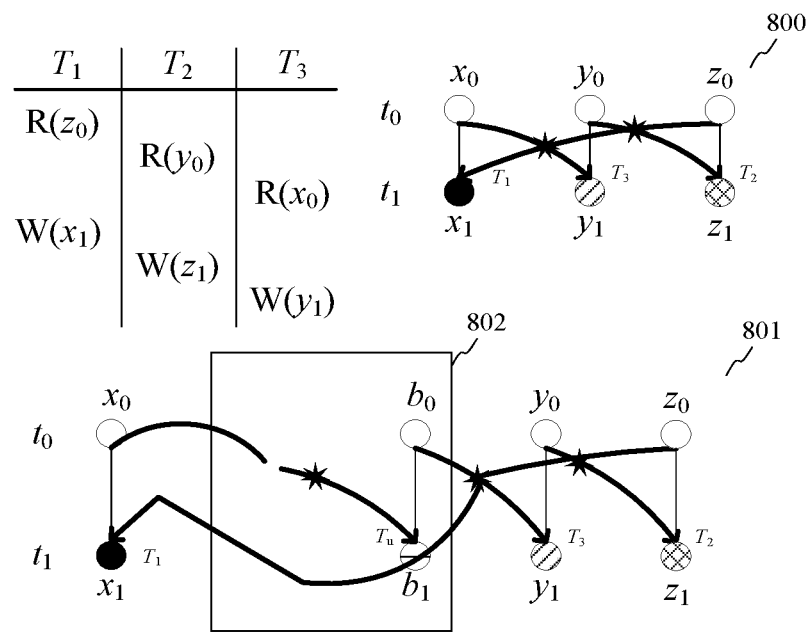

FIG. 8

```
┌─────────────────────────────────────────────────────────────┐
│ A node device obtains, in a case that read and write        │
│ operations of a target transaction are executed, at least   │──── 901
│ one concurrent transaction of the target transaction, the   │
│ at least one concurrent transaction and the target          │
│ transaction performing read and write operations on a       │
│ same data item during transaction execution                 │
└─────────────────────────────────────────────────────────────┘
                              │
                              ▼
┌─────────────────────────────────────────────────────────────┐
│ The node device determines, according to read-write sets of │
│ the at least one concurrent transaction and the target      │──── 902
│ transaction, whether a data anomaly exists between the at   │
│ least one concurrent transaction and the target             │
│ transaction                                                 │
└─────────────────────────────────────────────────────────────┘
                              │
                              ▼
┌─────────────────────────────────────────────────────────────┐
│ The node device merges the read-write sets of the at least  │
│ one concurrent transaction and the target transaction in a  │──── 903
│ case that the data anomaly does not exist between the at    │
│ least one concurrent transaction and the target             │
│ transaction, to commit the target transaction               │
└─────────────────────────────────────────────────────────────┘
```

FIG. 9

For any concurrent transaction in at least one concurrent transaction, a node device obtains a first set S1, a second set S2, and a third set S3, where S1 is an intersection between a read set of a target transaction and a write set of the any concurrent transaction, S2 is an intersection between a write set of the target transaction and a read set of the any concurrent transaction, and S3 is an intersection between the write set of the target transaction and the write set of the any concurrent transaction ⟶ 1001

The node device obtains, in a case that the third set S3 is not an empty set, a target detection result between the any concurrent transaction and the target transaction according to commitment situations of the target transaction and the any concurrent transaction, the first set S1, and the third set S3 ⟶ 1002

The node device obtains, in a case that the third set S3 is the empty set and at least one of the first set S1 or the second set S2 is not the empty set, the target detection result according to the first set S1 and the second set S2 ⟶ 1003

FIG. 10

For any concurrent transaction in at least one concurrent transaction, a node device obtains a first set S1, a second set S2, a third set S3, and a fourth set S4, where S1 is an intersection between a read set of a target transaction and a write set of the any concurrent transaction, S2 is an intersection between a write set of the target transaction and a read set of the any concurrent transaction, and S3 is an intersection between the write set of the target transaction and the write set of the any concurrent transaction, and S4 is an intersection between the read set of the target transaction and the read set of the any concurrent transaction ⟶ 1101

The node device obtains, in a case that S3 is not an empty set, a target detection result between the any concurrent transaction and the target transaction according to commitment situations of the target transaction and the any concurrent transaction, S1, and S3 ⟶ 1102

The node device obtains, in a case that S3 is the empty set and at least one of S1, S2, or S4 is not the empty set, the target detection result according to S1, S2, and S4 ⟶ 1103

FIG. 11

TRANSACTION PROCESSING METHOD AND APPARATUS, COMPUTER DEVICE, AND STORAGE MEDIUM

RELATED APPLICATION

This application claims priority PCT Application No. PCT/CN2021/093167, filed May 11, 2021, published as WO2021233167A1, entitled "TRANSACTION PROCESSING METHOD AND APPARATUS, COMPUTER DEVICE, AND STORAGE MEDIUM," which claims priority to Chinese Patent Application No. 202010431659.8, entitled "TRANSACTION PROCESSING METHOD AND APPARATUS, COMPUTER DEVICE, AND STORAGE MEDIUM" filed on May 20, 2020, each of which are incorporated herein by reference in their entirety.

FIELD OF THE TECHNOLOGY

This application relates to the field of computer technologies, and in particular, to a transaction processing method and apparatus, a computer device, and a storage medium.

BACKGROUND OF THE DISCLOSURE

Transaction processing refers to processing of a read transaction and a write transaction in a database system. If the two transactions have operated on at least the same data object during an overlapped processing period of time, the two transactions are referred to as concurrent transactions. For example, a remittance is deposited into a bank account within a period of time, that is, a database system performs a write transaction on a deposit in the bank account; and the deposit in the bank account is queried once, that is, the database system performs a read transaction on the deposit in the bank account. The above read transaction and write transaction are concurrent transactions.

In the database system, there may be conflicts between the read transaction and the write transaction in the concurrent transactions, that is, there may be a data anomaly. For example, a balance is read when a remittance is deposited, and sometimes the read balance is a balance before the deposit, or a balance after the deposit. Therefore, how to identify and avoid a data anomaly in the database system becomes a key issue. There are two methods for identifying a data anomaly: first, using a locking technology and relying on mutex mechanism of locks, to avoid a data anomaly; and second, using a dependency graph technology to determine whether there is a cycle in a dependency graph formed by the concurrent transactions. If there is a cycle, existence of the cycle may be broken, thereby eliminating a potential data anomaly.

However, the locking technology severely limits the concurrency of the database system, resulting in low transaction processing efficiency, where the above concurrency is used for indicating a quantity of transactions that are allowed to be concurrent, and the dependency graph technology may traverse each concurrent transaction to identify existence of a cycle, resulting in still low transaction processing efficiency. Therefore, there is a need for a transaction processing method that can improve transaction processing efficiency.

SUMMARY

Embodiments of this application provide a transaction processing method and apparatus, a computer device, and a storage medium, which can improve transaction processing efficiency of a database system. The technical solutions are as follows:

According to one embodiment, a transaction processing method is provided, applicable to a node device, the method including:

obtaining, in a case that read and write operations of a target transaction is executed, at least one concurrent transaction of the target transaction, the at least one concurrent transaction and the target transaction performing read and write operations on a same data item during transaction execution;

determining, according to read and write sets of the at least one concurrent transaction and the target transaction, whether a data anomaly exists between the at least one concurrent transaction and the target transaction; and merging the read-write sets of the at least one concurrent transaction and the target transaction in a case that the data anomaly does not exist between the at least one concurrent transaction and the target transaction, to commit the target transaction.

According to one embodiment, a transaction processing apparatus is provided, including:

a first obtaining module, configured to obtain, in a case that read and write operations of a target transaction is executed, at least one concurrent transaction of the target transaction, the at least one concurrent transaction and the target transaction performing read and write operations on a same data item during transaction execution;

a second obtaining module, configured to determine, according to read-write sets of the at least one concurrent transaction and the target transaction, whether a data anomaly exists between the at least one concurrent transaction and the target transaction; and a merging and commitment module, configured to combine the read-write sets of the at least one concurrent transaction and the target transaction in a case that the data anomaly does not exist between the at least one concurrent transaction and the target transaction, to commit the target transaction.

According to one embodiment, a computer device is provided, including at least one processor and at least one memory, the at least one memory storing at least one piece of program code, the at least one piece of program code being loaded and executed by the at least one processor to implement the operations performed in the transaction processing method according to any one of the foregoing possible implementations.

According to one embodiment, a storage medium is provided, storing at least one piece of program code, the at least one piece of program code being loaded and executed by a processor to implement the operations performed in the transaction processing method according to any one of the foregoing possible implementations.

According to another embodiment, a computer program product is provided, the computer program product including computer instructions, the computer instructions being stored in a computer-readable storage medium. A processor of a computer device reads the computer instructions from the computer-readable storage medium, and executes the computer instructions, so that the computer device performs the method provided in various embodiments of the transaction processing method.

The technical solutions provided in the embodiments of this application include at least the following beneficial effects:

When read and write operations of a target transaction are executed, at least one concurrent transaction of the target transaction is obtained, a data anomaly not existing between the at least one concurrent transaction and the target transaction is determined according to read-write sets of the at least one concurrent transaction and the target transaction, and the at least one concurrent transaction and the read and write sets of the target transaction are merged, to commit the target transaction. This method can comprehensively detect various data anomalies in the database system when the operations of the target transaction are executed, to ensure consistency of data states. On a basis of ensuring data state consistency, the transaction processing mechanism neither completely relies on a locking technology nor completely relies on a dependency graph technology, and does not limit concurrency of the database system, thereby improving transaction processing efficiency of the database system.

BRIEF DESCRIPTION OF THE DRAWINGS

FIG. 8 is a schematic principle diagram of a sawtooth write skew anomaly according to an embodiment of this application.

FIG. 9 is a flowchart of a transaction processing method according to an embodiment of this application.

FIG. 10 is a schematic diagram of obtaining a target detection result according to an embodiment of this application.

FIG. 11 is a schematic diagram of obtaining a target detection result according to an embodiment of this application.

DESCRIPTION OF EMBODIMENTS

Figure 1:
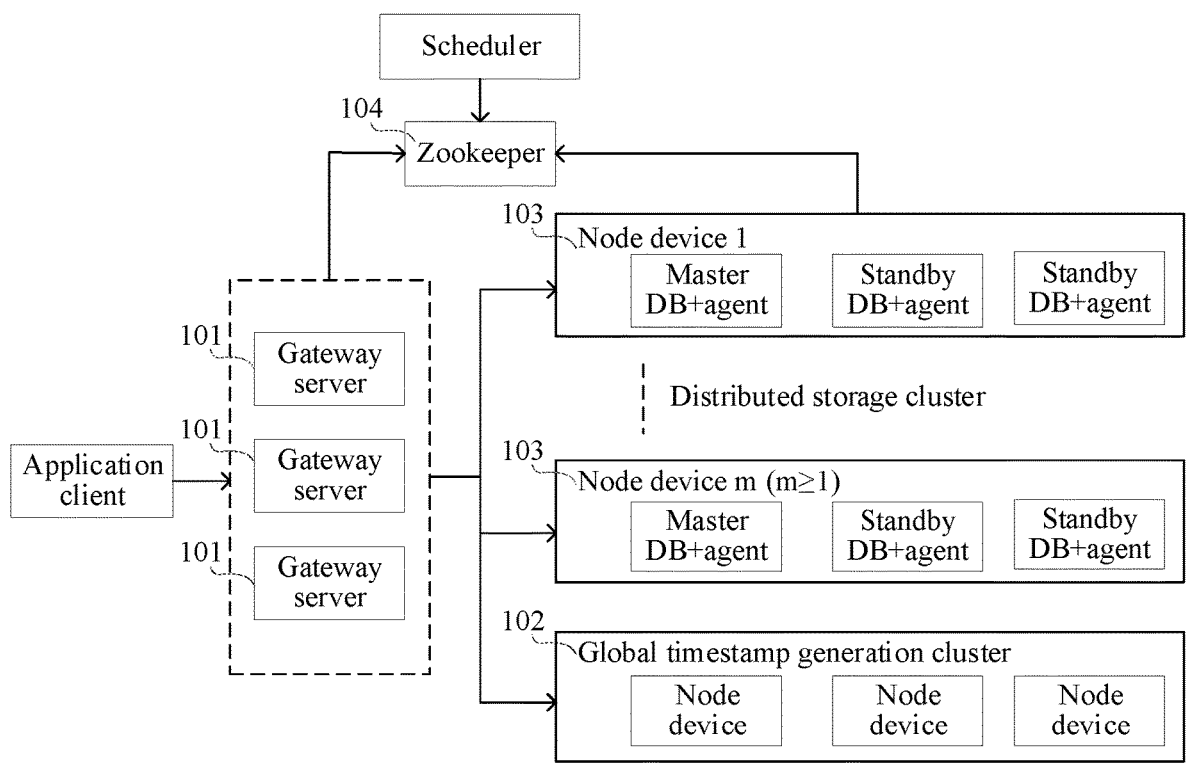
FIG. 1 is a schematic diagram of an implementation environment of a transaction processing method according to an embodiment of this application.

The cloud technology is a hosting technology that unifies a series of resources such as hardware, software, and networks in a wide area network or a local area network to implement computing, storage, processing, and sharing of data, that is, a collective name of a network technology, an information technology, an integration technology, a management platform technology, an application technology, and the like based on an application of a cloud computing business mode, and may form a resource pool, which is used as required, and is flexible and convenient. A cloud computing technology becomes an important support of the field of the cloud technology. A background service of a technical network system requires a large amount of computing and storage resources, such as video websites, image websites, and more portal websites. As the Internet industry is highly developed and applied, each article may have its own identifier in the future and may be transmitted to a background system for logical processing. Data at different levels is separately processed, and data in various industries requires strong system support, which can be implemented through cloud computing.

Cloud storage is a new concept extended and developed from a concept of cloud computing. A distributed cloud storage system (hereinafter referred to as a storage system) is a storage system that integrates a large number of different types of storage devices (also referred to as storage nodes) in a network through application software or application interfaces to work together by using functions such as a cluster application, a grid technology and a distributed storage file system, to jointly provide functions of data storage and business access to the outside.

A database (DB) may be considered as an electronic file cabinet, that is, a place for storing an electronic file. A user may perform an operation such as add, query, update, or delete data in the file. The so-called "database" is a data set that is stored together in a particular manner and can be shared by at least two users, has as less redundancy as possible, and is independent of an application program.

A database system described in embodiments of this application may be a stand-alone database system, a stand-alone transaction-based database system (also referred to as a stand-alone transactional database system), or a stand-alone database system that is mainly analytical but requires a transaction processing capability, may be a non-relational SQL (NoSQL, generally referring to a non-relational database) system, or may be a distributed database system, a distributed transactional database system, or a distributed big data processing system. When different variables are distributed and stored on different physical nodes, the distributed database system corresponds to a situation that there are two or more variables in a data state consistency model. The data state consistency model and a corresponding transaction processing procedure are described in detail in the following embodiments.

The database system may include at least one node device, a database of each node device may store at least two data tables, and each data table may be used for storing at least one data item (also referred to as a variable version). The database of the node device may be any type of distributed database. Exemplarily, the database of the node device may include at least one of a relational database or the non-relational database, for example, a structured query language (SQL) database, a NoSQL database, or a NewSQL (generally referring to various new scalable/high-performance databases). These types of databases are merely a few examples, as the database may vary in different embodiments.

In some embodiments, the embodiments of this application may also be applied to a database system based on a blockchain technology (hereinafter referred to as "a blockchain system"). The blockchain system is substantially a decentralized distributed database system, which keeps ledger data recorded by different node devices in the blockchain consistent by using a consensus algorithm, ensures encrypted transmission and tamper-proofing of the ledger data between different node devices by using a cryptographic algorithm, extends a ledger function through a scripting system, and performs interconnection between different node devices through network routing.

The blockchain system may include at least one blockchain, and the blockchain is a string of data blocks generated through association by using a cryptographic method. Each data block includes information of a batch of network transactions, the information being used for verifying the validity of information of the data block (anti-counterfeiting) and generating a next data block.

A peer to peer (P2P) network may be formed between the node devices in the blockchain system, and a P2P protocol is an application layer protocol that runs over a transmission control protocol (TCP). In the blockchain system, any node device may have the following functions: 1) routing: which is a basic function of the node device, and is used for supporting communication between node devices. (2) Application: which is deployed in a blockchain, and is used for implementing a particular service according to an actual service requirement, recording data related to function implementation to form ledger data, adding a digital signature to the ledger data to indicate a source of the data, and transmitting the ledger data to another node device in the blockchain system, so that the another node device adds the ledger data to a temporary block when successfully verifying the source and integrity of the ledger data. Services implemented by the application may include a wallet, a shared ledger, a smart contract, and the like. (3) Blockchain: including a series of blocks that are consecutive in a chronological order. Once a new block is added to the blockchain, the new block is no longer removed. The block records ledger data submitted by a node device in the blockchain system.

In some embodiments, each block may include a hash value of a transaction record stored in the current block (a hash value of the current block) and a hash value of a previous block. Blocks are connected according to hash values to form a blockchain. In addition, the block may further include information such as a timestamp indicating a block generation time.

Before describing the embodiments of this application, since correctness of transaction concurrency control in a database system may be described through consistency and isolation, the consistency and isolation are described below:

1. Isolation

Transaction isolation levels are defined by whether avoiding certain data anomalies, and data anomalies that may be involved include: 1) dirty read: which means that one transaction reads a data item that has not yet been submitted by another transaction; 2) non-repeatable read: which means that one transaction reads the same data item twice but gets different results; and 3) phantom: which means that a transaction performs two predicate queries (range queries) during an operation. A result of a second query includes data items that did not appear in a result of a first query, or lacks data items appearing in the result of the first query.

To resolve the above three data anomalies, an American National Standards Institute (ANSI) SQL belonging to an international standard of databases proposes four isolation levels, to distinguish the above three known data anomalies, thereby improving transaction processing efficiency under a condition of allowing certain data anomalies to exist.

The four isolation levels respectively include: 1) read uncommitted: the above three data anomalies are allowed to occur; 2) read committed: dirty read is not allowed to occur; 3) repeatable read: dirty read and non-repeatable read are not allowed to occur; and 4) serializable: the above three data anomalies are not allowed to occur. A relationship between the four isolation levels defined by the ANSI SQL and the data anomalies may be visually displayed in Table 1 below:

TABLE 1

| Isolation level | Dirty write | Dirty read | Non-repeatable read | Phantom read |
| --- | --- | --- | --- | --- |
| Read uncommitted | Not allowed | Allowed | Allowed | Allowed |
| Read committed | Not allowed | Not allowed | Allowed | Allowed |
| Repeatable read | Not allowed | Not allowed | Not allowed | Allowed |
| Serializable | Not allowed | Not allowed | Not allowed | Not allowed |

It can be seen that, none of the four isolation levels allow a dirty write anomaly, and the dirty write anomaly means that two uncommitted transactions modify the same data item. There were not many types of data anomalies known when the ANSI SQL set the standard, and new data anomalies were discovered subsequently. In addition to the above data anomalies, the known data anomalies also include: a lost update anomaly, a read skew anomaly, a write skew anomaly, a serial-concurrent-phenomenon anomaly, a cross-phenomenon anomaly, and the like.

Based on the standard of the ANSI SQL, Jim Grey et al. redefined six isolation levels by using more anomalies and more layers. The relationship between the six isolation levels and corresponding data anomalies may be visually displayed in Table 2 below:

TABLE 2

| Isolation level | Dirty write | Dirty read | Cursor lost update | Lost update | Non-repeatable read | Phantom read | Read skew | Write skew |
| --- | --- | --- | --- | --- | --- | --- | --- | --- |
| Read uncommitted | Not allowed | Allowed | Allowed | Allowed | Allowed | Allowed | Allowed | Allowed |
| Read committed | Not allowed | Not allowed | Not allowed | Allowed | Allowed | Allowed | Allowed | Allowed |
| Cursor stability | Not allowed | Not allowed | Not allowed | Allowed sometimes | Allowed sometimes | Allowed | Allowed | Allowed sometimes |
| Repeatable read | Not allowed | Not allowed | Not allowed | Not allowed | Not allowed | Allowed | Not allowed | Not allowed |
| Snapshot | Not allowed | Not allowed | Not allowed | Not allowed | Not allowed | Allowed sometimes | Not allowed | Allowed |

TABLE 2-continued

| Isolation level | Dirty write | Dirty read | Cursor lost update | Lost update | Non-repeatable read | Phantom read | Read skew | Write skew |
|---|---|---|---|---|---|---|---|---|
| Serializable | Not allowed | Not allowed | Not allowed | Not allowed | Not allowed | Not allowed | Not allowed | Not allowed |

2. Consistency

Database consistency is defined as: under an operation of a transaction, a data state of the database changes from one consistency state to another consistency state. The above "consistency state" refers to a data state that satisfies some rules pre-defined by a database system. For example, these rules may include constraints, cascades, triggers, and any combination of the three (belonging to logical semantics of data). A write skew anomaly breaches constraints between data, where the constraints belong to data consistency defined by user semantics.

For the entire database system, the consistency also includes a meaning of a system level. The system level means that, to ensure that data is consistent in the database system, the database system is further required to meet two characteristics: one is serializability, and the other is recoverability. The serializability also refers to the serializable isolation levels defined in the isolation, and the serializability ensures that data is not corrupted by a concurrent operation. The recoverability means that a committed transaction has not read data written by a transaction that is rolled back (which means that the dirty read anomaly does not occur), the recoverability ensures that the data returns to a previous consistency state after the transaction is rolled back, and the transaction that is rolled back does not affect data consistency, and the consistency state of the database system is recoverable.

Based on the above concepts, it can be seen that the consistency and isolation are closely related to data anomalies, and how to identify and avoid the data anomalies in a database system is a key issue. A concurrent access control algorithm of the database may be used for providing the isolation levels defined by the ANSI SQL standard, but an implementation technology thereof varies in different database systems.

For example, the serializable isolation levels of database systems such as a DataBase2 (DB2) and Informix all prevent the data anomalies from occurring by using a locking technology and relying on a mutex mechanism of locks. In a MySQL database system, the locking technology is also used for implementing the serializable isolation levels, and a snapshot isolation (SI) technology is also used for implementing repeatability and an isolation level of read committed. In a PostgreSQL database system, a serializable snapshot isolation technology (SSI) is used for implementing the serializable isolation levels, and the SI technology is used for implementing the repeatability and the isolation level of read committed. In another example, under a distributed database system, a level associated with an isolation level that combines distributed consistency and transaction consistency is linear serializability, which substantially includes serializability. In a Spanner distributed database system, a truetime mechanism is used for implementing the linear serializability. In a CockroachDB distributed database system, causal consistency and an SSI-like technology are used for implementing a combination of serializability and causal consistency. However, isolation levels of these database systems are not rich enough, resulting in insufficient flexibility and transaction processing efficiency of the database systems.

Constructing a concurrent access control algorithm according to definitions of anomalies and isolation levels is a foundation of each database transaction processing technology. However, regardless of the four isolation levels defined by the ANSI SQL standard or the six isolation levels developed subsequently, a transaction processing system constructed based on this still has the following four types of problems:

First, types of data anomalies are incomplete, and types of data anomalies used during defining isolation levels have greater limitations.

Second, formal definitions of the data anomalies are not strict. In the embodiments of this application, strict definitions are given to various types of data anomalies, and positions that are not strict in conventional definitions are analyzed.

Third, most of conventional isolation level systems rely on the locking technology, but the locking technology is only one kind of concurrent access control technology, and there are many other concurrent access control technologies. In addition, the locking technology severely limits the concurrency of a database system, which causes low transaction processing efficiency. Therefore, the conventional isolation level systems are out of date.

Fourth, there is no systematic analysis and description for distributed transactions and isolation levels, and the conventional ANSI SQL standard is used, which lacks systematic research on an association relationship between isolation levels and distributed transactions in a distributed transaction scenario, and lacks definitions and implementation technologies of the isolation levels for the distributed transactions.

In view of this, the embodiments of this application provide a transaction processing method, and provides a concurrent access control algorithm during a transaction processing process, respectively including a stand-alone concurrent access control algorithm applicable to a stand-alone database system, and a distributed concurrent access control algorithm applicable to a distributed database system. By using a data state consistency model that is further improved, the method may be implemented based on general formal definitions of various data anomalies and complete isolation levels that are proposed systematically, and is described in detail below.

FIG. 1 is a schematic diagram of an implementation environment of a transaction processing method according to an embodiment of this application. Referring to FIG. 1, this embodiment may be applied to a distributed database system. The distributed database system may include a gateway server 101, a global timestamp generation cluster 102, a distributed storage cluster 103, and a distributed coordination system 104 (for example, a ZooKeeper). The distributed storage cluster 103 may include data node devices and coordinator node devices.

The gateway server 101 is used for receiving external a read and write request, and distributing a read and write transaction corresponding to the read and write request to the distributed storage cluster 103. For example, after a user logs in to an application client on a terminal, the application client is triggered to generate a read and write request, and an application programming interface (API) provided by the distributed database system is invoked to send the read and write request to the gateway server 101. For example, the API may be a MySQL API (an API provided by a relational database system).

In some embodiments, the gateway server 101 may be combined with any data node device or any coordinator node device in the distributed storage cluster 103 on the same physical machine, that is, a data node device or coordinator node device may function as the gateway server 101.

The global timestamp generation cluster 102 is used for generating a global commitment timestamp (Gts) of a global transaction. The global transaction is also referred to as a distributed transaction, and refers to a transaction involving at least two data node devices. For example, a global read transaction may involve reading of data stored on at least two data node devices. In another example, a global write transaction may involve writing of data on at least two data node devices. The global timestamp generation cluster 102 may be logically considered as a single point, but may provide a service with higher availability through a one master-three-slave architecture in some embodiments. The generation of the global commitment timestamp may be implemented in the form of a cluster, which can prevent a single-point failure, and also avoid a problem of single-point bottleneck.

Optionally, the global commitment timestamp is a globally unique and monotonically increasing timestamp identifier in the distributed database system, and may be used for marking an order of global commitment of transactions, so as to reflect a sequence relationship (a total order relationship of the transactions) between the transactions in a truetime. The global commitment timestamp may use at least one of a physical clock, a logical clock, a hybrid physical clock, or a hybrid logical clock (HLC), and a type of the global commitment timestamp is not limited to the described embodiments.

In some embodiments, the global commitment timestamp may be generated by using the hybrid physical clock, and the global commitment timestamp may be formed by eight bytes, where, first 44 bits may be a value of a physical timestamp (that is, a Unix timestamp, accurate to milliseconds), so that 244 unsigned integers may be represented totally. Therefore, theoretically,
the physical timestamp of about $$557.8 \left( \frac{2^{44}}{1000*60*60*24*365} = 557.8 \right)$$

years may be represented,
where, last 20 bits may be monotonically increasing counts within a certain millisecond, so that there are 220 (about 1 million) counts per millisecond. Based on the above data structure, if a transaction throughput of a single device (any data node device) is 10 w/s (namely, 100,000 per second), theoretically a distributed storage cluster 103 including 10,000 node devices may be supported. In addition, a quantity of global commitment timestamps represents a total quantity of transactions that a system may theoretically support.

Based on the above data structure, the system may theoretically support $(2^{44}-1)*2^{20}$ transactions. An example description of a method for defining a global commitment timestamp is described. According to different service requirements, a quantity of bits of the global commitment timestamp may be extended to support more nodes and transaction processing. The method for defining a global commitment timestamp is not limited to the described embodiments.

In some embodiments, the global timestamp generation cluster 102 may be physically independent, or may be merged with the distributed coordination system 104 (for example, the ZooKeeper).

The distributed storage cluster 103 may include the data node devices and the coordinator node devices, each coordinator node device may correspond to at least one data node device, and division of the data node devices and the coordinator node devices is based on different transactions. By using a certain global transaction as an example, an initiating node of the global transaction may be referred to as a coordinator node device, and other node devices involved in the global transaction are referred to as data node devices, a quantity of data node devices may be at least one, and a quantity of coordinator node devices may be at least one. The quantity of data node devices and the quantity of coordinator node devices in the distributed storage cluster 103 are not limited to the embodiments described. Because the distributed database system provided by this embodiment lacks a global transaction manager, an extended architecture (XA, a distributed transaction specification of an X/Open organization) technology or a two-phase commit (2PC) technology may be used for supporting cross-node transactions (global transactions) in the system, to ensure atomicity and consistency of data during cross-node write operations. In this case, a coordinator node device is used for acting as a coordinator in a 2PC algorithm, and data node devices corresponding to the coordinator node device are used for acting as participants in the 2PC algorithm.

Optionally, each data node device may be a stand-alone device or use a master-standby structure; and each coordinator node device may be a stand-alone device or use a master-standby structure (namely, a one-master-multiple-standby cluster). As shown in FIG. 1, node devices (data node devices or coordinator node devices) being one-master-two-standby clusters are used as an example for illustration, and each node device includes one host and two standbys (namely, spares). Optionally, each host is correspondingly provided with an agent device, and each standby is also correspondingly provided with the agent device. The agent device may be physically independent from the host or the standby. Certainly, the agent device may also be used as an agent module on the host or the standby. By using a node device 1 as an example, the node device 1 includes a main database and an agent device (referred to as main DB+agent for short), and also includes two standby databases (namely, two spare databases) and an agent device (referred to as standby DB+agent for short).

In some embodiments, a set of a database instance of a host or database instances of a host and standbys corresponding to each node device is referred to as a SET. For example, if a node device is a stand-alone device, a SET of the node device is only a database instance of the stand-alone device. If a node device is a one-master-two-standby cluster, a SET of the node device is a set of a database instance of a host and database instances of two standbys. In this case, consistency between data of the host and replica data of the standbys may be ensured based on a strong synchronization technology of a cloud database. Optionally, linear capacity extension may be performed on each SET, to meet service processing requirements in a big data scenario. In some financial service scenarios, the global transaction usually refers to cross-SET transferring.

The distributed coordination system 104 may be used for managing at least one of the gateway server 101, the global timestamp generation cluster 102, or the distributed storage cluster 103. Optionally, a technician may access the distributed coordination system 104 through a scheduler on a terminal, so as to control the back-end distributed coordination system 104 based on the front-end scheduler, and realize management of clusters or servers. For example, the technician may control the ZooKeeper to delete a node device from the distributed storage cluster 103 through the scheduler, that is, make a node device fail.

FIG. 1 is an architecture diagram of a lightweight global transaction processing, and provides a type of distributed database system. An entire distributed database system may be considered as jointly maintaining a logical large table. Data stored in the large table is scattered to node devices in the distributed storage cluster 103 through a primary key, and data stored in each of the node devices is independent of other node devices, thereby realizing horizontal division of the logical large table by the node devices. In the above system, data tables in databases may be horizontally divided and stored in a distributed manner. Therefore, this kind of system may also be vividly referred to as an architecture with "sub-databases and sub-tables".

In the above distributed database system, the atomicity and consistency of data during write operations have been realized based on the XA/2PC algorithm, while a problem of data consistency of read operations may be improved by constructing a lightweight and decentralized distributed transaction processing mechanism. From a perspective of technologies, the sub-database-sub-table architecture lacks a global transaction manager, and thus lacks a distributed transaction processing capability. By constructing the lightweight and decentralized distributed transaction processing mechanism, horizontal extension and other capabilities can be provided for the distributed database system, and simple and easy promotion of the distributed database system and higher transaction processing efficiency can be ensured, which may have an impact on a distributed database architecture designed by a conventional concurrency control method. A distributed transaction processing mechanism is described in the next embodiment.

The transaction processing method provided by the embodiments of this application may be applied to the distributed database system using the sub-database-sub-table architecture. For example, the distributed database system is a distributed transactional database system, and, may alternatively be a distributed relational database system. In addition, the transaction processing method provided in the embodiments of this application may also be applied to some stand-alone database systems. The distributed database system requires a distributed transaction processing capability. In addition, to improve transaction processing efficiency to cope with application requirements of different users in different scenarios, rich and flexible isolation levels need to be provided.

In some embodiments, the distributed database system formed by the gateway server 101, the global timestamp generation cluster 102, the distributed storage cluster 103, and the distributed coordination system 104 may be considered as a server that provides a data service to a terminal. The server may be an independent physical server, or may be a server cluster or a distributed database system formed by at least two physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. Optionally, the terminal (a user terminal) may be, but is not limited to, a smartphone, a tablet computer, a notebook computer, a desktop computer, a smart speaker, a smartwatch, or the like. The terminal and the server may be directly or indirectly connected in a wired or wireless communication manner.

Before describing the embodiments of this application, some basic terms and symbols involved in the database system are explained first.

Transaction: is a logical unit in a process that a database management system performs an operation, is formed by a limited sequence of database operations, and is a minimum execution unit operated by the database system.

Variable: is a data unit in a database relational system, and is an actor (or an operation object) of a database operation. A variable may include at least two variable versions (hereinafter also referred to as "version"). Whenever a transaction updates a variable, a new variable version may be added. Variable versions of the variable may be identified by a natural number as a version number. A larger version number indicates a newer variable version.

Operation: a database operation is formed by three parts: an operation type, a transaction, and a variable version, where the operation type may include two types: read (R) and write (W). For example, a transaction T updates a variable x, and generates a new version i of the variable x. Therefore, the above write operation may be recorded as $W_T(x_i)$. In another example, the transaction T reads a value of the version i of the variable x. Therefore, the above read operation may be recorded as $R_T(x_i)$.

Transaction data set: a data set is a set formed by versions of at least two variables, and each variable in the set at most includes one version, which may be recorded as a data set $DS(T)=\{x_i, y_j, z_k, \ldots | x, y, \text{ and } z \text{ are variables, and } i, j, \text{ and } k \text{ are version numbers}\}$. Each transaction in the database system has two transaction data sets, which are respectively a write set of the transaction and a read set of the transaction. Meanings of the two sets are:

a write set $DS_W(T)$, configured to store a new data version written by the transaction T; and a read set $DS_R(T)$, configured to store the data version read by the transaction T.

Version read set: is a set formed by at least two transactions, represents all transactions that read a certain variable version, and may be recorded as a version read set $TS(x_i)=\{T_u, T_v, T_s, \ldots | u, v, \text{ and } s \text{ are transaction ID}\}$. The version read set may include a committed transactions and uncommitted transactions, where the transaction ID is a transaction identification.

The transaction processing method provided by the embodiments of this application operates based on a data state consistency model (referred to as a "data state model"), and the data state consistency model provided by this application is a model that is firstly, comprehensively, and systematically proposed within the scope of database transaction processing technologies. The model reveals essences of various data anomalies, unifies description and expression of various data anomalies, explains a relationship between data anomalies and concurrent transactions, and can find more new and unknown data anomalies, thereby better ensuring consistency of the database system.

The data state consistency model includes two basic rules: first, forbid a dirty write data anomaly, that is, forbid to concurrently write and write to the same variable, where a write-write conflict may be forbidden in a locking manner; and second, forbid a dirty read data anomaly, where the dirty read anomaly may be forbidden to occur by adopting a read-committed rule, the occurrence of dirty read exceptions is forbidden, that is, data that is read is data that has been committed.

In the data state consistency model, a relationship between a transaction and a variable version of a transaction operation may be drawn into graph representation. Several graphical concepts involved in the data state consistency model is defined below:

1. Node:

Each variable version is a node. Since a variable may include at least two versions, at least two versions of the same variable are arranged vertically in a from-old-to-new order in the graphical representation, that is, in the graphical representation, the at least two versions of the same variable are in a column, where a version at the top is oldest, and a version at the bottom is newest.

Figure 2:
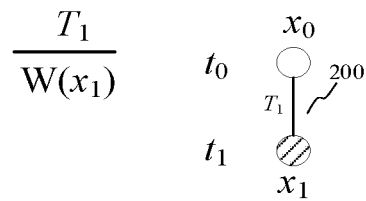
FIG. 2 is a schematic diagram of a vertical edge according to an embodiment of this application.

2. Vertical Edge:

A perpendicular edge that exists between two adjacent versions of the same variable is referred to as a "vertical edge". The vertical edge represents change of a version in the same variable, and an update operation (for example, an UPDATE statement of a data manipulation language (DML)) may cause change of a data state, thereby generating a vertical edge. FIG. 2 is a schematic diagram of a vertical edge according to an embodiment of this application. As shown in FIG. 2, a variable version $x_0$ exists at a moment $t_0$, and a transaction $T_1$ updates the variable version $x_0$ to a variable version $x_1$ at a moment $t_1$, which is recorded as W ($x_1$). A vertical line segment 200 between the variable version $x_0$ and the variable version $x_1$ is a "vertical edge".

The vertical edge includes a meaning of "updating from one version of a variable to another version". Therefore, for a transaction, a variable version connected to an upper end of a vertical edge thereof shall be added to a read set of a current transaction (regardless of whether a read operation is actually performed on the variable version). In addition, a version update may be performed by a single transaction, not by a concurrent transaction, so as to forbid write-write concurrency and prevent a dirty write data anomaly from occurring. In addition, vertical edges cannot overlap, and a vertical edge can be an edge between two adjacent versions, thereby preventing a lost update data anomaly from occurring.

Figure 3:
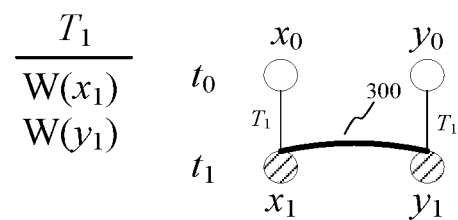
FIG. 3 is a schematic diagram of a sky edge according to an embodiment of this application.

3. Bevel Edge:

An edge that exists between versions of two different variables is referred to as a "bevel edge". The bevel edge represents a consistency state between two variables, and the bevel edge may be divided into a write-write bevel edge (also referred to as a "WW bevel edge" or a "sky edge"), a read-write bevel edge (also referred to as a "RW bevel edge"), and a read-read bevel edge (a "RR bevel edge" or a "read-only bevel edge"), and meanings thereof are respectively:

1) Sky edge: if the same transaction modifies two or more different variables, a sky edge may be formed between every two of these variables. In other words, in a write set of a transaction, a sky edge exists between any two variables, and two ends of the sky edge are respectively connected to upper ends of two nodes. FIG. 3 is a schematic diagram of a sky edge according to an embodiment of this application. As shown in FIG. 3, a variable version $x_0$ and a variable version $y_0$ exist at a moment $t_0$, and at a moment $t_1$, a transaction $T_1$ updates the variable version $x_0$ to a variable version $x_1$, and modifies the variable version $y_0$ to a variable version $y_1$, which are recorded as W ($x_1$) and W ($y_1$). A connection line 300 between an upper vertex of the variable version $x_1$ and an upper vertex of the variable version $y_1$ is a "sky edge".

In some embodiments, if a transaction modifies one variable, a terminal point of a vertical edge of the transaction may be referred to as a sky node. The sky node is a special form of the sky edge, and is equivalent to coincidence of two ends of the sky edge. By using FIG. 2 as an example, because the transaction $T_1$ modifies one variable version $x_0$, and a terminal point of a vertical edge of the transaction is the variable version $x_1$, the variable version $x_1$ in FIG. 2 is a sky node. In addition, a vertical edge cannot exist across a sky node. If a vertical edge crosses a sky node, it means that two concurrent transactions write the same variable simultaneously, so that a write-write conflict is caused, that is, a dirty write data anomaly is generated. Because the dirty write data anomaly may be forbidden according to the basic rules, the vertical edge cannot cross the sky node.

Figure 4:
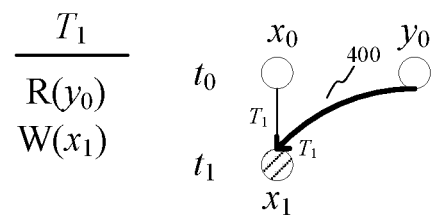
FIG. 4 is a schematic diagram of a read-write bevel edge according to an embodiment of this application.

2) Read-write bevel edge: a transaction has read and write operations between any two different variables, and a read-write bevel edge may be formed between a variable version read by the transaction and a variable version written by the transaction. A read end of the read-write bevel edge is connected to a lower end of a node, and a write end is connected to an upper end of the node. FIG. 4 is a schematic diagram of a read-write bevel edge according to an embodiment of this application. As shown in FIG. 4, a variable version $x_0$ and a variable version $y_0$ exist at a moment $t_0$, and at a moment $t_1$, a transaction $T_1$ updates the variable version $x_0$ to a variable version $x_1$, and reads the variable version $y_0$, which are recorded as W ($x_1$) and R ($y_0$). A connection line 400 between a lower vertex of the variable version $y_0$ and an upper vertex of the variable version $y_1$ is a "read-write bevel edge".

Figure 5:
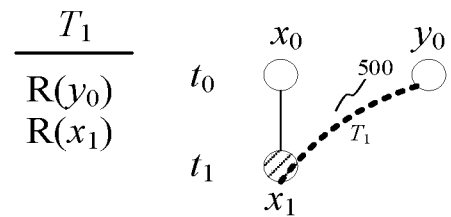
FIG. 5 is a schematic diagram of a read-only bevel edge according to an embodiment of this application.

3) Read-only bevel edge: if the same transaction reads two or more different variables, a read-only bevel edge may be formed between every two of these variables. In other words, in a read set of a transaction, a read-only bevel edge exists between any two variables. Two ends of the read-only bevel edge are respectively connected to upper ends of two nodes, that is, when a variable version is already in a committed state, the variable version may be read by the transaction, and a read committed rule is executed in this case. FIG. 5 is a schematic diagram of a read-only bevel edge according to an embodiment of this application. As shown in FIG. 5, a variable version $x_0$ and a variable version $y_0$ exist at a moment $t_0$, a transaction subsequently updates the variable version $x_0$ to a variable version $x_1$, and at a moment $t_1$, a transaction $T_1$ respectively reads the variable version $x_1$ and the variable version $y_0$, which are recorded as R ($x_1$) and R ($y_0$). A dashed line 500 between a lower vertex of the variable version $y_0$ and a lower vertex of the variable version $x_1$ is a "read-only bevel edge".

4. Consistency State Edge:

A consistency state edge is formed by connecting at least one bevel edge and/or vertical edge in end-to-end connection, and is used for describing a consistency state between at least two variables. For example, for a vertical edge formed between the variable version $x_0$ and the variable version $x_1$, the sky edge formed between the variable version $x_1$ and the variable version $y_1$, and a vertical edge formed between the variable version $y_0$ and variable version $y_1$ in FIG. 3, the three edges jointly form a consistency state edge. In another example, for a vertical edge formed between the variable version $x_0$ and the variable version $x_1$ and the read-write bevel edge formed between the variable version $y_0$ and the variable version $x_1$ in FIG. 4, the two edges jointly form a consistency state edge. In another example, for the read-only bevel edge formed between the variable version $y_0$ and the variable version $x_1$ in FIG. 5, the read-only bevel edge may independently form a consistency state edge.

The consistency state edge may involve bevel edges and/or vertical edges of at least two transactions, that is, data consistency is maintained between nodes on the consistency state edge, but these nodes are not necessarily operated by a single transaction, and may be involved in at least two concurrent transactions. For example, a vertical edge between the variable version $x_0$ and the variable version $x_1$ and the read-only bevel edge between the variable version $y_0$ and the variable version $x_1$ in FIG. 5 may jointly form a consistency state edge. However, the vertical edge is generated by a transaction performing an update operation, while the read-only bevel edge is generated by another transaction performing a read operation. Although the vertical edge and the read-only bevel edge correspond to different transactions, the two may jointly form the consistency state edge.

In some embodiments, vertical edges may be ignored by the consistency state edge, so the vertical edges do not form dynamic edge intersection with other bevel edges (the dynamic edge intersection means that there is a data anomaly). However, in some embodiments, the vertical edges are components of the consistency state edge, and in this case the vertical edges cannot be ignored by the consistency state edge.

In an example, by still using FIG. 5 as an example, the vertical edge formed the variable version $x_0$ and the variable version $x_1$ used as an outermost edge in the consistency state edge may be ignored, and the read-only bevel edge between the variable version $y_0$ and the variable version $x_1$ may be used as the consistency state edge.

Figure 6:
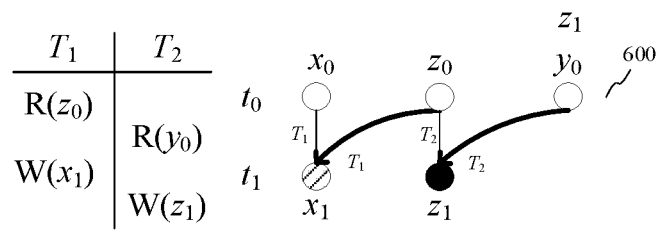
FIG. 6 is a schematic principle diagram of a consistency state edge according to an embodiment of this application.

In another example, FIG. 6 is a schematic principle diagram of a consistency state edge according to an embodiment of this application. Referring to FIG. 6, a transaction $T_1$ reads a variable version $z_0$ and writes the variable version in a variable version $x_1$, which are recorded as "R ($z_0$) W ($x_1$)", and a transaction $T_2$ reads a variable version $y_0$ and writes the variable version in a variable version $z_1$, which are recorded as "R ($y_0$) W ($z_1$)". As shown in 600, a vertical edge formed between a variable version $x_0$ and the variable version $x_1$, a RW bevel edge formed between the variable version $z_0$ and the variable version $x_1$, a vertical edge formed between the variable version $z_0$ and the variable version $z_1$, and a RW bevel edge formed between the variable version $y_0$ and the variable version $z_1$ may jointly form a consistency state edge. The consistency state edge is formed by the two transactions $T_1$ and $T_2$. The vertical edge formed between a variable version $x_0$ and the variable version $x_1$ used as an outermost edge of the consistency state edge may be omitted, while the vertical edge formed between the variable version $z_0$ and the variable version $z_1$ used as an inner edge of the consistency state edge cannot be omitted. Because the inner vertical edge plays a role in connecting other bevel edges, the inner vertical edge may form dynamic edge intersection with other bevel edges. In this case, the vertical edge cannot be omitted.

According to whether a transaction is committed, the consistency state edge may be divided into two types, which are described below:

1) Static edge: refers to a static consistency state edge, where nodes on the static edge are generated by a committed transaction, and an edge between related points (a state of a variable) of the committed transaction is a consistency state edge formed by one or more RR bevel edges, also referred to as the static edge. The static edge reflects a consistency relationship between variable versions after data states change at a historical moment. Once historical state data is formed after the transaction is committed, the historical state data can be read and cannot be tampered with. When reading the historical state data, the static edge may ensure that read variables are in the same consistency state.

Figure 7:
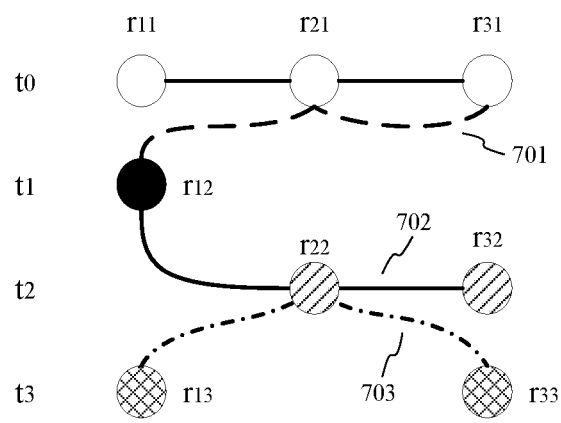
FIG. 7 is a schematic diagram of a static edge according to an embodiment of this application.

FIG. 7 is a schematic diagram of a static edge according to an embodiment of this application. As shown in FIG. 7, initial states of three variables are respectively $r_{11}$, $r_{21}$, and $r_{31}$. As time goes by (a from-top-to-bottom direction in FIG. 7 represents time growth), different transactions modify variable states, and the variable states change. For example, a transaction $T_1$ modifies $r_{11}$ to $r_{12}$, and in this case, dashed lines among $r_{12}$, $r_{21}$, and $r_{31}$ form a static edge 701; a transaction $T_2$ modifies respectively $r_{21}$ and $r_{31}$ to $r_{22}$ and $r_{32}$, and in this case, connection lines among $r_{22}$, $r_{32}$, and $r_{12}$ form a static edge 702; and a transaction $T_3$ modifies respectively $r_{12}$ and $r_{32}$ to $r_{13}$ and $r_{33}$, and in this case, dashed lines among $r_{13}$, $r_{33}$, and $r_{22}$ form a static edge 703. If variable versions that maintain consistency are read at any time point between moments $t_1$ and $t_2$, since the modifications of $r_{22}$ and $r_{32}$ are not committed, the dashed line static edge 701 among $r_{12}$, $r_{21}$, and $r_{31}$ may maintain consistency in this case, and then the read variable versions are $r_{12}$, $r_{21}$, and $r_{31}$.

2) Dynamic edge: refers to a dynamic consistency state edge, where the dynamic edge is an edge formed by a part of transactions in a concurrent transaction set reading and writing variables jointly, and at least one transaction in the concurrent transaction set is not committed. The dynamic edge includes at least one transaction, or at least two transactions. At least two concurrent transactions may form a dynamic edge after being merged (a merging condition of concurrent transactions is described below). The dynamic edge reflects an impact of concurrent transactions on data states.

The static edge and the dynamic edge collaboratively reflect acquisition method and technology of full-state data in a temporal database, and also reflect formation method and technology of the data states, that is, whether a data anomaly does not exist in current state data and concurrent transactions so that a transaction may be committed, where the full-state data includes the historical state data and the current state data, and the historical state data is readable.

5. Concurrent Transaction:

In the data state consistency model, each completed transaction may be ordered according to a logical clock, that is, commitment timestamps of transactions are globally ordered. As shown in FIG. 7, moments $t_0$ to $t_3$ may be sequenced by using the logical clock, and an old moment starts from to and gradually increases in an order of $t_0$, $t_1$, $t_2$, $t_3$, and the like.

When global order is ensured, concurrent transactions mean that two or more transactions that execute concurrently involve read and write operations on the same data item during transaction execution. By using two transactions as an example for description, if the two transactions perform read and write operations on the same variable in the same period of time, it is considered that the two transactions execute concurrently. Assuming that there are a transaction $T_1$ and a transaction $T_2$, if the two transactions meet $t_s(T_1)<t_c(T_2)$ and $t_s(T_2)<t_c(T_1)$, and have performed read and write operations on the same variable, that is, a transaction start moment $t_s$ of $T_1$ is less than the transaction commit moment $t_c$ of $T_2$, and a transaction start moment $t_s$ of $T_2$ is less than a transaction commitment moment $t_c$ of $T_1$, and the two transactions have performed the read and write operations on the same variable. In this case, it may be considered that $T_1$ and $T_2$ are concurrent transactions with each other.

In some embodiments, the transaction start moment has two different meanings: one is a transaction enabling moment, and the other is a moment when a first read operation or a write operation of the transaction starts. The two meanings may be used as a condition for determining concurrent transactions. The foregoing descriptions of the transaction start moment are mere examples, as the transaction start moment may vary in different example embodiments.

That is, the transaction start moment may have two defining times: first, the transaction start moment is the transaction enabling moment; and second, the transaction start moment is the moment when the first read operation or the write operation starts. Any one of the two defining times may be used as the condition for determining concurrent transactions. The foregoing descriptions of the transaction start moment are mere examples, as the transaction start moment may vary in different example embodiments.

A series of concurrent transactions in the same period of time may form a concurrent transaction set TS, and the concurrent transaction set TS=$\{T_1, T_2, \ldots, T_n\}$, where n is greater than or equal to t, and each transaction of n transactions has at least one transaction concurrent with the each transaction in the concurrent transaction set, that is to say, each transaction has a condition that "two transactions execute concurrently" in the concurrent transaction set. Each element (namely, transaction) in the TS may find at least one element that meets the condition that two transactions execute concurrently with the each element. A concurrent transaction set may also be referred to as a concurrent transaction. There is at least one "dynamic consistency state edge" (namely, dynamic edge) in a concurrent transaction set.

A transaction commitment algorithm is substantially used for verifying whether dynamic edge intersection exists between a target transaction and a concurrent transaction. If the dynamic edge intersection does not exist, it is considered that a data anomaly does not exist, and the target transaction may be committed; otherwise, it is considered that the data anomaly exists, and whether a currently generated data anomaly is forbidden to occur under a current isolation level may be determined according to isolation levels of a database system, so as to determine whether the target transaction enters a commitment phase or a rollback phase. In other words, it is determined whether the data anomaly generated by the target transaction is forbidden to occur under isolation levels specified in the embodiments of this application, so as to determine whether the target transaction enters the commitment phase or the rollback phase.

6. Dynamic Edge Intersection:

A definition of dynamic edge intersection is as follows: if two concurrent transactions operate two different variables, and each transaction operates respectively different states of different variables, and two dynamic edges cross each other between different states, which are referred to as dynamic edge intersection. The two different variables may refer to two different physical variables, for example, x and y, or $x_1$ and $x_2$; or, may refer to two different logical variables, for example, $\{x\}$ and $\{y_1, z_0\}$, where $\{x\}$ and $\{y_1, z_0\}$ are logical variables, and represent a combination of at least two variables.

Substantially, a dynamic edge is graphically a line segment of a transaction's operations between different variable versions on a matrix graph (a data state matrix), and is a read set and a write set of the transaction from a perspective of a set. Therefore, the dynamic edge intersection is substantially that whether a read-write set between two concurrent transactions $T_u$ and $T_v$ meets a certain condition. For detection of the dynamic edge intersection, two detection methods are provided in the embodiments of this application, and are described separately below.

Manner 1:

During initialization, an initial value of a dynamic line intersection (also referred to as dynamic edge intersection, DLI) value is set to 0, and an initial value of a variable state (VS) value is set to 0. The dynamic edge intersection value is used for representing a line segment intersection situation between different data items operated by the transaction $T_u$ and the transaction $T_v$ in the data state matrix, and the variable state value is used for representing that a situation of variables with different data states to which the transaction $T_u$ and the transaction $T_v$ operate.

Further, if a read set of the transaction $T_u$ and a write set of the transaction $T_v$ have an intersection and the intersection of the two is not an empty set, DLI=DLI++ is set, that is, DLI is set to a value obtained by adding 1 to an existing value, i.e., incrementing by one (this operation may be commonly referred to as "auto-increment of DLI by 1"); and if data states of a non-empty element in the intersection of the two are different, VS=VS++ is set, that is, VS is set to a value obtained by adding 1 to an existing value (auto-increment of VS by 1), in other words, if the intersection of the two has the same non-empty element that corresponds to at least two data states, VS=VS++ is set.

If a write set of the transaction $T_u$ and a read set of the transaction $T_v$ have an intersection and the intersection of the two is not the empty set, DLI=DLI++ is set, that is, DLI is set to a value obtained by adding 1 to an existing value (DLI auto-increment by 1); and if data states of a non-empty element in the intersection of the two are different, VS=VS++ is set, that is, VS is set to a value obtained by adding 1 to an existing value (auto-increment of VS by 1), in other words, if the intersection of the two has the same non-empty element that corresponds to at least two data states, VS=VS++ is set.

When the intersection does not exist between the write set of the transaction $T_u$ and the write set of the transaction $T_v$ (or the intersection of the two is the empty set), a situation of forbidding a write-write conflict to occur in basic rules being met may be ensured, that is, a dirty write data anomaly is forbidden to occur. If the DLI is greater than or equal to 2 and the variable state value VS is greater than or equal to 1, it is considered that dynamic edge intersection exists, that is, a data anomaly exists. Based on meeting the condition of determining dynamic edge intersection, a data anomaly type may be determined according to the variable state value VS. When VS=1, the data anomaly type is a read anomaly, including a non-repeatable read anomaly of one variable, a read skew anomaly of two variables, and a step read skew anomaly of three or more variables. When VS=2, the data anomaly type is a write anomaly, including a write skew anomaly of two variables and a sawtooth write skew anomaly of three or more variables.

Manner 2:

During initialization, a Boolean type is assigned to each transaction respectively, which is referred to as upper, and an upper value is initialized to false. The Boolean type is used for representing a vertical position relationship of a dynamic edge formed by the transaction in the data state matrix. By using any two concurrent transactions $T_u$ and $T_v$ as an example, if $T_u$.upper=true, it indicates that a dynamic edge formed by the transaction $T_u$ on a certain variable is newer than that of the other transaction $T_v$, that is to say, for the same variable, the transaction $T_u$ operates a newer variable version than the transaction $T_v$ on the variable.

Further, if an intersection exists between a read set of the transaction $T_u$ and a write set of the transaction $T_v$, for each variable x in the intersection, if a version of the variable x read by the transaction $T_u$ is greater than or equal to a version of the variable x written by the transaction $T_v$, for example, the transaction $T_u$ reads a variable version $x_2$ and the transaction $T_v$ writes a variable version $x_1$, $T_u$.upper=true is set; otherwise, if the version of the variable x read by the transaction $T_u$ is less than the version of the variable x written by the transaction $T_v$, for example, the transaction $T_u$ reads the variable version $x_1$ and the transaction $T_v$ writes the variable version $x_2$, $T_v$.upper=true is set. According to a comparison situation between the write set of $T_u$ and the read set of $T_v$, the rules may similarly assign upper values of the transaction $T_u$ and the transaction $T_v$.

If an intersection exists between a write set of the transaction $T_u$ and a read set of the transaction $T_v$, for each variable x in the intersection, if a version of the variable x read by the transaction $T_u$ is greater than a version of the variable x read by the transaction $T_v$, for example, the transaction $T_u$ reads a variable version $x_2$ and the transaction $T_v$ reads a variable version $x_1$, $T_u$.upper=true is set; if the version of the variable x read by the transaction $T_u$ is less than the version of the variable x read by the transaction $T_v$, for example, the transaction $T_u$ reads the variable version $x_1$ and the transaction $T_v$ reads the variable version $x_2$, $T_v$.upper=true is set; and if the version of the variable x read by the transaction $T_u$=the version of the variable x read by the transaction $T_v$, for example, both the transaction $T_u$ and the transaction $T_v$ reads the variable version $x_1$, any operation is not performed.

When the intersection does not exist between the write set of the transaction $T_u$ and the write set of the transaction $T_v$ (or the intersection of the two is an empty set), a situation of forbidding a write-write conflict to occur in basic rules being met may be ensured, that is, a dirty write data anomaly is forbidden to occur. In the above rules, after the write set of the transaction $T_u$ and the read set of the transaction $T_v$ are compared, the read set of the transaction $T_u$ and the write set of the transaction $T_v$ are compared, and the read set of the transaction $T_u$ and the read set of the transaction $T_v$ are compared respectively, if $T_u$.upper=$T_v$.upper=true, it is considered that dynamic edge intersection exists, that is, a data anomaly exists.

The dynamic edge intersection forms the data anomaly, which are analyzed as follows: a dynamic edge is formed by a transaction. If the transaction may successfully commit, the dynamic edge formed by the transaction is in a consistency state. Two dynamic edges maintain a consistency state respectively, and intersection means that the two dynamic edges cross consistency state edges of each other, and respectively operate (read and write) data in different states. Therefore, the data anomaly exists, and at least one transaction in a concurrent transaction set in which dynamic edge intersection occurs may roll back. Therefore, a reason for occurrence of the data anomaly is substantially that: concurrent transactions operate data that is not in the same data state, that is, the data anomaly is caused.

In the dynamic edge intersection, at least one dynamic edge includes an uncommitted transaction, and committed transactions may belong to concurrent transactions.

In the concurrent transaction set, if there are at least two dynamic edges on two same variables, by using two dynamic edges as an example, each line has three possibilities: a RR bevel edge, a RW bevel edge, and a WR bevel edge according to arrangement and combination (where the WW bevel edge is forbidden by basic rules that forbid a write-write conflict, so only three of the four possible combinations of read and write may be selected), there are a total of $C_3^1 * C_3^1$ (namely, 9) combinations. In view of the dynamic edges, each operation pair is for different variables. For example, if the RW bevel edge is for variables X and Y, an extension is "$R_1(X_0)W_1(Y_1)$". In a combination pair, for example, a RW-RW combination, assuming that a first RW pair of a transaction $T_1$ includes variables X and Y, a second RW pair of a transaction $T_2$ is for the variables Y and X. Because a dynamic edge (not a static edge) may be formed, different states of different data objects (namely, operation objects) are crossed. When an extension of the first RW pair is "$R_1(X_0)W_1(Y_1)$", an extension of the second RW pair can *be "$R_2(Y_0)W_2(X_1)$". Therefore, a complete operation sequence of the RW-RW combination may be: $R_1(X_0)R_2(Y_0)W_1(Y_1)W_2(X_1)$. However, there is not only one operation sequence, as the foregoing is merely one such example. There are various operation sequences that may form the dynamic edge intersection, and each combination may be discussed in detail below.

For three relationships WR-WR, WR-RR, and WR-RW in the foregoing nine combinations, an extension of a first "WR" operation pair is "$W_1(X_1)R_2(X_1)$", and under a read committed rule, the extension thereof may also be "$W_1(X_1)C_1R_2(X_1)$" which represents that a write transaction has committed. Therefore, the relationship cannot become the same transaction as a transaction in any subsequent combination (one of RR, RW, and WR). Therefore, the three combinations cannot form the dynamic edge intersection. C represents a commitment operation of a transaction T, for example, $C_1$ represents a commitment operation of the transaction $T_1$.

Through a further analysis, RW-RW, RR-RR, RW-RR, RW-WR, RR-WR, and RR-RW relationships in the nine combinations may form the dynamic edge intersection. Relationships between these modes are shown in Table 3 below, where RW-RW and RW-WR form basic modes, and remaining four modes are evolved from these two basic modes and may be referred to as first-level extension modes.

TABLE 3

| Number | Mode name | Operation sequence | Equivalence mode(a bolded part indicates that it may be merged into one transaction) | Data anomaly type |
|---|---|---|---|---|
| 1 | RW-RW | $R_1(X_0)R_2(Y_0)W_1(Y_1)W_2(X_1)$ | Basic mode | Write skew |

TABLE 3-continued

| Mode Number | Mode name | Operation sequence | Equivalence mode (a bolded part indicates that it may be merged into one transaction) | Data anomaly type |
|---|---|---|---|---|
| 2 | RW-RR | $R_1(X_0)R_2(Y_0)W_1(Y_1)R_2(X_1)$ | First-level extension mode $R_1(X_0)R_2(Y_0)W_1(Y_1)\mathbf{W_3(X_1)}$ $\mathbf{C_3R_2(X_1)}$ == $R_1(X_0)R_2(Y_0)W_1(Y_1)\mathbf{W_2(X_1)}$ | Write skew |
| 3 | RR-RW | $R_1(X_0)R_2(Y_0)W_2(X_1)R_1(Y_1)$ | First-level extension mode $R_1(X_0)R_2(Y_0)W_2(X_1)\mathbf{W_3(Y_1)}$ $\mathbf{C_3R_1(Y_1)}$ == $R_1(X_0)R_2(Y_0)W_2(X_1)\mathbf{W_1(Y_1)}$ | Write skew |
| 4 | | | First-level extension mode $R_1(X_0)R_2(Y_0)\mathbf{W_2(X_1)\,W_3(Y_1)}$ $\mathbf{C_3}R_1(Y_1)$ == $R_1(X_0)R_2(Y_0)W_2(X_1)\mathbf{W_2(Y_1)}\,R_1(Y_1)$ | Read skew |
| 5 | RW-WR | $R_1(X_0)W_2(X_1)W_2(Y_1)R_1(Y_1)$ | Basic mode | Read skew |
| 6 | RR-WR | $R_1(X_0)R_2(X_1)W_2(Y_1)R_1(Y_1)$ | First-level extension mode $R_1(X_0)\mathbf{W_3(X_1)}$ $\mathbf{C_3R_2(X_1)}\,W_2(Y_1)\,\mathbf{C_2}\,R_1(Y_1)$ == $R_1(X_0)\mathbf{W_2(X_1)}\,W_2(Y_1)\mathbf{C_2}\,R_1(Y_1)$ | Read skew |
| 7 | RR-RR | $R_1(X_0)R_2(Y_0)R_1(Y_1)R_2(X_1)$ == $R_1(X_0)R_2(Y_0)R_2(X_1)R_1(Y_1)$ | First-level extension mode $R_1(X_0)\,\mathbf{R_2(Y_0)\,W_3(Y_1)\,W_3(X_1)}$ $\mathbf{C_3R_2(X_1)}\,R_1(Y_1)$ == $R_1(X_0)\,\mathbf{W_2(Y_1)W_2(X_1)}\,R_1(Y_1)$ $R_1(X_0)\,\mathbf{R_2(Y_0)W_4(Y_1)\,C_4\,W_3(X_1)}$ $\mathbf{C_3R_2(X_1)}\,R_1(Y_1)$ == $R_1(X_0)\,\mathbf{W_2(Y_1)W_2(X_1)}\,R_1(Y_1)$ | Read skew |

The first-level extension modes are substantially the basic modes. Based on the first-level extension mode, a write operation of another concurrent and committed transaction is extended before a read operation, and may be converted into a basic mode by transaction merging. Therefore, identifying the first-level extension modes and the basic modes provides a theoretical basis for identifying complex concurrent transaction operation sequences, identifying the basic modes also provides a theoretical basis for identifying the first-level extension modes, and the two bases are referred to as a "mode equivalence principle".

According to the mode equivalence principle, the write operation extended in the first-level extension mode may appear in any operation position between read operations of two different transactions of the same variable, which is referred to a "mode extension equivalence principle". As a second write skew mode "$R_1(X_0)R_2(Y_0)W_1(Y_1)\,W_3(X_1)\,C_3R_2(X_1)$" in Table 3, a write operation and a commitment operation "$W_3(X_1)\,C_3$" of a transaction $T_3$ may appear in any operation position between "$R_1(X_0)$" and "$R_2(X_1)$", for example, equivalent forms of the second write skew mode in Table 3 may also include: "$R_1(X_0)\,W_3(X_1)R_2(Y_0)W_1(Y_1)(Y_1)R_2(X_1)$" and "$R_1(X_0)R_2(Y_0)\,W_3(X_1)W_1(Y_1)R_2(X_1)$".

The mode equivalence principle and the mode extension equivalence principle show that, if any operation sequence based on two variables has any basic mode or first-level extension mode described in Table 3 (the first-level extension mode is substantially the basic mode), a data anomaly exists; otherwise, the data anomaly does not exist.

Possible implementations of operation sequences of the above six modes (including two basic modes and four first-level extension modes) are described separately below:

1) An RW-RW relationship is formed on two variables: $R_1(X_0)R_2(Y_0)W_1(Y_1)W_2(X_1)$. In an operation sequence RW-RW, positions of a read operation and a read operation are interchangeable, and positions of a write operation and a write operation are interchangeable. The dynamic edge intersection directly forms a data anomaly, which corresponds to a conventional write skew anomaly.

2) An RW-RR relationship is formed on two variables: $R_1(X_0)R_2(Y_0)W_1(Y_1)R_2(X_1)$. In an operation sequence RW-RR, positions of first two read operation and read operation are interchangeable, and positions of last two write operation and read operation are interchangeable when the same variable is not involved. A variable version $X_1$ is caused by another transaction. Therefore, one transaction $T_3$ executes $W_3(X_1)$ between $R_1(X_0)$ and $R_2(X_1)$. Three transactions $T_1$ to $T_3$ are concurrent transactions, and form a write skew anomaly.

3) An RR-RW relationship is formed on two variables: $R_1(X_0)R_2(Y_0)W_2(X_1)R_1(Y_1)$. In an operation sequence RR-RW, positions of first two read operation and read operation are interchangeable. A variable version $Y_1$ is caused by another transaction. Therefore, one transaction $T_3$ executes $W_3(Y_1)$ before $R_1(Y_1)$ after $R_2(Y_0)$. Three transactions $T_1$ to $T_3$ are concurrent transactions. If the transaction $T_1$ and the transaction $T_3$ are merged into one logical transaction $\{T_1, T_3\}$, since a mode of the logical transaction becomes RW-RW, a conventional write skew anomaly is formed between the logical transaction $\{T_1, T_3\}$ and the transaction $T_2$, that is, $\{T_1, T_3\} \cap T_2$=the conventional write skew anomaly. If the transaction $T_2$ and the transaction $T_3$ are merged into one logical transaction $\{T_2, T_3\}$, since a mode of the logical transaction becomes RW-WR, a conventional read skew anomaly is formed between the logical transaction $\{T_2, T_3\}$ and the transaction $T_1$, that is, $\{T_2, T_3\} \cap T_1$=the conventional read skew anomaly.

4) An RW-WR relationship is formed on two variables: $R_1(X_0)W_2(X_1)W_2(Y_1)R_1(Y_1)$. An operation sequence RW- WR forms a conventional read skew anomaly. Under a read committed rule, the operation sequence is actually "$R_1 (X_0) W_2 (X_1) W_2 (Y_1) C_2 R_1 (Y_1)$", to ensure that $R_1 (Y_1)$ is executed successfully.

5) An RR-WR relationship is formed on two variables: $R_1 (X_0) W_2 (Y_1) R_2 (X_1) R_1 (Y_1)$. In an operation sequence RR-WR, positions of first two read operation and write operation are interchangeable, and positions of later two read operation and read operation are also interchangeable. A variable version $X_1$ is caused by another transaction. Therefore, one transaction $T_3$ executes $W_3 (X_1)$ before $R_2 (X_1)$ after $R_1 (X_0)$. Three transactions $T_1$ to $T_3$ are concurrent transactions, and form a conventional read skew anomaly.

6) An RR-RR relationship is formed on two variables: $R_1 (X_0) R_2 (Y_0) R_1 (Y_1) R_2 (X_1)$. In an operation sequence RR-RR, positions of first two read operation and read operation are interchangeable, and positions of later two read operation and read operation are interchangeable. A variable version $X_1$ and a variable version $Y_1$ are caused by other transactions. Therefore, one transaction $T_3$ may execute $W_3 (Y_1) W_3 (X_1)$ before $R_1 (Y_1) R_2 (X_1)$ after $R_1 (X_0) R_2 (Y_0)$; or two transactions may separately execute $W_3 (Y_1)$ and $W_4 (X_1)$. Three or four transactions ($T_1$ to $T_3$ or $T_1$ to $T_4$) are concurrent transactions, and also correspond to a conventional read skew anomaly.

When the dynamic edge intersection occurs, an uncommitted transaction in at least one dynamic edge may be rolled back, so as to resolve a reason for generating the data anomaly and ensure the data state consistency in the database system.

7. Data State History:

A data object is represented by X, and change of a value of X may form a data history. From a perspective of variables, change of variable versions forms a data history. A data history of a variable X is as follows:

Data history=DH=$X_0, X_1, \ldots, X_i, X_{i+1}, \ldots, X$ where, $X_i$ is referred to as a variable version, $0 \leq i \leq m$, and m is a largest version number of the variable X;

$X_0$ is an initial version of data, indicating that the data object X exists, and a value is $X_0$; and $X_1$ and $X_{i+1}$ are adjacent variable versions, and $X_i$ is referred to as a before-image of $X_{i+1}$.

Version transition means that the variable version $X_i$ is changed to the variable version $X_{i+1}$ when a write operation occurs.

When a read operation or a write operation occurs, a data history of data states has a before-image corresponding to the read operation or the write operation.

In an example, by using $W_1 (X_0-X_1)$ as an example, $X_0-X_1$ represents that in a transaction $T_1$, a before-image is $X_0$, and a new version generated through a write operation is $X_1$; and Multiple consecutive writing of the same transaction (that is, at least two consecutive writing) does not form at least two variable versions, that is, when before-images are the same, at least two variable versions are not formed.

In an example, $R_2 (X_2)$ represents that in a transaction $T_2$, a before-image is $X_2$.

8. Data State Matrix:

Horizontal direction: n variables are arranged horizontally from left to right, and are respectively referred to as X, Y, Z, ..., or represented by $a_1, a_2, a_3, \ldots$.

Vertical direction: a data history of data states of a single variable.

Data versions including n data and at most m data states that are formed by the horizontal direction and the vertical direction form an n*m matrix, which is referred to as a data state matrix. A schematic diagram of a static edge shown in FIG. 7 is a part of the data state matrix.

Bevel edges formed between concurrent transactions are formally connection lines between variable versions of different variables in the data state matrix, and are also a part of the data state matrix. A dynamic edge formed by each concurrent transaction in the concurrent transaction is a dynamic consistency state edge that has yet to be verified whether to maintain a legal state. If the transaction may be successfully committed, the dynamic edge is legal, and the dynamic edge also becomes a static edge.

One or more concurrent transactions on the data state matrix operate variable versions, thereby forming one or more dynamic edges. In a group of concurrent transactions, if there is one dynamic edge, a transaction represented by the dynamic edge is committed. This is because a single dynamic edge does not violate a consistency state, that is, does not cross a consistency state edge, or the dynamic edge intersection does not exist; and if two dynamic edges form dynamic edge intersection, a transaction corresponding to at least one dynamic edge may be rolled back, to avoid dynamic damage to a consistency data state formed by the other dynamic edge.

Substantially, the data state matrix is an operation and life space of concurrent transactions. Historical transactions are precipitated in the space (dynamic edges are transformed into static edges), and concurrent transactions with or without conflicts occur in this space (currently existing dynamic edges).

9. Dynamic Edge Merging:

For two concurrent transactions, a consistency state edge of each transaction (that is, a dynamic edge) either has a data anomaly (dynamic edge intersection), or may be merged (that is, there is no data anomaly). That is to say, if two concurrent transactions have dynamic edge intersection, a data anomaly exists; otherwise, dynamic edges of the two transactions may be merged.

Merging of two transactions may be divided into three dimensions of merging, namely transaction merging, variable merging, and data state merging, which are described separately below:

1) Transaction merging: in a concurrent transaction set, if a transaction $T_1$ (represented as $\{T_1\}$) and a transaction $T_2$ (represented as $\{T_2\}$) may form a dynamic edge, the transaction $T_1$ and the transaction $T_2$ may be merged into a logical transaction (represented as $\{T_1, T_2\}$). Merging of the transaction $T_1$ and the transaction $T_2$ refers to merging read-write sets of the transaction $T_1$ and the transaction $T_2$ respectively, which means that a read set of the transaction $T_1$ and a read set of the transaction $T_2$ are merged, and a write set of the transaction $T_1$ and a write set of the transaction $T_2$ are merged. An important condition for transaction merging is that dynamic edge intersection does not exist between merged transactions. If the dynamic edge intersection exists between the two transactions, the two transactions cannot be merged. Dynamic edge merging formally refers to merging concurrent transactions into one logical transaction, and substantially merging read-write sets of concurrent transactions separately.

2) Variable merging: in a process of transaction merging, if a read set of a merged transaction includes variable versions $X_i$ and $Y_j$, and a merged write set includes variable versions $X_{(i+1)}$ and $Y_{(j+1)}$, variable merging is further performed in this case, and variables X and Y may be merged into one logical variable $\{X, Y\}$, that is, the read set of the merged transaction includes a variable version $\{X_i, Y_j\}$, and the write set of the merged transaction includes a variable version $\{X_{(i+1)}, Y_{(j+1)}\}$.

3) Data state merging: if at least two states of a variable are involved in the process of transaction merging, for example, $X_i$ and $X_{(i+1)}$, the variable may become $\{X_{(i,\ i+1)}\}$ when being merged vertically.

Definition of dynamic edge merging: if every two dynamic edges belonging to two transactions respectively have no dynamic edge intersection, the two transactions are merged into one logical transaction, and follow the foregoing transaction merging rules; and after transaction merging, read sets and write sets of the two transactions follow the variable merging rules. However, for the same variable, different variable versions (that is, data versions of different states) are not merged, that is, data state merging is not performed.

Based on the above, a reduction rule is proposed to formally explain a manner for simplifying a complex concurrent operation sequence to a basic operation sequence, so as to determine a concurrent operation sequence. Reduction rules are used when the extended first-level extension modes are simplified to the basic modes in Table 3. By using an example in which the first-level extension modes are merged to the basic modes, two different reduction rules are described below.

In some embodiments, when the first-level extension modes are merged to the basic modes, for example, a format of "$W_3 (Y_1) C_3 R_1 (Y_1)$", a reduction rule thereof is that: if variables are in the same state, a write operation is retained (a read operation is removed); and for a transaction number (may also become a transaction identification), a transaction number of the read operation is retained (a transaction number of the write operation is removed), which are equivalent to that two dynamic edges between a transaction $T_1$ and a transaction $T_3$ are merged. For example, modes of which numbers are 2, 3, and 6 in Table 3 all conforms to the reduction rule. For RR-RW modes with numbers 3 and 4, since different reduction rules are used, the modes finally correspond to different data anomalies after simplification. If the reduction rule is used for merging, the data anomaly is considered as write skew (number 3) rather than read skew (number 4).

In some embodiments, when the first-level extension modes are merged to the basic modes, for example, a format of "$R_2 (Y_0) W_3 (Y_1)$", a reduction rule thereof is that: for the same variable, a write operation is retained (a read operation is removed); for a transaction number, a transaction number of the read operation is retained (a transaction number of the write operation is removed); and for a variable state, a newest variable state is retained, which are equivalent to that dynamic edges between a transaction $T_2$ and a transaction $T_3$ are merged. For example, two first-level extension modes with number 7 in Table 3 conform to the reduction rule during simplification. Certainly, an RR-RW mode with number 4 is considered as a read skew anomaly due to exactly using the reduction rule.

In the above description, the data state consistency model is provided, and concurrent transactions meet the above various constraints, that is, conform to the data state consistency model.

Based on the data state consistency model, data anomalies may be defined below based on the read committed rule:

1. Anomaly Point:
When an operation (read, write, commit, rollback) occurs and dynamic edge intersection is formed, an anomaly forms, which is referred to as an anomaly formation point, or an anomaly point for short. The formation of the anomaly point includes the following two types.

1) Read and write operation level: when a read or write operation occurs, an anomaly forms, which is referred to as a read and write operation level anomaly point, or an operation-level anomaly point for short in this case.

2) Transaction level: which is not the operation-level anomaly. When a transaction is committed or rolled back, an anomaly forms, which is referred to as a transaction-level anomaly point in this case.

Anomalies corresponding to the two different types of anomaly points are referred to as operation-level anomalies and transaction-level anomalies, respectively.

In addition, the two different types of anomaly points also affect concurrency of transactions, which is described in detail in the following description for concurrency.

2. Concurrency:
If two transactions meet $t_s(T_1) < t_c(T_2)$ and $t_s(T_2) < t_c(T_1)$, it is referred to as two transactions that are parallel, or parallel transactions.

Based on that the two transactions are parallel, if the two transactions have operated on at least one data object, it is referred to as the transactions that are concurrent, or concurrent transactions.

An intersection of read-write sets (that is, a read set and a write set) of the two concurrent transactions is not an empty set, data objects that are jointly operated on (in fact, objects of a version of data) are obtained. A first operation and a last operation of these data objects in each transaction may form an interval, which is referred to as a conflict zone, or a first anomaly interval. An interval between an upper bound (a maximum value point) of the conflict zone and a transaction-level anomaly point is referred to as a second anomaly interval.

An anomaly in the conflict zone/first anomaly zone forms, that is, an operation-level anomaly forms. A life cycle of a transaction corresponding to the operation-level anomaly is short, and concurrency of the transaction and another transaction is low. This situation is referred to as a first level of concurrency, a first level for short. The short life cycle herein is not resulted from transaction semantics of a user, but resulted from a risk that the transaction is forced to be rolled back when the anomaly has occurred.

A transaction corresponding to the transaction-level anomaly may continue to exist in the second anomaly interval (the transaction has a long life cycle), and concurrency of the transaction and another transaction is high. This situation is referred to as a second level of concurrency, a second level for short. First-level concurrency is less than second-level concurrency.

3. Anomaly Classification:
(3.1) According to a quantity of variables involved in data anomalies, the data anomalies may be divided into a uni-variable anomaly and a multi-variable anomaly. The uni-variable anomaly refers to a data anomaly involving one variable, and the multi-variable anomaly refers to a data anomaly involving two or more variables.

(3.2) According to whether variables involved in data anomalies are stored on the same data node device (also referred to as sub-nodes), the data anomalies may be divided into a distributed anomaly and a local anomaly.

A. Distributed anomaly: if variables involved in one multi-variable anomaly are not all stored on one sub-node, the anomaly is referred to as a distributed anomaly, and a distributed anomaly is a multi-variable anomaly.

B. Local anomaly: a univariable anomaly is also referred to as a local anomaly (a univariable anomaly is a local anomaly). A phantom read anomaly is special, although at least two variables are involved, with a predicate as a unit, a batch of read data may be considered as "one" variable, and newly added data that conforms to the predicate is attached to the predicate. Therefore, the phantom read anomaly also belongs to the local anomaly. A data anomaly that is not the distributed anomaly is the local anomaly. In addition, one multi-variable anomaly may also occur on the same sub-node (that is, all involved variables are stored on one sub-node), and in this case, the multi-variable anomaly is also the local anomaly.

(3.3) According to whether read and write operations of concurrent transactions directly target variable versions existing in a data state matrix and a time at which anomalies occur, and other factors, data anomalies may be divided into a generalized anomaly and a narrow anomaly. Anomalies that may be detected by the data state matrix proposed in the embodiments of this application belong to the narrow anomaly.

(3.3.1) Narrow anomaly: including an entity data anomaly, an incorporeal data anomaly, and a constraint anomaly.

A. Entity data anomaly (also referred to as entity type of data anomaly): based on the data state matrix, an anomaly caused by that read and write operations of concurrent transactions directly target variable versions existing in the data state matrix is referred to as an entity data anomaly. For example, anomalies such as dirty write, dirty read, intermediate read, non-repeatable read, lost update, read skew, read and write skew, write skew, and step read skew belong to entity data anomaly. A characteristic of this type of anomaly is that the data objects of read and write operations of concurrent transactions already exist in an operation sequence, rather than including related data objects through predicates.

B. Incorporeal data anomaly (also referred to as virtual type of data anomaly): based on the data state matrix, an anomaly caused by that read and write operations of concurrent transactions include related data objects through predicates is referred to an incorporeal data anomaly, and operation semantics of the anomaly has been clarified when an operation occurs. For example, for a phantom read anomaly, when a second predicate read operation occurs, the phantom read anomaly forms, and belongs to an operation-level semantic anomaly. The operation-level semantic anomaly belongs to the incorporeal data anomaly.

C. Constraint anomaly: at a transaction commitment node, a consistency state of data of the database violates pre-defined data constraints, which is referred to as a constraint anomaly. For example, for anomalies such as predicate write skew, write skew, and sawtooth write skew, operation semantics of this type of anomaly are not clear when an operation occurs, and after a result is formed, the result may be verified according to predefined semantics, which belongs to a result-level semantic anomaly. The result-level semantic anomaly belongs to the constraint anomaly. Since this type of anomaly is related to constraints defined by a user, the constraint anomaly is not considered in the data state consistency model in the embodiments of this application.

(3.3.2) Generalized anomaly: in addition to the anomalies described by the narrow anomaly, a read half-committed anomaly is also included.

The read half-committed anomaly is an anomaly occurring in a distributed scenario, and a reason thereof is that commitment times of a distributed transaction on each node device is inconsistent. When a concurrent read transaction accesses data, some node devices have committed, but some node devices have not committed, resulting in inconsistency of read data. Since discussion on anomalies in the embodiments of this application focuses on a stand-alone scenario, the read half-committed anomaly is not considered in the data state consistency model in the embodiments of this application.

4. Data Anomaly Type:

According to the above data state consistency model, twelve types of data anomalies are defined in the embodiments of this application, including the dirty write data anomaly, the dirty read data anomaly, the intermediate read data anomaly, the non-repeatable read data anomaly, the phantom read data anomaly, the lost update data anomaly, the read skew data anomaly, the step read skew data anomaly, the write skew data anomaly, the predicate write skew data anomaly, and sawtooth write skew data anomaly, which are described in detail below.

1) Dirty Write Data Anomaly:

Definition: a data anomaly in the form of an operation sequence $w_1[x_1] \ldots w_2[x_2] \ldots$. The dirty write data anomaly belongs to the operation-level anomaly.

However, the definition of the operation sequence of the dirty write data anomaly cannot be: $w_1[x] \ldots w_2[x] \ldots \{(c_1$ or $a_1)$ and $(c_2$ or $a_2)$ in any order$\}$. A combination of an ordered pair $(a_2, c_1)$ or $(a_2, a_1)$ cannot cause data inconsistency, but may consume resources of a central processing unit (CPU) due to performing a write operation and a rollback operation. Therefore, rather than having to perform the rollback operation after the write operation, it is better to directly forbid the anomaly to occur in the definition.

For any transaction $T_u$ ($u \geq 1$), cu refers to committing the transaction $T_u$, and $a_u$ refers to rolling back the transaction $T_u$. For example, $c_1$ refers to committing a transaction $T_1$, as refers to rolling back a transaction Ta.

2) Dirty Read Data Anomaly:

Definition: a data anomaly in the form of an operation sequence $w_1[x_1] \ldots r_2[x_1] \ldots \{a_1$ and $c_2\}$. The dirty read data anomaly belongs to the transaction-level anomaly.

However, the definition of the operation sequence of the dirty read data anomaly cannot be: $w_1[x_1] \ldots r_2[x_1] \ldots \{a_1$ and $c_2$ in either order$\}$. This is because if $c_2$ is first completed, when $c_1$ occurs, whether a transaction $T_1$ is allowed to be committed or rolled back, the data anomaly is caused.

In the definition of the dirty read data anomaly, if $a_1$ changes to $c_1$, there is no data anomaly. Therefore, it can only be $a_1$. If $c_2$ changes to $a_2$, there is no anomaly. Therefore, it can only be $c_2$. If $a_1$ first occurs, $c_2$ is rolled back to eliminate the anomaly when occurring. Therefore, whether a data anomaly exists may be effectively identified when a commitment or rollback operation of a transaction is performed. Therefore, the dirty read data anomaly is the transaction-level anomaly.

3) Intermediate Read Data Anomaly:

Definition: a data anomaly in the form of an operation sequence $w_1(x_1) \ldots r_2(x_1) \ldots w_1(x_2) \ldots \{c_1$ and $c_2\}$. The intermediate read data anomaly belongs to the transaction-level anomaly.

However, the definition of the operation sequence of the intermediate read data anomaly cannot be: $w_1[x_1] \ldots r_2[x_1] \ldots w_1(x_2) \ldots \{c_1$ and $c_2$ in either order$\}$. This is because if $c_2$ is first completed, when $c_1$ occurs, whether a transaction $T_1$ is allowed to be committed or rolled back, the data anomaly is caused.

In the definition of the intermediate read data anomaly, if $c_1$ changes to $a_1$, the anomaly is dirty read. Therefore, it can only be $c_1$. If $c_2$ changes to $a_2$, there is no anomaly. Therefore, it can only be $c_2$.

4) Fuzzy or Non-Repeatable Read Data Anomaly:

Definition: a data anomaly in the form of an operation sequence $r_1[x_0] \ldots w_2[x_1] \ldots c_2 \ldots r_1[x_1]$. The non-repeatable read data anomaly belongs to the operation-level anomaly.

However, the definition of the operation sequence of the non-repeatable read data anomaly cannot be: $r_1[x_0] \ldots w_2[x_1] \ldots c_2 \ldots r_1[x_1] \ldots c_1$. Because a transaction $T_2$ has been committed, even if $c_1$ occurs in a transaction $T_1$, a final result can be that the transaction $T_2$ is rolled back to eliminate the anomaly.

5) Phantom Read Data Anomaly:

Definition: a data anomaly in the form of an operation sequence $r_1[P] \ldots w_2[x \text{ in } P] \ldots c_2 \ldots r_1[P]$. The phantom read data anomaly belongs to the operation-level anomaly.

However, the definition of the operation sequence of the phantom read data anomaly cannot be: $r_1[P] \ldots w_2[x \text{ in } P] \ldots c_2 \ldots r_1[P] \ldots c_1$. Because a transaction $T_2$ has been committed, even if $c_1$ occurs in a transaction $T_1$, a final result can be that the transaction $T_1$ is rolled back to eliminate the anomaly.

6) Lost Update Data Anomaly:

Definition: a data anomaly in the form of an operation sequence $r_1[x_0] \ldots w_2[x_1] \ldots c_2 \ldots w_1[x_2]$ or $rc_1[x_0] \ldots w_2[x_1] \ldots c_2 \ldots w_1[x_2]$. The lost update data anomaly belongs to the operation-level anomaly.

However, the definition of the operation sequence of the lost update data anomaly cannot be: $r_1[x_0] \ldots w_2[x_1] \ldots c_2 \ldots w_1[x_2]$ or $rc_1[x_0] \ldots w_2[x_1] \ldots c_2 \ldots w_1[x_2] \ldots c_1$. Because a transaction $T_2$ has been committed, even if $c_1$ occurs in a transaction $T_1$, a final result can be that the transaction $T_1$ is rolled back to eliminate the anomaly.

7) Read Skew Data Anomaly:

Definition: a data anomaly in the form of an operation sequence $r_1[x_0] \ldots w_2[x_1] \ldots w_2[y_1] \ldots c_2 \ldots r_1[y_1]$. The read skew data anomaly belongs to the operation-level anomaly.

However, the definition of the operation sequence of the read skew data anomaly cannot be: $r_1[x_0] \ldots w_2[x_1] \ldots w_2[y_1] \ldots c_2 \ldots r_1[y_1] \ldots (c_1)$. A transaction $T_1$ can be rolled back.

In some embodiments, if a read committed rule is not defined, the definition of read skew may be modified to: $r_1[x_0] \ldots w_2[x_1] \ldots w_2[y_1] \ldots r_1[y_1] \ldots \{c_1 \text{ and } c_2 \text{ in either order}\}$.

8) Read and Write Skew Data Anomaly:

Definition: a data anomaly in the form of an operation sequence $r_1[x_0] \ldots w_2[x_1] \ldots w_2[y_1] \ldots c_2 \ldots w_1[y_2]$. The read and write skew data anomaly belongs to the operation-level anomaly.

However, the definition of the operation sequence of the read and write skew data anomaly cannot be: $r_1[x_0] \ldots w_2[x_1] \ldots w_2[y_1] \ldots c_2 \ldots w_1[y_2] \ldots (c_1)$. A transaction $T_1$ can be rolled back.

In some embodiments, if a read committed rule is not defined, the definition of the read and write skew data anomaly may be modified to: $r_1[x_0] \ldots w_2[x_1] \ldots w_2[y_1] \ldots w_1[y_2] \ldots \{c_1 \text{ and } c_2 \text{ in either order}\}$.

9) Step Read Skew Data Anomaly:

Definition: a data anomaly in the form of an operation sequence $r_1[x_0] \ldots w_2[x_1] \ldots w_2[y_1] \ldots c_2 \ldots w_3[y_2] \ldots w_3[z_1] \ldots c_3 \ldots r_1[z_1]$. The step read skew data anomaly is also referred to as a stepped data anomaly, and belongs to the operation-level anomaly.

However, the definition of the operation sequence of the step read skew data anomaly cannot be: $r_1[x_0] \ldots w_2[x_1] \ldots w_2[y_1] \ldots c_2 \ldots w_3[y_2] \ldots w_3[z_1] \ldots c_3 \ldots r_1[z_1] \ldots c_1$. A first reason is that once $r_1[z_1]$ is performed, dynamic edge intersection immediately forms; and a second reason is that the transaction cannot be successfully committed, and there is no way to resolve the anomaly other than selecting to rollback. Therefore, occurrence of $c_1$ in the definition is of no value.

"$w_2[y_1] \ldots c_2 \ldots w_3[y_2]$" is a step, and the step mode may extend or transform any at least two non-x and non-z variables and transactions, for example, extend a variable B and a transaction $T_4$ (a transaction situation is shown in Table 4), then extend three variables B, D, E and three transactions $T_4$, $T_5$, $T_6$ (transaction situations are shown in Table 5), and the like.

TABLE 4

| Transaction $T_1$ | Transaction $T_2$ | Transaction $T_3$ | Transaction $T_4$ |
|---|---|---|---|
| $R_1$-$X_0$ | | | |
| | $W_2$-$X_1 W_2$-$Y_1$ $C_2$ | | |
| | | $W_3$-$Y_2$ $W_3$-$B_1$ $C_3$ | |
| | | | $W_4$-$B_2 W_4$-$Z_1 C_4$ |
| $R_1$-$Z_1$ | | | |

TABLE 5

| Transaction $T_1$ | Transaction $T_2$ | Transaction $T_3$ | Transaction $T_4$ | Transaction $T_5$ | Transaction $T_6$ |
|---|---|---|---|---|---|
| $R_1$-$X_0$ | | | | | |
| | $W_2$-$X_1$ | | | | |
| | $W_2$-$Y_1$ $C_2$ | | | | |
| | | $W_3$-$Y_2$ | | | |
| | | $W_3$-$B_1$ $C_3$ | | | |
| | | | $W_4$-$B_2$ | | |
| | | | $W_4$-$D_1$ $C_4$ | | |
| | | | | $W_5$-$D_2$ | |
| | | | | $W_5$-$E_1$ $C_5$ | |
| | | | | | $W_6$-$E_2$ $W_6$-$Z_1$ |
| $R_1$-$Z_1$ | | | | | |

The step read skew data anomaly includes three or more variables, and an extension form thereof at least includes that two transactions write the same variable and one of the transactions has been committed.

10) Write Skew Data Anomaly:

Definition: a data anomaly in the form of an operation sequence $r_1[x_0] \ldots r_2[y_0] \ldots w_1[y_1] \ldots w_2[x_1]$. The write skew data anomaly belongs to the operation-level anomaly.

However, the definition of the operation sequence of the write skew data anomaly cannot be: $r_1[x_0] \ldots r_2[y_0] \ldots w_1[y_1] \ldots w_2[x_1] \ldots \{c_1 \text{ and } c_2 \text{ in either order}\}$. When a second write operation in the definition is completed, an anomaly forms, and either a transaction $T_1$ or transaction $T_2$ may be selected for rollback. The write skew data anomaly does not have to be defined by constraints between variables x and y, and may also be identified by dynamic edge intersection.

11) Predicate Write Skew Data Anomaly:

Definition: a data anomaly in the form of an operation sequence $r_1[P] \ldots r_2[P] \ldots w_1[y_1 \text{ in } P] \ldots w_2[x_1 \text{ in } P] \ldots \{c_1 \text{ and } c_2 \text{ in either order}\}$. The predicate write skew data anomaly belongs to the transaction-level anomaly. When a second transaction is committed, the predicate write skew data anomaly occurs, and anomaly elimination can be performed by rolling back the committed transaction.

However, the definition of the operation sequence of the predicate write skew data anomaly cannot be: $r_1[P] \ldots r_2[P] \ldots w_1[y_1$ in $P] \ldots w_2[x_1$ in $P]$. To improve anomaly identification efficiency, when a transaction is committed, the transaction may be verified through constraints explicitly defined by a user.

The predicate write skew data anomaly also has an extension capability, and an extension form thereof is: $r_u[P] \ldots w_u[v_1$ in $P]$. The predicate write skew data anomaly may extend from 0 to any at least two. The predicate write skew data anomaly has an extension capability similar to an extension method from the write skew data anomaly to the sawtooth write skew data anomaly, that is, an extension method of the predicate write skew data anomaly is similar to extension of the sawtooth write skew data anomaly. The sawtooth write skew data anomaly is described in detail in next item.

The predicate write skew data anomaly cannot be identified through dynamic edge intersection, and may be identified through an integrity constraint, for example $r_1[P]$ does not include an object x, but $w_2[x_1$ in $P]$ includes the object x, so that connection between a vertical edge and a bevel edge of the same transaction cannot be formed, that is, there is no dynamic edge. Therefore, the predicate write skew data anomaly is forced to be defined as the transaction-level anomaly.

12) Sawtooth Write Skew Data Anomaly:

Definition: a data anomaly in the form of an operation sequence $r_1[x_0] \ldots r_2[y_0] \ldots r_3[z_0] \ldots w_1[y_1] \ldots w_2[z_1] \ldots w_3[x_1]$. The sawtooth write skew data anomaly belongs to the operation-level anomaly.

However, the definition of the operation sequence of the sawtooth write skew data anomaly cannot be: $r_1[x_0] \ldots r_2[y_0] \ldots r_3[z_0] \ldots w_1[y_1] \ldots w_2[z_1] \ldots w_3[x_1] \ldots \{c_1$ and $c_2$ and $c_3$ in any order$\}$. When a write operation occurs, the anomaly forms. The sawtooth write skew data anomaly includes three and more variables.

FIG. 8 is a schematic principle diagram of a sawtooth write skew anomaly according to an embodiment of this application. FIG. 8 shows a sawtooth write skew data anomaly with three variables formed by a transaction operation sequence. A transaction $T_1$ reads a variable version $z_0$ and writes the variable version in a variable version $x_1$, which is recorded as "R ($z_0$) W ($x_1$)"; a transaction $T_2$ reads a variable version $y_0$ and writes the variable version in a variable version $z_1$, which is recorded as "R ($y_0$) W ($z_1$)"; and a transaction $T_3$ reads a variable version $x_0$ and writes the variable version in a variable version $y_1$, which is recorded as "R ($x_0$) W ($y_1$)". Consistency state edges of the transactions $T_1$ to $T_3$ are shown as 800. A sawtooth write skew data anomaly with any at least two variables may also be extended based on the sawtooth write skew data anomaly with three variables.

An extension method thereof is shown as 801, copied content after variables and transaction relationships in a block 802 are copied any number of times may be put into the block 802, to extend quantities of variables and transactions. An operation mode in the block 802 may be abstracted as $R_u (k_0) W_u (b_1)$, the mode is a sawtooth, and $k_0$ may be $x_0$ or any other variable. However, a finally extended sawtooth is connected to $x_0$ through a read operation, and the transaction $T_3$ may read b0. Substantially, a part related to a variable y in FIG. 8 is also a sawtooth, but is different from an effective component of write skew (including at least 3 variables) when being used as a sawtooth wave. Therefore, the part shall not be mentioned when describing the extension method of the sawtooth write skew data anomaly.

The above operation mode $R_u (k_0) W_u (b_1)$ may also be transformed into the following modes: $R_u (k_0) W (b_1) R_u (b_1)$. During extension, the sawtooth write skew data anomaly may extend from 0 to any at least two sawteeth.

Apparently, the write skew data anomaly and the sawtooth write skew data anomaly are substantially the same type of anomaly (write anomaly), but when being described in mathematical form, according to a difference in a quantity of variables, a write anomaly involving two variables is referred to as the write skew data anomaly, and a write anomaly involving three or more variables is referred to as the sawtooth write skew data anomaly, thereby helping distinguish them from the conventional data anomaly definition. In the conventional definition, the write skew data anomaly is described, there are two variables, and scalability of this type of anomaly is not considered, but the embodiments of this application consider an infinite extension capability of the anomaly. A relationship between the read skew data anomaly and the step read skew data anomaly is the same as a relationship between the write skew data anomaly and the sawtooth write skew data anomaly.

Based on the above detailed definitions for data anomaly types, in the embodiments of this application, new isolation levels are defined for a database system, and the definitions of the isolation levels follow the following principles: according to a process of concurrency from high to low, data consistency thereof is from weak to strong, and allowed data anomalies change from at most to none. Five isolation levels: read/write uncommitted, read/write committed, snapshot history, repeatable read, and serializable are included, and relationships between the five isolation levels and data anomalies are shown in Table 6 below.

TABLE 6

| | Level | | | | |
|---|---|---|---|---|---|
| Anomaly | Read/write uncommitted | Read/write committed | Snapshot history | Repeatable read | Serializable |
| Dirty write | Allowed | Not allowed | Not allowed | Not allowed | Not allowed |
| Dirty read | Allowed | Not allowed | Not allowed | Not allowed | Not allowed |
| Intermediate read | Allowed | Not allowed | Not allowed | Not allowed | Not allowed |
| Non-repeatable read | Allowed | Allowed | Allowed | Not allowed | Not allowed |
| Phantom read | Allowed | Allowed | Allowed | Not allowed | Not allowed |
| Lost update | Allowed | Allowed | Not allowed | Not allowed | Not allowed |
| Read skew | Allowed | Allowed | Not allowed | Not allowed | Not allowed |
| Read and write skew | Allowed | Allowed | Not allowed | Not allowed | Not allowed |
| Step read skew | Allowed | Allowed | Not allowed | Not allowed | Not allowed |
| Write skew | Allowed | Allowed | Allowed | Not allowed | Not allowed |

TABLE 6-continued

| | Level | | | | |
|---|---|---|---|---|---|
| Anomaly | Read/write uncommitted | Read/write committed | Snapshot history | Repeatable read | Serializable |
| Predicate write skew | Allowed | Allowed | Allowed | Allowed | Not allowed |
| Sawtooth write skew | Allowed | Allowed | Allowed | Not allowed | Not allowed |

1. Read/write uncommitted (RWU) level: for an intermediate state of an uncommitted transaction, data thereof is readable and writable, the readable makes dirty read possible, and the writable makes dirty write possible. A difference between the RWU isolation level and the conventional "read uncommitted" level is that, the RWU isolation level does not block concurrent write operations. That is, the conventional read uncommitted does not allow the dirty write anomaly to occur, and the RWU isolation level allows the dirty write anomaly to occur.

2. Read/write uncommitted (RWC) level: data in a committed state is readable and writable. The readable avoids the dirty read anomaly, that is, a data state during transaction execution cannot be read. The writable avoids the dirty write anomaly, that is, the data state during transaction execution cannot be written/covered. A difference between the RWC isolation level and the RWU isolation level is that, the RWC isolation level forbids concurrent write operations.

3. Snapshot history (SH): SH may read committed data in read history based on any historical time point (this time point may be a latest moment of a system, but cannot be a certain moment in the future). That is, a static edge is found in a data state matrix, and the static edge represents a consistency state of the data at a certain historical moment, so the consistency of the read data can be maintained. A difference between the SH and the RWC is that, the SH forbids the lost update anomaly, the read skew anomaly, the read and write skew anomaly, and the step read skew anomaly. A difference between the SH and the conventional "snapshot" level given by Jim Grey is that, the SH level in this definition allows the phantom read anomaly and the non-repeatable read anomaly to occur. This is because the snapshot technology is substantially a static edge technology, and the static edge always represents a fait accompli, that is, "immutable history", while operation sequences corresponding to the phantom read anomaly and the non-repeatable read anomaly have two read operations of two histories, which are similar operations and should be classified as one type rather than being separated.

4. Repeatable Read (RR): For read operations without predicates, that is, data objects read by any two read operations in a transaction are always the same (because the data objects are not modified by other transactions, concurrency of the system is reduced). The RR isolation level is a level established based on the SH isolation level. A difference between the two is that, the RR isolation level forbids other anomalies in addition to data anomalies related to predicate semantics, that is, compared with the SH isolation level, the RR isolation level also forbids the non-repeatable read anomaly, the phantom read anomaly, the write skew anomaly, and the sawtooth write skew anomaly.

5. Serializable (S): No data anomaly occurs. Either anomalies that occur on entity data objects or anomalies that occur under abstract semantics are forbidden. The S isolation level is a highest data consistency level.

The cursor stability isolation level defined in Table 2 by Jim Grey et al. is not within the isolation levels provided by the embodiments of this application. This is because the cursor stability level is defined based on specific locking technologies that implement different isolation levels, and it is not appropriate to integrate a specific implementation technology into the isolation level theory. The isolation level system provided by the embodiments of this application is completely defined based on relationships between known anomalies and concurrency. More types of allowed data anomaly indicates higher concurrency of the system while lower strengths of data consistency; and less types of allowed data anomaly indicates lower concurrency of the system while higher strengths of data consistency. Therefore, data consistency strengths of the isolation levels have the following relationship: RWU<RWC<SH<RR<S.

Based on the definitions of data anomalies, the definition of dynamic edge intersection, and the definitions of isolation levels that are provided in the foregoing embodiment, FIG. 9 is a flowchart of a transaction processing method according to an embodiment of this application. Referring to FIG. 9, this embodiment is applied to any node device in a database system. For a stand-alone database system, the node device may be a stand-alone device, and for a distributed database system, the node device may be a coordinator node device or a data node device. This embodiment includes the following steps.

901. The node device obtains, when read and write operations of a target transaction are executed, at least one concurrent transaction of the target transaction, the at least one concurrent transaction and the target transaction performing read and write operations on a same data item during transaction execution.

The at least one concurrent transaction is a transaction that performs the read and write operations on the same data item with the target transaction during the transaction execution. The target transaction may be a global transaction or a local transaction. The global transaction refers to a transaction involving a cross-node operation, and the global transaction is also referred to as a distributed transaction, while the local transaction refers to a transaction involving a single node operation, and the local transaction is also referred to as a native transaction. The type of the target transaction is not limited to the described embodiments.

In the foregoing process, the node device may initialize a read set and a write set of the target transaction to empty sets when starting to execute the target transaction. Optionally, the target transaction may be initiated by a terminal. In this case, the terminal and the node device establish a session for processing the target transaction, the terminal sends an execution request for the target transaction to the node device, and the node device starts to execute the target transaction in response to the execution request for the target transaction, that is, the target transaction may be executed by the node device. In some embodiments, when a session has been established between the terminal and the node device, there is no need to establish a new session, and the current established session may be reused.

In a process of initializing read-write sets, the node device may apply to an operating system for a memory space when the database system is started. The memory space is used for maintaining a read-write set (including a read set and a write set) of at least one transaction. The node device applies for a piece of memory from the memory space when starting to execute the target transaction. The piece of memory is used for managing a read-write set (including the read set and the write set) of the target transaction, thereby completing establishing the read-write set of the target transaction on the node device and initializing the established read set and write set to the empty sets.

After the read-write sets are initialized, the node device determines whether the target transaction involves an update operation for a variable according to an execution statement of the target transaction, that is, determines whether there is the update operation for the variable in the target transaction. When the target transaction updates any variable, the node device adds the variable to the write set of the target transaction, and assigns a version number to the variable. For example, when a transaction T updates a variable x, the variable x is added to a write set of the transaction T, and a version number is assigned to the variable x. Exemplarily, when a transaction performs a write operation on the variable $x_0$, a variable $x_1$ is added to the write set of the transaction T, and the version number of the variable x is 1. A version number of a write operation on a same variable by different transactions is incremented by an integer. A newly occurring read operation may obtain the version number of the variable accordingly. That is, the database system maintains an incrementing version number for each variable. In addition, the node device reads any variable in response to the target transaction, and read data is latest data that meets a read committed rule.

The read set and the write set of the target transaction are maintained in real time as a transaction operation progresses. If a read operation occurs, the read data enters the read set. If a write operation occurs, the read data enters the write set. If a same transaction writes a same variable version multiple times, there are at least two different new versions. In the write set, a latest version is used for replacing an old variable version. The initialization process and the maintenance strategy may be referred to as a formation algorithm of a read-write set of a transaction in a read-write phase.

Under the maintenance strategy of the read-write sets, for each operation of the target transaction (the operation may be a read operation or a write operation), when the operation occurs and a preparation phase is entered, the node device enters a critical zone, traverses the read set and the write set of the target transaction, obtains a transaction identification of at least one concurrent transaction (for example, all concurrent transactions) of the target transaction, and stores the transaction identification of the at least one concurrent transaction in a linked list TS.

In a process of obtaining the concurrent transaction, each data item in a memory may record a transaction identification of a transaction that has read or written the data item but has not yet been committed (referred to as an active transaction identification for short), and the active transaction identification recorded on the each data item may be one, at least two, or none. The node device may obtain each active transaction identification recorded on each data item in the read set and the write set, and then the transaction identification of the at least one concurrent transaction can be obtained.

The foregoing process is equivalent to start preparation and enter the preparation phase of the target transaction when each operation of the target transaction occurs. The preparation phase is used for performing preparation of a transaction concurrent access control anomaly verification for whether the transaction T may be committed, that is, for completing the preparation of the transaction concurrent access control anomaly verification in the preparation phase, to prepare for determining whether to commit the transaction T. The node device exits the critical zone after finding the transaction identification of the at least one concurrent transaction in the critical zone.

902. The node device determines whether a data anomaly exists between the at least one concurrent transaction and the target transaction according to read-write sets of the at least one concurrent transaction and the target transaction.

In the foregoing process, for any concurrent transaction in the at least one concurrent transaction, the node device may obtain a target detection result between the any concurrent transaction and the target transaction according to read-write sets of the any concurrent transaction and the target transaction; and determine, when a target detection result of the any concurrent transaction is that a data anomaly exists, that a data anomaly exists between the any concurrent transaction and the target transaction; otherwise, perform the step of obtaining the target detection result on a next concurrent transaction of the any concurrent transaction in the at least one concurrent transaction, until target detection result of the at least one concurrent transaction are all that the data anomaly does not exist, to determine that the data anomaly does not exist between the at least one concurrent transaction and the target transaction. Since the node device performs data consistency detection by using a principle of detecting dynamic edge intersection, a consistency detection algorithm thereof may also be referred to as a dynamic edge intersection and merge (DLI-M) algorithm.

That is, for an $L^{th}$ concurrent transaction in the at least one concurrent transaction, the node device obtains, according to read-write sets of the $L^{th}$ concurrent transaction and the target transaction, a target detection result between the $L^{th}$ concurrent transaction and the target transaction, L being a positive integer; and performs, in a case that the target detection result is that the data anomaly does not exist, the step of obtaining the target detection result on an $(L+1)^{th}$ concurrent transaction in the at least one concurrent transaction, until target detection results of the at least one concurrent transaction are all that the data anomaly does not exist, to determine that the data anomaly does not exist between the at least one concurrent transaction and the target transaction. The node device further determines, in a case that the target detection result is that the data anomaly exists, that the data anomaly exists between the at least one concurrent transaction and the target transaction.

That is, in a case that a target detection result of a concurrent transaction in the at least one concurrent transaction is that the data anomaly exists, the node device determines that the data anomaly exists between the at least one concurrent transaction and the target transaction. When the target detection results of all concurrent transactions are that the data anomaly does not exist, the node device determines that the data anomaly does not exist between the at least one concurrent transaction and the target transaction.

When each operation of the target transaction occurs, the step of obtaining at least one concurrent transaction may be performed, and the DLI-M algorithm may be executed for each concurrent transaction. It is assumed that a target transaction to be determined currently entering a verification phase is T, and the target transaction T is initially a physical transaction. After a test of the DLI-M algorithm is passed, if the data anomaly not existing between the at least one concurrent transaction and the target transaction is determined, the target transaction T becomes a merged logical transaction.

In the verification phase, two different DLI-M algorithms are provided. The first performs anomaly detection based on a dynamic edge intersection value DLI and a variable state value VS of each transaction, and the second performs the anomaly detection based on a Boolean type (upper) of each transaction.

According to the first anomaly detection method, the node device may configure initial values for the DLI and the variable state value VS, and the initial values of the two may be set as 0, that is, DLI=0, and VS=0. Then the following loop operation is performed: take out a first transaction from the linked list TS and set it as $T_L$, and perform the DLI and VS-based anomaly detection method on $T_L$; and report an anomaly occurrence when dynamic edge intersection exists, exit the loop when a target detection result is determined as that a data anomaly exists, and determine that a data anomaly exists between the concurrent transaction and the target transaction; otherwise, perform dynamic edge merging on $T_L$ and the target transaction T when the dynamic edge intersection does not exist, to obtain a new transaction T-new, and assign T-new to the target transaction T; and take out a second transaction from the linked list TS and set it as $T_{L+1}$, execute a next loop (to determine whether the dynamic edge intersection exists between new T-new and $T_{L+1}$), repeat the foregoing operation until the linked list is empty, and end the loop. If there is still no anomaly report at the end of the loop, a final anomaly detection result is obtained as that the data anomaly does not exist, and L is a positive integer. The DLI and VS-based anomaly detection method is described in detail in the next embodiment, and is not expanded herein.

According to the second anomaly detection method, the node device assigns a Boolean type, referred as upper, to each transaction, and initializes an upper value of each transaction to false during the initialization process. Then the following loop operation is performed: take out a first transaction from the linked list TS and set it as $T_L$, and perform the upper-based anomaly detection method on $T_L$; and report an anomaly occurrence when dynamic edge intersection exists, exit the loop when a target detection result is determined as that a data anomaly exists, and determine that a data anomaly exists between the concurrent transaction and the target transaction; otherwise, perform dynamic edge merging on $T_L$ and the target transaction T when the dynamic edge intersection does not exist, to obtain a new transaction T-new, and assign T-new to the target transaction T; and take out a second transaction from the linked list TS and set it as $T_{L+1}$, execute a next loop (to determine whether the dynamic edge intersection exists between new T-new and $T_{L+1}$), repeat the foregoing operation until the linked list is empty, and end the loop. If there is still no anomaly report at the end of the loop, the data anomaly not existing between the concurrent transaction and the target transaction is determined. The upper-based anomaly detection method is described in detail in the next embodiment, and is not expanded herein.

903. The node device merges the read-write sets of the at least one concurrent transaction and the target transaction when the data anomaly does not exist between the at least one concurrent transaction and the target transaction, to commit the target transaction.

In the foregoing process, when the target transaction is a local transaction, if the data anomaly does not exist between the at least one concurrent transaction and the target transaction, that is, there is still no anomaly report at the end of the loop, the target transaction may be directly committed. When the target transaction is a distributed transaction, the node device may report an anomaly detection result of the node device to a coordinator node device, and the coordinator node device globally determines whether to commit the target transaction according to anomaly detection results reported by node devices. If the anomaly detection results reported by all node devices are that the data anomaly does not exist, the coordinator node device sends a corresponding commitment instruction to the node devices. After receiving the commitment instruction, the node device commits the target transaction and performs data flush on the target transaction. Otherwise, if an anomaly detection result reported by any node device is that the data anomaly exists, the coordinator node device sends a corresponding rollback instruction to the node devices, and the node device rolls back the target transaction after receiving the rollback instruction. The anomaly detection result of each node device is used for indicating whether the data anomaly exists between the at least one concurrent transaction and the target transaction on the node device.

According to the method provided by the embodiments of this application, when read and write operations of a target transaction are executed, at least one concurrent transaction of the target transaction is obtained, whether a data anomaly exists between the at least one concurrent transaction and the target transaction is determined according to read-write sets of the at least one concurrent transaction and the target transaction, and if the data anomaly does not exist, the read-write sets of the at least one concurrent transaction and the target transaction are merged, to commit the target transaction. This method can comprehensively detect various data anomalies in the database system when operations of the target transaction are executed, to ensure data state consistency. Based on ensuring the data state consistency, the transaction processing mechanism neither completely relies on a locking technology nor completely relies on a dependency graph technology, and does not limit concurrency of the database system, thereby improving transaction processing efficiency of the database system.

All the foregoing example embodiments may be modified or combined in various ways to form additional embodiments of the present disclosure. The description already provided for the foregoing example embodiments may also apply to these additional embodiments.

The DLI-M algorithm for data state consistency is described in detail below. The DLI-M algorithm performs data anomaly identification based on a data state consistency model, to determine whether a concurrent transaction conforms to data consistency. The DLI-M algorithm does not eliminate a solution to data anomalies of phantom read with a predicate and predicate write skew, that is, realizes an S isolation level.

The DLI-M algorithm includes a transaction read-write set formation algorithm in a read-write phase, an algorithm in a preparation phase, and a consistency test algorithm (DLI-M algorithm). In the consistency test algorithm, a DLI and VS-based anomaly detection method and an upper-based anomaly detection method are provided, and the two anomaly detection methods can identify and report a data anomaly, and are described separately below.

1. Transaction Read-Write Set Formation Algorithm in a Read-Write Phase

When a target transaction starts to be executed, a read set and a write set of the target transaction are initialized as empty sets.

When the target transaction updates a variable x, the variable x is added to the write set of the target transaction, and a version number is assigned to the variable x. A version number of a write operation on a same variable by different transactions is incremented by an integer. A newly occurring read operation may obtain a version number of a variable accordingly, that is, an incrementing version number is maintained for each variable.

The read set and the write set of the target transaction are maintained in real time as a transaction operation progresses. If a read operation occurs, the read data enters the read set. If a write operation occurs, read data enters the write set. If a same transaction writes a same variable version multiple times, there are at least two different new versions. In a write set, a latest version is used for replacing an old variable version.

In addition, data read in the read process is latest data that meets a read committed rule.

The foregoing transaction read-write set formation algorithm is similar to the steps in the read-write phase described in step 901, and details are not repeated herein.

2. Perform the Algorithm in the Preparation Phase when Each Operation Occurs

When each operation (read or write) of a target transaction T occurs, the preparation phase is entered and preparation is started. The preparation phase is used for performing preparation of transaction concurrent access control anomaly verification for whether the target transaction T may be committed.

In the preparation phase, a node device enters a critical zone, traverses a read set and a write set of the target transaction T, finds out transaction identifications of all concurrent transactions of the target transaction T, stores the transaction identifications in a linked list TS, and exits the critical zone after finding the transaction identifications. In a memory, each data item stores a transaction identification of a transaction that has read or written the data item but has not yet been committed.

The foregoing algorithm in the preparation phase is similar to the steps in the preparation phase described in step 901, and will not be repeated here.

3. Perform the Consistency Test Algorithm (that is, DLI-M Algorithm) when Each Operation Occurs For an $L^{th}$ concurrent transaction in at least one concurrent transaction of the target transaction, the node device may obtain, according to read-write sets of the $L^{th}$ concurrent transaction and the target transaction, a target detection result between the $L^{th}$ concurrent transaction and the target transaction, L being a positive integer; and perform, when the target detection result is that the data anomaly does not exist, the step of obtaining the target detection result on an $(L+1)^{th}$ concurrent transaction in the at least one concurrent transaction, until target detection results of the at least one concurrent transaction are all determined as that the data anomaly does not exist, to determine that the data anomaly does not exist between the at least one concurrent transaction and the target transaction; otherwise, determine, when the target detection result is that the data anomaly exists, that the data anomaly exists between the at least one concurrent transaction and the target transaction.

In other words, the node device takes out a first transaction from the linked list TS and sets it as $T_L$, and performs the DLI-M algorithm on $T_L$; reports an anomaly occurrence when dynamic edge intersection exists, exits the loop when a target detection result is determined as that a data anomaly exists, and determines that a data anomaly exists between a concurrent transaction and the target transaction; otherwise, performs dynamic edge merging on $T_L$ and the target transaction T when the dynamic edge intersection does not exist, to obtain a new transaction T-new and assign T-new to the target transaction T; and takes out a second transaction from the linked list TS and sets it as $T_{L+1}$, executes a next loop (to determine whether the dynamic edge intersection exists between new T-new and $T_{L+1}$), repeats the foregoing operation until the linked list is empty, and ends the loop. If there is still no anomaly report at the end of the loop, to determine that the data anomaly does not exist between the concurrent transaction and the target transaction.

In an embodiment of this application, the DLI-M algorithm includes two different types. The first is a DLI and VS-based anomaly detection method, and the second is an upper-based anomaly detection method, which will be discussed below.

1. DLI and VS-Based Anomaly Detection Method

FIG. 10 is a flowchart of obtaining a target detection result according to an embodiment of this application. FIG. 10 shows how a node device obtains the target detection result based on a consistency test algorithm. A loop process is described herein.

1001. The node device obtains, for any concurrent transaction in at least one concurrent transaction, a first set S1, a second set S2, and a third set S3, where S1 is an intersection between a read set of a target transaction and a write set of the any concurrent transaction, S2 is an intersection between a write set of the target transaction and a read set of the any concurrent transaction, and S3 is an intersection between the write set of the target transaction and the write set of the any concurrent transaction.

In other words, the node device obtains, for an $L^{th}$ concurrent transaction in the at least one concurrent transaction, the first set S1, the second set S2, and the third set S3. S1 is an intersection between the read set of the target transaction and a write set of the $L^{th}$ concurrent transaction, S2 is an intersection between the write set of the target transaction and a read set of the $L^{th}$ concurrent transaction, and S3 is an intersection between the write set of the target transaction and the write set of the $L^{th}$ concurrent transaction.

In the foregoing process, when the node device enters a verification phase, assuming that a target transaction to be determined currently entering the verification phase is T, an initial value of the target transaction T is initially a physical transaction, and becomes a logical transaction by using dynamic edge merging. Further, the node device configures initial values for a dynamic edge intersection value DLI and a variable state value VS, and the initial values of the two may be set as 0, that is, DLI=0, and VS=0.

After the dynamic edge intersection value DLI and the variable state value VS are initialized, the node device loops the operation of obtaining the target detection result on each concurrent transaction in a linked list TS, exits the loop when any target detection result is that a data anomaly exists (that is, at least one target detection result is that the data anomaly exists), and determines that an anomaly detection result between the at least one concurrent transaction and the target transaction is that a data anomaly exists. Otherwise, the node device continuously loops on a next concurrent transaction in the linked list TS until the linked list TS is empty, ends the loop when all target detection results are that the data anomaly does not exist, and determines that the data anomaly does not exist between the at least one concurrent transaction and the target transaction.

Step 1001 is a first step of looping on any concurrent transaction $T_L$. In this case, the node device determines an intersection between a read set of the target transaction T and a write set of the any concurrent transaction $T_L$ as the first set S1 according to read-write sets of the target transaction T and the any concurrent transaction $T_L$. The first set S1 may be presented as "S1=DSR (T)∩DSW ($T_L$)". An intersection between a write set of the target transaction T and a read set of the any concurrent transaction $T_L$ is determined as the second set S2. The second set S2 may be presented as "S2=DSR ($T_L$)∩DSW (T)". An intersection between the write set of the target transaction T and the write set of the any concurrent transaction $T_L$ is determined as the third set S3. The third set S3 may be presented as "S3=DSW (T)∩DSW ($T_L$)".

Optionally, when S1, S2, and S3 are obtained, a hash table may be used for storing the respective read-write sets of $T_L$ and T, so that an intersection and a union thereof can be obtained within linear time complexity.

If a union among S1, S2, and S3 is an empty set, that is, S1∪S2∪S3 is the empty set (simplified calculation: S1=∅ and S2=∅ and S3=∅, that is, S1, S2, and S3 are all empty sets), it means that $T_L$ and the target transaction T are not concurrent transactions, and the node device may re-add $T_L$ to a tail of the linked list TS. Otherwise, if the union among S1, S2, and S3 is not the empty set, it means that $T_L$ and the target transaction T are the concurrent transactions. In this case, the following steps 1002 to 1003 are performed for anomaly detection. If an anomaly is found, the target transaction T is rolled back.

1002. The node device obtains, when the third set S3 is not an empty set, the target detection result between the any concurrent transaction and the target transaction according to commitment situations of the target transaction and the any concurrent transaction, the first set S1, and the third set S3.

That is, the node device obtains, when S3 is not the empty set, the target detection result between the $L^{th}$ concurrent transaction and the target transaction according to commitment situations of the target transaction and the $L^{th}$ concurrent transaction, the first set S1, and the third set S3.

In some embodiments, if the any concurrent transaction $T_L$ is not committed and a target parameter of the target transaction T is 1, the target detection result is determined as that a data anomaly exists, and a data anomaly type is a dirty write anomaly. That is, if the $L^{th}$ concurrent transaction is not committed and the target parameter of the target transaction is 1, the target detection result is determined as that the data anomaly exists, and the data anomaly type is the dirty write anomaly. The target parameter T.no_committed is used for representing a quantity of committed transactions corresponding to the read-write set of the target transaction. In the loop process, if a target detection result between a previous concurrent transaction and the target transaction is that the data anomaly does not exist, dynamic edge merging may be performed on the previous concurrent transaction and the target transaction before this loop is executed, and then an obtained new transaction after the dynamic edge merging is assigned to the target transaction. The dynamic edge merging is substantially to merge read-write sets of two transactions. Therefore, in any loop, the read-write set of the target transaction may be merged read-write sets. There may be a component of read-write sets of a committed transaction in the read-write set of the target transaction. Therefore, the target parameter T.no_committed is used for describing a quantity of committed transactions corresponding to a component of other committed transactions owned by the read-write set, that is, the target parameter is used for representing a quantity of committed transactions corresponding to a component of the read-write set of the target transaction.

In some embodiments, if the any concurrent transaction $T_L$ is committed and an intersection between the first set S1 and the third set S3 is not the empty set, the target detection result is determined as that the data anomaly exists, and the data anomaly type is a lost update anomaly. That is, if the $L^{th}$ concurrent transaction is committed and the intersection between the first set and the third set is not the empty set, the target detection result is determined as that the data anomaly exists, and the data anomaly type is the lost update anomaly.

That is, if S3 !=∅, and any of the following conditions is met, the node device determines the target detection result as that the data anomaly exists, determines an anomaly detection result between a concurrent transaction and the target transaction as that the data anomaly exists, reports that a write-write anomaly occurs, and terminate the loop: (1) if the any concurrent transaction $T_L$ is not committed and the target transaction T's target parameter T.no_committed=1, a write-write conflict is formed, and the data anomaly type is a dirty write anomaly; (2) if the any concurrent transaction $T_L$ is committed and S1∩S3 is not the empty set, the data anomaly type is the lost update anomaly. When S3=∅, the following step 1003 is performed.

1003. The node device obtains, when the third set S3 is the empty set and at least one of the first set S1 or the second set S2 is not the empty set, the target detection result according to the first set S1 and the second set S2.

In some embodiments, the node device may obtain a dynamic edge intersection value and a variable state value between the $L^{th}$ concurrent transaction and the target transaction according to the first set and the second set, where the dynamic edge intersection value is used for representing a line segment intersection situation between different data items operated by the $L^{th}$ concurrent transaction and the target transaction in a data state matrix, and the variable state value is used for representing a situation of variables with different data states to which the $L^{th}$ concurrent transaction and the target transaction operate; and obtain the target detection result based on the dynamic edge intersection value and the variable state value.

In some embodiments, before obtaining the dynamic edge intersection value and the variable state value between the $L^{th}$ concurrent transaction and the target transaction according to the first set and the second set, the node device may further update the dynamic edge intersection value DLI and the variable state value VS between the $L^{th}$ concurrent transaction and the target transaction according to the first set and the second set, and then obtain the target detection result based on the updated dynamic edge intersection value DLI and the updated variable state value VS.

Based on S3=∅, if at least one of S1 !=∅ or S2 !=∅ is met, the node device updates the dynamic edge intersection value DLI and the variable state value VS according to the following update rules:

(1) The node device updates the dynamic edge intersection value DLI to a numerical value obtained by adding 1 to an existing value (i.e., increments the dynamic edge intersection value by one) when the first set S1 is not the empty set, that is, if S1 is not empty, DLI=DLI++; and updates the variable state value VS to a numerical value obtained by adding 1 to an existing value when variables with different data states exist in the first set S1, that is, if a non-empty element with different data states exists in S1, VS=VS++.

(2) The node device updates the dynamic edge intersection value DLI to the numerical value obtained by adding 1 to the existing value when the second set S2 is not the empty set, that is, if S2 is not empty, DLI=DLI++; and updates the variable state value VS to the numerical value obtained by adding 1 to the existing value when variables with different data states exist in the second set S2, that is, if a non-empty element with different data states exists in S2, VS=VS++.

In some embodiments, after updating the dynamic edge intersection value DLI and the variable state value VS, the node device may obtain the target detection result based on the following formula: the node device obtains, when the dynamic edge intersection value DLI is greater than or equal to 2, that the target detection result is that the data anomaly exists, and determines the data anomaly type based on the updated variable state value VS; and obtains, when the dynamic edge intersection value DLI is less than 2, the target detection result is that the data anomaly does not exist.

In some embodiments, when determining the data anomaly type based on the updated variable state value VS, the node device may determine the data anomaly type as a read anomaly when the updated variable state value is 1, that is, if VS=1, the read anomaly is reported. The read anomaly includes a non-repeatable read anomaly of one variable, a read skew anomaly of two variables, a step read skew anomaly of three or more variables; and determine the data anomaly type as a write anomaly, when the updated variable state value VS is greater than or equal to 2, that is, if VS is greater than or equal to 2, the write anomaly is reported. The write anomaly includes a write skew anomaly of two variables and a sawtooth write skew anomaly of three and more variables.

In the foregoing process, if DLI is greater than or equal to 2, the target transaction T and $T_L$ form dynamic edge intersection, and an anomaly occurrence is reported. The target detection result and the anomaly detection result are determined as that the data anomaly exists, and the loop is terminated (when VS=1, the data anomaly type is the read anomaly, and when VS is greater than or equal to 2, the data anomaly type is the write anomaly). Otherwise, when there is no anomaly, dynamic edge merging is performed on $T_L$ and the target transaction T, an obtained new transaction is set as T-new, and T-new is assigned to the target transaction T (T=T-new). A second transaction is taken out from the linked list TS and is set as $T_{L+1}$, and a next loop is executed (to determine whether the dynamic edge intersection exists between new T-new and $T_{L+1}$).

In the foregoing process of dynamic edge merging, the node device may merge the read set of the any concurrent transaction $T_L$ into the read set of the target transaction T, and merge the write set of the any concurrent transaction $T_L$ into the write set of the target transaction T. In addition, if the transaction $T_L$ is not committed, let a target parameter of T-new auto-increment by 1, that is, let T-new.no_committed++(auto-incrementing by 1), which represents that a new transaction obtained through merging has a component of a read-write set of a committed transaction.

Further, if there is still no anomaly report at the end of the loop, the target transaction may be committed. Optionally, if an isolation level parameter=S, that is, the isolation level is a serializable level, the serializable level can be met in this case. Otherwise, a system may meet a configured isolation level while allowing certain types of data anomaly to occur.

2. Upper-Based Anomaly Detection Method

FIG. 11 is a flowchart of obtaining a target detection result according to an embodiment of this application, and shows how a node device obtains the target detection result based on a consistency test algorithm. A loop process is described herein.

1101. The node device obtains, for any concurrent transaction in at least one concurrent transaction, a first set S1, a second set S2, a third set S3, and a fourth set S4, where S1 is an intersection between a read set of a target transaction and a write set of the any concurrent transaction, S2 is an intersection between a write set of the target transaction and a read set of the any concurrent transaction, S3 is an intersection between the write set of the target transaction and the write set of the any concurrent transaction, and S4 is an intersection between the read set of the target transaction and the read set of the any concurrent transaction.

That is, the node device obtains, for an $L^{th}$ concurrent transaction in the at least one concurrent transaction, the first set S1, the second set S2, the third set S3, and the fourth set S4. S1 is an intersection between the read set of the target transaction and a write set of the $L^{th}$ concurrent transaction, S2 is an intersection between the write set of the target transaction and a read set of the $L^{th}$ concurrent transaction, S3 is an intersection between the write set of the target transaction and the write set of the $L^{th}$ concurrent transaction, and S4 is an intersection between the read set of the target transaction and the read set of the $L^{th}$ concurrent transaction.

In the foregoing process, when the node device enters a verification phase, assuming that a target transaction to be determined currently entering the verification phase is T, an initial value of the target transaction T is initially a physical transaction, and becomes a logical transaction by using dynamic edge merging.

Further, the node device configures initial values for Boolean types (upper) of the target transaction T and the any concurrent transaction $T_L$, and the initial values of the two may be set as false, that is, T.upper=false; and $T_L$.upper=false. The Boolean types (upper) represent a vertical position relationship between dynamic edges formed by transactions in a data state matrix. By using any two concurrent transactions $T_u$ and $T_v$ as an example, if $T_u$.upper=true, the transaction $T_u$ forms a newer dynamic edge on a variable than the transaction $T_v$, that is, for the same variable, the transaction $T_u$ operates a newer variable version on the variable than the transaction $T_v$.

After upper values of the two transactions are initialized, the node device loops the operation of obtaining the target detection result on each concurrent transaction in a linked list TS, exits the loop when any target detection result is that a data anomaly exists, and determines that an anomaly detection result between a concurrent transaction and the target transaction is that a data anomaly exists. Otherwise, the node device continuously loops on a next concurrent transaction in the linked list TS until the linked list TS is empty, ends the loop when all target detection results are that the data anomaly does not exist, and determines that the anomaly detection result between the concurrent transaction and the target transaction is that the data anomaly does not exist.

Step 1101 is a first step of looping on any concurrent transaction $T_L$. In this case, the node device determines an intersection between a read set of the target transaction T and a write set of the any concurrent transaction $T_L$ as the first set S1 according to read-write sets of the target transaction T and the any concurrent transaction $T_L$. The first set S1 may be presented as "S1=DSR (T)∩DSW ($T_L$)". An intersection between a write set of the target transaction T and a read set of the any concurrent transaction $T_L$ is determined as the second set S2. The second set S2 may be presented as "S2=DSR ($T_L$)∩DSW (T)". An intersection between the write set of the target transaction T and the write set of the any concurrent transaction $T_L$ is determined as the third set S3. The third set S3 may be presented as "S3=DSW (T)∩DSW ($T_L$)". An intersection between the read set of the target transaction T and the read set of the any concurrent transaction $T_L$ is determined as the fourth set S4. The fourth set S4 may be presented as "S4=DSR ($T_L$)∩DSR (T)".

Optionally, when S1, S2, S3, and S4 are obtained, a hash table may be used for storing the respective read-write sets of $T_L$ and T, so that an intersection and a union thereof can be obtained within linear time complexity.

If a union among S1, S2, S3, and S4 is an empty set, that is, S1∪S2∪S3∪S4 is the empty set (simplified calculation: S1=Ø and S2=Ø and S3=Ø and S4=Ø, that is, S1, S2, S3, and S4 are all empty sets), $T_L$ and the target transaction T are not concurrent transactions, and the node device may re-add $T_L$ to a tail of the linked list TS. Otherwise, if the union among S1, S2, S3, and S4 is not an empty set, $T_L$ and the target transaction T are the concurrent transactions. In this case, the following steps 1102 to 1103 are performed for anomaly detection. If an anomaly is found, the target transaction T is rolled back.

1102. The node device obtains, when S3 is not an empty set, the target detection result between the any concurrent transaction and the target transaction according to commitment situations of the target transaction and the any concurrent transaction, the first set S1, and the third set S3.

That is, the node device obtains, when S3 is not the empty set, the target detection result between the $L^{th}$ concurrent transaction and the target transaction according to commitment situations of the target transaction and the $L^{th}$ concurrent transaction, the first set, and the third set. Step 1102 is similar to step 1002.

1103. The node device obtains, when S3 is the empty set and at least one of S1, S2, or S4 is not the empty set, the target detection result according to S1, S2, and S4.

In some embodiments, the node device may obtain a Boolean type ($T_L$.upper) of the $L^{th}$ concurrent transaction and a Boolean type (T.upper) of the target transaction T according to S1, S2 and S4, where the Boolean type is used for representing a vertical position relationship between dynamic edges formed by the corresponding transactions in a data state matrix, and an initial value of the Boolean type is false. determine, when both $T_L$.upper and T.upper are true, that the target detection result is that the data anomaly exists; and determine, when at least one of $T_L$.upper or T.upper is false, that the target detection result is that the data anomaly does not exist.

In some embodiments, before obtaining $T_L$.upper and T.upper according to S1, S2 and S4, the node device may update the Boolean type $T_L$.upper of the any concurrent transaction $T_L$ and the Boolean type T.upper of the target transaction T according to S1, S2 and S4, and then obtain the target detection result based on the updated $T_L$.upper and the updated T.upper.

Based on S3=Ø, if at least one of S1 !=Ø, S2 !=Ø, or S4 !=Ø is met, the node device updates $T_L$.upper and T.upper according to the following update rules:

(1) When S1 is not the empty set, the node device updates, for a variable in S1, the Boolean type of the target transaction to true when a version number of the variable in the read set of the target transaction is greater than or equal to a version number of the variable in the write set of the $L^{th}$ concurrent transaction; and updates the Boolean type of the $L^{th}$ concurrent transaction to true when the version number of the variable in the read set of the target transaction is less than the version number of the variable in the write set of the $L^{th}$ concurrent transaction.

That is, for each variable x in S1, if a version of the variable x read by the target transaction T is greater than or equal to a version of the variable x written by the any concurrent transaction $T_L$, for example, the target transaction T reads a variable version $x_2$, and the any concurrent transaction $T_L$ writes a variable version $x_1$, T.upper=true is set; otherwise, if the version of the variable x read by the target transaction T is less than the version of the variable x written by the any concurrent transaction $T_L$, for example, the target transaction T reads the variable version $x_1$ and the any concurrent transaction $T_L$ writes the variable version $x_2$, $T_L$.upper=true is set.

(2) When S2 is not the empty set, the node device updates, for a variable in S2, the Boolean type of the target transaction to true when a version number of the variable in the write set of the target transaction is greater than a version number of the variable in the read set of the $L^{th}$ concurrent transaction; and updates the Boolean type of the $L^{th}$ concurrent transaction to true when the version number of the variable in the write set of the target transaction is less than or equal to the version number of the variable in the read set of the $L^{th}$ concurrent transaction.

That is, for each variable x in S2, if a version of the variable x written by the target transaction T is greater than a version of the variable x read by the any concurrent transaction $T_L$, for example, the target transaction T writes a variable version $x_2$, and the any concurrent transaction $T_L$ reads a variable version $x_1$, T.upper=true is set; otherwise, if the version of the variable x written by the target transaction T≤the version of the variable x read by the any concurrent transaction $T_L$, for example, the target transaction T writes the variable version $x_1$ and the any concurrent transaction $T_L$ reads the variable version $x_2$, $T_L$.upper=true is set.

(3) When S4 is not the empty set, the node device updates, for a variable in S4, the Boolean type of the target transaction to true when a version number of the variable in the read set of the target transaction is greater than a version number of the variable in the read set of the $L^{th}$ concurrent transaction; and updates the Boolean type of the $L^{th}$ concurrent transaction to true when the version number of the variable in the read set of the target transaction is less than the version number of the variable in the read set of the $L^{th}$ concurrent transaction.

That is, for each variable x in S4, if a version of the variable x read by the target transaction T is greater than a version of the variable x read by the any concurrent transaction $T_L$, for example, the target transaction T reads a variable version $x_2$, and the any concurrent transaction $T_L$ reads a variable version $x_1$, T.upper=true is set; if the version of the variable x read by the target transaction T is less than the version of the variable x read by the any concurrent transaction $T_L$, for example, the target transaction T reads the variable version $x_1$ and the any concurrent transaction $T_L$ reads the variable version $x_2$, $T_L$.upper=true is set; and if the version of the variable x read by the target transaction T=the version of the variable x read by the any concurrent transaction $T_L$, for example, if both the target transaction T and the any concurrent transaction $T_L$ read the variable version $x_1$, no operation is performed.

When S3 is the empty set, it may be guaranteed that a condition for forbidding a write-write conflict in basic rules is met, that is, a dirty write data anomaly is forbidden. According to the rules 1) to 3), the Boolean type (T.upper) of the target transaction T and the Boolean type ($T_L$.upper) of the any concurrent transaction $T_L$ are updated after the read set of the target transaction T and the write set of the any concurrent transaction $T_L$ are compared (to analyze elements in S1), the write set of the target transaction T and the read set of the any concurrent transaction $T_L$ are compared (to analyze elements in S2), and the read set of the target transaction T and the read set of the any concurrent transaction $T_L$ are compared (to analyze elements in S4). If the following condition: T.upper=$T_L$.upper=true is met after the update is completed, it is considered that dynamic edge intersection exists, that is, the data anomaly exists. In this case, the target detection result is obtained as that the data anomaly exists; otherwise, the target detection result is obtained as that the data anomaly does not exist.

In the foregoing process, if finally T.upper=$T_L$.upper=true, the target transaction T and the any concurrent transaction $T_L$ form the dynamic edge intersection, an anomaly occurrence is reported, the target detection result is determined as that the data anomaly exists, then the anomaly detection result between the concurrent transaction and the target transaction is determined as that the data anomaly exists, and the loop is terminated; otherwise, when there is no anomaly, dynamic edge merging is performed on the any concurrent transaction $T_L$ and the target transaction T, an obtained new transaction is set as T-new, and T-new is assigned to the target transaction T (T=T-new). A second transaction is taken out from the linked list TS and is set as $T_{L+1}$, and a next loop is executed (to determine whether the dynamic edge intersection exists between new T-new and $T_{L+1}$).

In the foregoing process of merging by using a dynamic edge, the node device may merge the read set of the any concurrent transaction $T_L$ into the read set of the target transaction T, and merge the write set of the any concurrent transaction $T_L$ into the write set of the target transaction T. In addition, if the any concurrent transaction $T_L$ is not committed, let a target parameter of T-new auto-increment by 1, that is, let T-new.no_committed++(auto-incrementing by 1), which represents that a new transaction obtained through merging has a component of a read-write set of a committed transaction.

Further, if there is still no anomaly report at the end of the loop, the target transaction may be committed. Optionally, if an isolation level parameter=S, that is, the isolation level is a serializable level, the serializable level can be met in this case. Otherwise, a system may meet a configured isolation level while allowing certain types of data anomaly to occur.

The DLI-M algorithm provided by the embodiments of this application uses multiple set operations. For these operations, a hash table may be used as a data structure of a set, so that an intersection and a union thereof can be obtained within linear time complexity, and the time complexity is O (m+n). In each loop, the DLI-M algorithm may identify whether a data anomaly exists between concurrent transactions by using 5 times of calculation of the intersection and the union of sets. A number of loops reaches a number k of concurrent transactions at most, so total algorithm complexity may be: O (k*(m+n)). In a worst case, each transaction has one or two concurrent transactions, and loops k−1 times before finding a mergeable concurrent transaction, which leads to complexity of O ($k_2$*(m+n)). But in an actual case, usually, as dynamic edge merging of a transaction progresses, a number of remaining transactions is decreasing, so the complexity is 0 (k*lgk*(m+n)); k is a positive integer greater than 1.

All the foregoing example embodiments may be modified or combined in various ways to form additional embodiments of the present disclosure. The description already provided for the foregoing example embodiments may also apply to these additional embodiments. In an embodiment of this application, based on the foregoing DLI-M algorithm, a snapshot technology and a concept of fusion of a static edge and a dynamic edge may be used for realizing various isolation levels of a database system, and this algorithm is referred to as a snapshot-based data state consistency DLI-M (SDLI-M) algorithm. The SDLI-M algorithm may consider coupling or decoupling an optimistic concurrency control (OCC) algorithm. In addition, the SDLI-M algorithm in this embodiment may further be optimized for some details of the DLI-M algorithm in the foregoing embodiment, so as to improve the DLI-M algorithm. The details are as follows.

1. Transaction Read-Write Set Formation Algorithm in a Read-Write Phase

When a target transaction starts to be executed, a read set and a write set of the target transaction are initialized as empty sets.

When the target transaction updates a variable x, the variable x is added to the write set of the target transaction, and a version number is assigned to the variable x. A version number of a write operation on a same variable by different transactions is incremented by an integer. A newly occurring read operation may obtain a version number of a variable accordingly, that is, an incrementing version number is maintained for each variable.

The read set and the write set of the target transaction are maintained in real time as a transaction operation progresses. If a read operation occurs, the read data enters the read set. If a write operation occurs, read data enters the write set. If a same transaction writes a same variable version multiple times, there are at least two different new versions. In a write set, a latest version is used for replacing an old variable version.

The foregoing initialization process and the maintenance strategy of read-write sets are similar to those in the DLI-M algorithm, and details are not repeated herein.

A difference between the SDLI-M algorithm and the DLI-M algorithm is that data read by the SDLI-M algorithm in a read process is not the "latest data that meets a read committed rule" in the DLI-M algorithm, but relevant data on a closest and most suitable static edge from a snapshot St time point, and can meet a consistency state of data.

In a data read process, a visibility determining algorithm for a data item is followed: based on a timestamp, a snapshot Snapshot Set=Ss={St} is established, and St is a time point. In a basic data structure of each data item, a transaction number tid of a transaction generating the data item and a commitment timestamp tc (tc=NULL if a version of the data is not committed) of the transaction generating the data item are stored. If tc of a data item is not NULL and tc<St, the version may be read by the snapshot, that is, the data item is a target data item visible to a target transaction, but there is a version chain (that is, a historical sequence) between all versions from a latest version to an oldest version, and the latest version is the first to be read when a version is read.

It is to be noted that the snapshot time point St, the transaction number tid, and the commitment timestamp tc all belong to a same data type, for example, they are same numeric logical timestamp values, or similar HLC timestamp values, as long as their size can be compared in a skew manner. This visibility determining algorithm ensures that data read by a transaction is the relevant data on the closest and most suitable static edge from the St time point, that is, ensures that the read data meets the data consistency state.

2. Data Read Phase

In some embodiments, in the data read phase of the SDLI-M algorithm, a node device may determine, for a read operation of the target transaction, a snapshot of the read operation; determine, according to a read condition of the read operation and the snapshot of the read operation, the target data item visible to the target transaction, and add the target data item to a read set of the target transaction.

Optionally, when determining the snapshot of the read operation: the node device may obtain, when an isolation level of a database system is lower than RR, a snapshot during performing the read operation; and the node device may determine a snapshot of a first read operation of the target transaction as the snapshot of the read operation when the isolation level of the database system is higher than or equal to the repeatable read. That is, when data is read, if an isolation level parameter <RR (the isolation level is lower than RR), each time a read operation is performed, a snapshot is obtained. In this case, if each read has a new snapshot, a phantom read anomaly is allowed to occur; otherwise, if the isolation level parameter is greater than or equal to RR (the isolation level is higher than or equal to RR), a snapshot is obtained when the read operation is performed for the first time, and each subsequent read operation uses the snapshot obtained for the first time for reading data. In this case, using the first snapshot can avoid occurrence of the phantom read anomaly and a non-repeatable read anomaly. The non-repeatable read anomaly of one variable has been identified in the data read phase, so there is no need to enter the DLI-M algorithm for identification. In this case, it is to avoid a certain type of data anomaly, rather than to detect an anomaly and roll back a transaction, so there is no step to report the anomaly and terminate the transaction.

In some embodiments, in the visibility determining algorithm, the node device determines, when the isolation level of the database system is higher than or equal to RWC, a largest version which meets the read condition and whose commitment timestamp tc is less than the snapshot St of the read operation as the target data item; and determines, when the isolation level of the database system is lower than RWC, a largest uncommitted version as the target data item when uncommitted versions exist in a data item meeting the read condition.

That is, when the isolation level parameter is greater than or equal to RWC, the SDLI-M algorithm is consistent with the visibility determining algorithm involved in the above "transaction read-write set formation algorithm in the read-write phase", and details are not repeated herein. However, when the isolation level parameter <RWC, the foregoing visibility determining algorithm may be modified so that a latest uncommitted version can be read, thereby achieving an RWU level.

In some embodiments, if an OCC framework is used, when the isolation level parameter is higher than RR, a second read operation in each transaction first verifies whether there is an object to be read from a read set and a write set, and if there is an object to be read, the object to be read is obtained from the read-write set; otherwise, the object to be read may be obtained from an underlying storage layer.

3. Perform the Algorithm in the Preparation Phase when Each Operation Occurs

When each operation (read or write) of a target transaction T occurs, the preparation phase is entered and preparation is started. The preparation phase is used for performing preparation of transaction concurrent access control anomaly verification for whether the target transaction T may be committed.

In the preparation phase, a node device enters a critical zone, traverses a read set and a write set of the target transaction T, finds out transaction identifications of all concurrent transactions of the target transaction T, stores the transaction identifications in a linked list TS, and exits the critical zone after finding the transaction identifications. In a memory, each data item stores a transaction identification of a transaction that has read or written the data item but has not yet been committed.

The foregoing algorithm in the preparation phase is similar to the algorithm in the preparation phase described in the DLI-M algorithm, and details are not repeated herein.

In some embodiments, When the SDLI-M algorithm is coupled to an OCC algorithm, the algorithm in the preparation phase corresponds to a verification phase of OCC.

In some embodiments, the SDLI-M algorithm may be improved for the DLI-M algorithm as follows: if an existing linked list oldTS is not empty, a target transaction is directly added to TS (namely, make TS=oldTS+T), and a read set and a write set of the target transaction are no longer traversed, thereby reducing traversal logic of a read-write set, and improving transaction processing efficiency.

4. Perform a Consistency Test Algorithm (that is, an Improved DLI-M Algorithm) when Each Operation Occurs In some embodiments, when the SDLI-M algorithm is coupled to the OCC algorithm, the consistency test algorithm corresponds to the verification phase of OCC, and is no longer executed once when each operation occurs, but is executed in the verification phase of OCC.

The improved DLI-M algorithm in the SDLI-M algorithm is similar to the SDLI-M algorithm in the DLI-M algorithm. Similar steps are not detailed herein. An improved DLI-M algorithm still includes two different types, the first is an improved DLI and VS-based anomaly detection method, and the second is an improved upper-based anomaly detection method, which are classified and discussed below.

(1) Improved DLI and VS-Based Anomaly Detection Method (4.1) A target transaction to be determined that currently enters the verification phase is T, and an initial value of the transaction T is a physical transaction, and becomes a logical transaction after dynamic edge merging.

(4.2) Initialize DLI and VS, that is, set initial values of some subordinate variables: DLI=0; and VS=0.

(4.3) Take out a first transaction from a linked list TS and set it as $T_L$, and loop the following operations until the linked list is empty:

(4.3.1) Obtain a first set S1=$DS_R$ (T)∩$DS_W$ ($T_L$), where S1 is an intersection between a read set of the target transaction T and a write set of a concurrent transaction $T_L$. If S1 is not empty, DLI=DLI++; and if data states of a non-empty element in S1 are different, VS=VS++.

(4.3.2) Obtain a second set S2=$DS_R$ ($T_L$)∩$DS_W$(T), where S2 is an intersection between a write set of the target transaction T and a read set of the concurrent transaction $T_L$. If S1 is not empty, DLI=DLI++; and if data states of a non-empty element in S2 are different, VS=VS++.

(4.3.3) Obtain a third set $S3=DS_W(T) \cap DS_W(T_L)$, where S3 is an intersection between the write set of the target transaction T and the write set of the concurrent transaction $T_L$.

(4.3.4) If $S1 \cup S2 \cup S3$ is an empty set (simplified calculation is: $S1=\emptyset$ and $S2=\emptyset$ and $S3=\emptyset$), it means that $T_L$ and T are not concurrent transactions, and $T_L$ is re-added to a tail of the linked list TS.

(4.3.5) Otherwise, $S1 \cup S2 \cup S3$ is not the empty set, which means that at least one set in S1, S2, and S3 is not the empty set. In this case, $T_L$ and T are the concurrent transactions, and anomaly detection is performed. Once an anomaly is found, the anomaly may be reported, and the target transaction T may be rolled back. An anomaly detection process follows the following rules:

(4.3.5.1) If $S3 \ne \emptyset$, when any one of the following two conditions is met, a node device reports that a write-write anomaly occurs, and the loop is terminated.

Condition 1. If an isolation level parameter !=RWU (an RWU level does not forbid a dirty write anomaly), and $T_L$ is not committed and T.no_committed=1, a write-write conflict exists, and a data anomaly type is the dirty write anomaly.

Condition 2. If the isolation level parameter is greater than or equal to SH (the SH level forbids lost update to occur, so isolation levels higher than or equal to SH report the anomaly), and $T_L$ has been committed and $S1 \cap S3$ is not the empty set, a data anomaly is reported, and a data anomaly type is a lost update anomaly.

(4.3.5.2) Otherwise, under a condition of $S3=\emptyset$, if $S1 \ne \emptyset$ or $S2 \ne \emptyset$, it can be divided into the following three situations for discussion:

Situation 1. If the target transaction T and $T_L$ form dynamic edge intersection, an anomaly occurrence is reported and the loop is terminated. In some embodiments, when DLI is greater than or equal to 2, it is considered that the dynamic edge intersection is formed between the target transaction T and $T_L$. In this case, the node device may determine whether to report an anomaly occurrence and terminate the loop according to an isolation level, and determine a data anomaly type according to VS.

Optionally, if the isolation level parameter is greater than or equal to SH (forbids a read skew anomaly and a step read skew anomaly), and VS=1, an anomaly occurrence is reported and the loop is terminated. In this case, a data anomaly type is a read anomaly, which includes a read skew anomaly with two variables, and a step read skew anomaly with three or more variables (a non-repeatable read anomaly with one variable has been identified in the data read phase, and there is no need to repeat identification in the anomaly detection phase).

Optionally, if the isolation level parameter is greater than or equal to RR (forbids a write skew anomaly and sawtooth write skew anomaly), and VS is greater than or equal to 2, an anomaly occurrence is reported and the loop is terminated. In this case, the data anomaly type is a write anomaly, which includes a write skew anomaly with two variables, and a sawtooth write skew anomaly with three or more variables.

Situation 2. Otherwise, if the target transaction T and $T_L$ do not form dynamic edge intersection, when the isolation level parameter=S, the node device also may check whether integrity constraint exists. If data read and write by the transaction violates the integrity constraint, an anomaly occurrence is reported and the loop is terminated. A predicate write skew anomaly that cannot be resolved in the DLI-M algorithm can be detected by using the integrity constraint.

That is to say, after detecting that the dynamic edge intersection does not exist based on DLI and VS, a target detection result between the concurrent transaction $T_L$ and target transaction T is originally set as that "a data anomaly does not exist", but in an S level, the predicate write skew anomaly also may be identified (the DLI-M algorithm cannot identify). Therefore, the node device performs, when an isolation level of a database system is S, integrity constraint detection on an $L^{th}$ concurrent transaction $T_L$ and the target transaction T. When the integrity constraint is violated between the concurrent transaction $T_L$ and the target transaction T, the target detection result is adjusted to that a data anomaly exists and a data anomaly type is the predicate write skew anomaly. A process of detecting integrity constraint is described in detail in the next embodiment.

Situation 3. Otherwise, if the target transaction T and $T_L$ do not form dynamic edge intersection and meet integrity constraint, there is no anomaly, and dynamic edge merging is performed on the target transaction T and $T_L$, and a new transaction is set as T-new.

During a process of dynamic edge merging, the node device merges the read set of the concurrent transaction $T_L$ into the read set of the target transaction T, and merges the write set of the concurrent transaction $T_L$ into the write set of the target transaction T. If the concurrent transaction $T_L$ is not committed, let a target parameter of T-new auto-increment by 1, that is, let no_committed++(auto-incrementing by 1) which represents that a new transaction obtained through merging the merger has components of read-write set of a committed transaction; and let T=T-new, assign T-new to T, and then execute the next loop.

(4.3.6) If there is still no anomaly report at the end of the loop, the target transaction T may be committed. Serializable is guaranteed if the isolation level parameter=S (4.3.7) In SDLI-M algorithm, the linked list TS of this anomaly detection can also be recorded, and the current transaction can be removed from it for the next use, so that oldTS=TS-T, so as to achieve real-time maintenance of oldTS. Optionally, there may be many merged logical transactions in TS, so that a length of TS is reduced, which saves a storage space, and also helps to speed up determining of each subsequent operation.

In some embodiments, an intersection or union between different sets may be obtained within linear time complexity by using a hash table as a data structure of sets.

(2) Improved Upper-Based Anomaly Detection Method (4.1) A target transaction to be determined that currently enters the verification phase is T, and an initial value of the transaction T is a physical transaction, and becomes a logical transaction after dynamic edge merging.

(4.2) Take out a first transaction from a linked list TS and set it as $T_L$, and initialize T.upper and $T_L$.upper respectively, that is, set initial values of some subordinate variables: T.upper=false; and $T_L$.upper=false.

(4.3) Loop the following operations after initializing the upper values of the two transactions T and $T_L$, until the linked list is empty:

(4.3.1) Obtain a first set $S1=DS_R(T) \cap DS_W(T_L)$, where S1 is an intersection between a read set of the target transaction T and a write set of a concurrent transaction $T_L$. For each variable x in S1, if a version of the variable x read by the target transaction T is greater than or equal to a version of the variable x written by the concurrent transaction $T_L$, T.upper=true is set; otherwise, $T_L$.upper=true is set.

(4.3.2) Obtain a second set $S2=DS_R(T_L) \cap DS_W(T)$, where S2 is an intersection between a write set of the target transaction T and a read set of the concurrent transaction $T_L$.

For each variable x in S2, if a version of the variable x written by the target transaction T is greater than a version of the variable x read by the concurrent transaction $T_L$, T.upper=true is set; otherwise, $T_L$.upper=true is set.

(4.3.3) Obtain a third set $S3=DS_W(T) \cap DS_W(T_L)$, where S3 is an intersection between the write set of the target transaction T and the write set of the concurrent transaction $T_L$.

(4.3.4) Obtain a fourth set $S4=DS_R(T_L) \cap DS_R(T)$, where S4 is an intersection between the read set of the target transaction T and the read set of the concurrent transaction $T_L$. For each variable x in S4, if a version of the variable x read by the target transaction T is greater than a version of the variable x read by the concurrent transaction $T_L$, T.upper=true is set; if the version of the variable x read by the target transaction T is less than the version of the variable x read by the concurrent transaction $T_L$, $T_L$.upper=true is set; and if the version of the variable x read by the target transaction T is equal to the version of the variable x read by the concurrent transaction $T_L$, no operation is performed.

(4.3.5) If S1∪S2∪S3∪S4 is an empty set (simplified calculation is: S1=∅ and S2=∅ and S3=∅ and S4=∅), it means that $T_L$ and T are not concurrent transactions, and $T_L$ is re-added to a tail of the linked list TS.

(4.3.6) Otherwise, S1∪S2∪S3∪S4 is not the empty set, which means that at least one set in S1, S2, S3 and S4 is not the empty set. In this case, $T_L$ and T are the concurrent transactions, and anomaly detection is performed. Once an anomaly is found, the anomaly may be reported, and the target transaction T may be rolled back. An anomaly detection process follows the following rules:

(4.3.6.1) If S3 !=∅, when any one of the following two conditions is met, a node device reports that a write-write anomaly occurs, and the loop is terminated.

Condition 1. If an isolation level parameter !=RWU (an RWU level does not forbid a dirty write anomaly), and $T_L$ is not committed and T.no_committed=1, a write-write conflict exists, and a data anomaly type is the dirty write anomaly.

Condition 2. If the isolation level parameter is greater than or equal to SH (the SH level forbids lost update to occur, so isolation levels higher than or equal to SH report the anomaly), and $T_L$ has been committed and S1∩S3 is not the empty set, a data anomaly is reported, and a data anomaly type is a lost update anomaly.

(4.3.6.2) Otherwise, under a condition of S3=∅, if S1 !=∅, S2 !=∅, or S4 !=∅, it can be divided into the following three situations for discussion:

Situation 1. If the target transaction T and $T_L$ form dynamic edge intersection, an anomaly occurrence is reported and the loop is terminated. In some embodiments, when T.upper=$T_L$.upper=true, it is considered that dynamic edge intersection is formed between the target transaction T and $T_L$. In this case, the node device may report an anomaly occurrence and terminate the loop.

Situation 2. Otherwise, if the target transaction T and $T_L$ do not form dynamic edge intersection, when the isolation level parameter=S, the node device also may check whether integrity constraint exists. If data read and write by the transaction violates the integrity constraint, an anomaly occurrence is reported and the loop is terminated. A predicate write skew anomaly that cannot be resolved in the DLI-M algorithm can be detected by using the integrity constraint.

That is to say, for any concurrent transaction $T_L$, after detecting that the dynamic edge intersection does not exist based on upper values, a target detection result between any concurrent transaction $T_L$ and target transaction T is originally set as that "a data anomaly does not exist, but in an S level, the predicate write skew anomaly also may be identified (the DLI-M algorithm cannot identify). Therefore, the node device performs, when an isolation level of a database system is S, integrity constraint detection on the any concurrent transaction L and the target transaction T. When the integrity constraint is violated between the any concurrent transaction $T_L$ and the target transaction T, the target detection result is adjusted to that a data anomaly exists and a data anomaly type is the predicate write skew anomaly. A process of detecting integrity constraint is described in detail in the next embodiment.

Situation 3. Otherwise, if the target transaction T and $T_L$ do not form dynamic edge intersection and meet integrity constraint, there is no anomaly, and dynamic edge merging is performed on the target transaction T and $T_L$, and a new transaction is set as T-new.

During a process of dynamic edge merging, the node device merges the read set of the concurrent transaction $T_L$ into the read set of the target transaction T, and merges the write set of the concurrent transaction $T_L$ into the write set of the target transaction T. If the concurrent transaction $T_L$ is not committed, let a target parameter of T-new auto-increment by 1, that is, let no_committed++ (auto-incrementing by 1) which represents that a new transaction obtained through merging the merger has components of read-write set of a committed transaction; and let T=T-new, assign T-new to T, and then execute the next loop.

(4.3.7) If there is still no anomaly report at the end of the loop, the target transaction T may be committed. Serializable is guaranteed if the isolation level parameter=S (4.3.8) In SDLI-M algorithm, the linked list TS of this anomaly detection can also be recorded, and the current transaction can be removed from it for the next use, so that oldTS=TS−T, so as to achieve real-time maintenance of oldTS. Optionally, there may be many merged logical transactions in TS, so that a length of TS is reduced, which saves a storage space, and also helps to speed up determining of each subsequent operation.

In some embodiments, an intersection or union between different sets may be obtained within linear time complexity by using a hash table as a data structure of sets.

Efficiency of the SDLI-M algorithm provided in this embodiment of this application is the same as that of the DLI-M algorithm in the above-mentioned embodiment, and the SDLI-M algorithm can be applied to transaction processing of a stand-alone database system. In the SDLI-M algorithm, a node device may determine, when a data anomaly exists between at least one concurrent transaction and a target transaction, an execution result of the target transaction according to a data anomaly type and an isolation level of a database system, the execution result being used for representing committing the target transaction or rolling back the target transaction, thereby achieving at least two different isolation levels.

In some embodiments, the execution result is determined as rolling back the target transaction when the data anomaly type includes a dirty write anomaly and the isolation level is not RWU (corresponding to condition 1 of 4.3.5.1); the execution result is determined as rolling back the target transaction when the data anomaly type includes a lost update anomaly and the isolation level is higher than or equal to SH (corresponding to condition 2 of 4.3.5.1); the execution result is determined as rolling back the target transaction when the data anomaly type includes a read anomaly and the isolation level is higher than or equal to SH (corresponding to the description of an isolation level parameter is greater than or equal to SH in Situation 1 of 4.3.5.2); the execution result is determined as rolling back the target transaction when a data anomaly type includes a write anomaly and the isolation level is higher than or equal to RR (corresponding to the description of an isolation level parameter is greater than or equal to RR in Situation 1 of 4.3.5.2); and the execution result is determined as rolling back the target transaction when the data anomaly type includes a predicate write skew anomaly and the isolation level is S (corresponding to Situation 2 of 4.3.5.2).

All the foregoing example embodiments may be modified or combined in various ways to form additional embodiments of the present disclosure. The description already provided for the foregoing example embodiments may also apply to these additional embodiments. The SDLI-M algorithm provided in the above embodiment can be applied to transaction processing of the stand-alone database system, while in this embodiment of this application, a snapshot-based data state consistency DLI-M for a distributed database system (DSDLI-M) is provided. Before describing the DSDLI-M algorithm, a relationship of isolation levels between a distributed transaction and a sub-transaction is explained first.

In a distributed database system, if an isolation level of a parent transaction is stronger than an isolation level of a sub-transaction, the isolation level of the sub-transaction is forced to be consistent with the isolation level of the parent transaction, that is, the isolation level of the parent transaction represents an isolation level of the entire system. If the isolation level of parent transaction is weaker than the isolation level of the sub-transaction, for a univariate transaction, since a distributed transaction is impossibly formed, the isolation level of the parent transaction is forced to be consistent with the isolation level of the sub-transaction, that is, the isolation level of the sub-transaction represents the isolation level of the entire system; and for a multi-variable transaction, since a distributed anomaly may be formed, new levels need to be defined, and are divided into four levels: F1, F2, F3, and F4 from weak to strong. The relationship of the isolation levels between the distributed transaction and the sub-transaction is shown in Table 7 below.

2) F1-weak 2 level: parent transaction read/write uncommitted+sub-transaction repeatable read (parent RWU+sub RR), which follows sub repeatable read, and overall allows other data anomalies, for example, distributed read skew, distributed read and write skew, distributed step read skew, distributed write skew, distributed predicate write skew, and distributed sawtooth write skew.

3) F1-weak 1 level: parent transaction read/write uncommitted+sub-transaction serializable (parent RWU+sub S), which follows sub serializable, and overall allows other data anomalies, for example, distributed read skew, distributed read and write skew, distributed step read skew, distributed write skew, distributed predicate write skew, and distributed sawtooth write skew.

4) F2-weak 3 level: parent transaction read/write committed+sub-transaction snapshot history (parent RWC+sub SH), which follows sub snapshot history, and overall allows other data anomalies, for example, distributed read skew, distributed read and write skew, distributed step read skew, distributed write skew, distributed predicate write skew, and distributed sawtooth write skew.

5) F2-weak 2 level: parent transaction read/write committed+sub-transaction repeatable read (parent RWC+sub RR), which follows sub repeatable read, and overall allows other data anomalies, for example, distributed read skew, distributed read and write skew, distributed step read skew, distributed write skew, distributed predicate write skew, and distributed sawtooth write skew.

6) F2-weak 1 level: parent transaction read/write committed+sub-transaction serializable (parent RWC+sub S), which follows sub serializable, and overall allows other data anomalies, for example, distributed read skew, distributed read and write skew, distributed step read skew, distributed write skew, distributed predicate write skew, and distributed sawtooth write skew.

7) F3-weak 2 level: parent transaction snapshot history+sub-transaction repeatable read (parent SH+sub RR), which follows sub repeatable read, and overall allows other data anomalies, for example, distributed read skew, distributed read and write skew, distributed step read skew, distributed write skew, distributed predicate write skew, and distributed sawtooth write skew.

TABLE 7

| Parent transaction | Sub-transaction | | | | |
|---|---|---|---|---|---|
| | Read/write uncommitted | Read/write committed | Snapshot history | Repeatable read | Serializable |
| Read/write uncommitted | Read/write uncommitted | Read/write committed | F1-weak 3 | F1-weak 2 | F1-weak 1 |
| Read/write committed | Read/write committed | Read/write committed | F2-weak 3 | F2-weak 2 | F2-weak 1 |
| Snapshot history | Snapshot history | Snapshot history | Snapshot history | F3-weak 2 | F3-weak 1 |
| Repeatable read | Repeatable read | Repeatable read | Repeatable read | Repeatable read | F4-weak 1 |
| Serializable | Serializable | Serializable | Serializable | Serializable | Serializable |

"Snapshot history" is an abbreviation of a snapshot read history SH level. The following describes the newly defined isolation levels.

1) F1-weak 3 level: parent transaction read/write uncommitted+sub-transaction snapshot history (parent RWU+sub SH), which follows sub snapshot history, and overall allows other data anomalies, for example, distributed read skew, distributed read and write skew, distributed step read skew, distributed write skew, distributed predicate write skew, and distributed sawtooth write skew.

8) F3-weak 1 level: parent transaction snapshot history+sub-transaction serializable (parent SH+sub S), which follows sub serializable, and overall allows other data anomalies, for example, distributed read skew, distributed read and write skew, distributed step read skew, distributed write skew, distributed predicate write skew, and distributed sawtooth write skew.

9) F4-weak 1 level: parent transaction repeatable read+sub-transaction serializable (parent RR+sub S), which follows sub serializable, and overall allows other data anomalies, for example, distributed read skew, distributed read and write skew, distributed step read skew, distributed write skew, distributed predicate write skew, and distributed sawtooth write skew.

The isolation levels of the distributed transaction may have the following two definitions:

First, two-level distributed transaction isolation level: as shown in definitions of Table 7, the parent transaction and the sub-transaction may define their own isolation levels respectively, but the overall transaction follows the definition of the isolation levels in Table 7.

Second, unified distributed transaction isolation level: as shown in definitions of bold font in grids of Table 7, the parent transaction and the sub-transaction cannot define their own isolation levels respectively, and the overall transaction follows the definitions of bold font in grids of Table 7.

For the second type of distributed transaction isolation level, Table 8 equivalent to Table 6 may be defined according to Table 6 and the foregoing rules (the definitions of bold font in grids of Table 7), except that a relationship between distributed anomalies and isolation levels is shown in Table 8.

TABLE 8

| | Level | | | | |
|---|---|---|---|---|---|
| Anomaly | Read/write uncommitted | Read/write committed | Snapshot | Repeatable read | Serializable |
| Dirty write | Allowed | Not allowed | Not allowed | Not allowed | Not allowed |
| Dirty read | Allowed | Not allowed | Not allowed | Not allowed | Not allowed |
| Intermediate read | Allowed | Not allowed | Not allowed | Not allowed | Not allowed |
| Non-repeatable read | Allowed | Allowed | Allowed | Not allowed | Not allowed |
| Phantom read | Allowed | Allowed | Allowed | Not allowed | Not allowed |
| Lost update | Allowed | Allowed | Not allowed | Not allowed | Not allowed |
| Read skew (2 variables, distributed) | Allowed | Allowed | Not allowed | Not allowed | Not allowed |
| Read and write skew (2 variables, distributed) | Allowed | Allowed | Not allowed | Not allowed | Not allowed |
| Step read skew (multiple variables, distributed) | Allowed | Allowed | Not allowed | Not allowed | Not allowed |
| Write skew (2 variables, distributed) | Allowed | Allowed | Allowed | Not allowed | Not allowed |
| Predicate write skew (multiple variables, distributed) | Allowed | Allowed | Allowed | Allowed | Not allowed |
| Sawtooth write skew (multiple variables, distributed) | Allowed | Allowed | Allowed | Not allowed | Not allowed |

It shows that, in the stand-alone system, the isolation levels need to be set based on Table 6 or Table 8 (which are substantially identical); and in the distributed database system, according to Table 8, especially the anomalies corresponding to columns marked with distributed anomalies in Table 8 (the data anomalies include the read skew, the read and write skew, the step read skew, the write skew, the predicate write skew, and the sawtooth write skew), respective corresponding data anomalies need to be resolved in the distributed database system at different levels, and the various distributed anomalies corresponding to Table 8 are respectively resolved on each sub-node of the distributed database system at different levels. For example, at the snapshot history level, the read skew may be resolved on a single node and also on the distributed database system.

Based on the provided isolation levels of the distributed transaction, for the unified distributed transaction isolation level (the second type of distributed transaction isolation level), the DSDLI-M algorithm is also provided in this application embodiments based on the SDLI-M algorithm, and can be applied to a distributed transactional database system by using a global snapshot technology. The details are as follows.

1. A method for constructing a snapshot point, namely, a global snapshot point construction method (1.1) Construct a global hybrid logical clock by using an HLC algorithm. It means that respective logical clocks on sub-nodes are synchronized in a causal order (globally increment) through HLC, while clocks of local transactions on a single node may auto-increment (locally increment). In an HLC timestamp, a triplet {pt, l, c} may be used for representing a local physical clock (pt, the first element in the triplet) and a hybrid logical clock (l and c, the second and third elements in the triplet respectively).

(1.2) Assign a snapshot point by using the HLC algorithm when a first SQL statement of a transaction is executed on a transaction coordinator (namely, obtain a latest HLC value on the coordinator as the snapshot point). That is, get Snapshot Set=Ss={St}, St is a time value assigned by global HLC.

(1.3) When SQL statements of a distributed transaction are executed, the transaction coordinator distributes a snapshot St to sub-nodes as the SQL statements are executed on the sub-nodes.

(1.4) Perform an HLC-based data item visibility determining algorithm on each sub-node:

(1.4.1) A read committed rule is met.

(1.4.2) A version chain of data items is stored in order from new to old, and the chain is traversed until a first newer data item that meets the algorithm in (1.4.3) below is found.

(1.4.3) According to a given HLC value (afferent from the transaction coordinator), assuming that the HLC value is local_HLC, a triplet thereof is {10, 10, 0}, version chains of the sub-nodes are traversed, so that a data version with the same value as local_HLC.1 (the value is 10) is found. Then, one version backward is read, and the version is a version in global read consistency.

Figure 12:
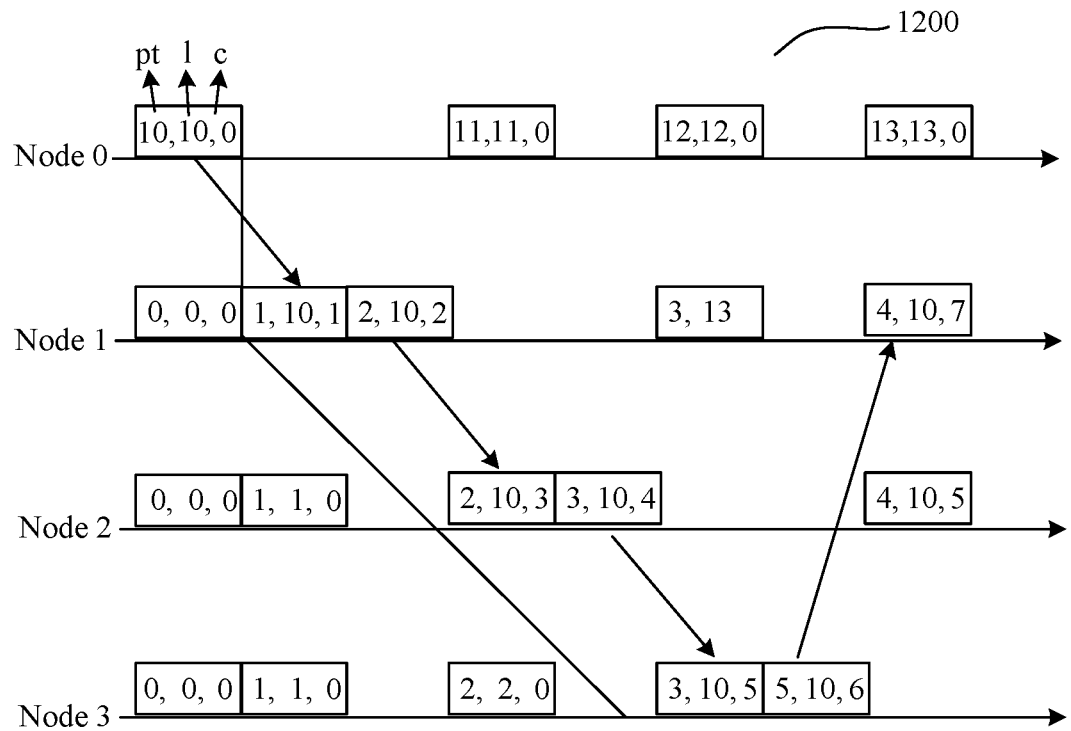
FIG. 12 is a schematic principle diagram of establishing a global snapshot based on a hybrid logical clock (HLC) according to an embodiment of this application.

FIG. 12 is a schematic diagram of establishing a global snapshot based on HLC provided by an embodiment of this application. As shown in 1200, a value of a thicker solid line along a logic clock c is 0 from a node 0 to a node 1, and to a node 3, and changes of triplets are: a node 0 {10, 10, 0}, a node 1 {0, 0, 0}, a node 2 {1, 1, 0}, a node 3 {2, 2, 0}, which represent that in such a state, the four nodes are in a consistency state, that is, largest versions with the same value of the logical clock c conform to a consistency state. In FIG. 12, a solid line arrow indicates that Send and Receive events occur between two nodes, connection between at least two triplets on the same node indicates that a local event occurs.

(1.4.4) The data item visibility determining algorithm requires a data structure of a commitment timestamp tc on a data version to be consistent with HLC, that is, requires that the commitment timestamp is also a timestamp assigned based on the HLC algorithm.

(1.5) There may be at least two transaction coordinators in a cluster. the transaction coordinators correspond to a coordinator node device, and a sub-node corresponds to a data node device. When there is one transaction coordinator, the transaction coordinator corresponds to a centralized transaction processing technology. When there are at least two transaction coordinators, the transaction coordinators correspond to a decentralized transaction processing technology.

(1.6) Obtain the commitment timestamp tc from the global HLC when a transaction is committed, and then modify a timestamp value of a transaction commitment identification on each sub-node.

2. Transaction Manager

In a cluster, a transaction manager (a database instance of each physical node has a transaction manager) acts as a transaction coordinator. A transaction coordinator (a coordinator node device) initiates a transaction, which is referred to as a parent transaction. Transactions executed on different sub-nodes (data node devices) are referred to as sub-transactions. The parent transaction and the sub-transactions are identified through a global transaction identification tid, each sub-transaction has its own identification ctid, and a complete identification of a transaction on a sub-node is {tid, ctid}.

When a first SQL statement of a target transaction T is executed on a coordinator node device, a snapshot for the target transaction T is established. The coordinator node device sends the snapshot to each data node device involved in the target transaction T. That is, a snapshot in form of HLC may be used in a distributed database system, and the snapshot in form of HLC is sent by the coordinator node device.

When the target transaction T is committed, each data node device respectively determines whether a data anomaly exists on this node by using a DLI-M algorithm, that is, obtains an anomaly detection result of this node. If the anomaly detection result of this node is that the data anomaly exists, a local sub-transaction is rolled back and a message is sent to notify a parent transaction of the coordinator node device, and then the parent transaction notifies sub-transactions of other related data node devices, so as to perform global transaction rollback.

If the anomaly detection result of this node is that the (single-node) data anomaly does not exist, but it cannot ensure whether the data anomaly exists on other data node devices, the coordinator node device may report summarized related information reported by each data node device to the parent transaction, and the parent transaction determines whether a global data anomaly exists. If the global data anomaly exists, a message is sent to each data node device, and each data node device performs global rollback; otherwise, the transaction is committed successfully.

3. Data Read Phase

In some embodiments, in a data read phase of the DSDLI-M algorithm, if an isolation level parameter <RR (the isolation level is lower than RR), each time a read operation is performed, a snapshot is obtained. In this case, if each read has a new snapshot, a phantom read anomaly is allowed to occur. otherwise, if the isolation level parameter is greater than or equal to RR (the isolation level is higher than or equal to RR), a snapshot is obtained when the read operation is performed for the first time, and each subsequent read operation uses the snapshot obtained for the first time for reading data. In this case, using the first snapshot can avoid occurrence of the phantom read anomaly and a non-repeatable read anomaly. The non-repeatable read anomaly of one variable has been identified in the data read phase, so there is no need to enter the DLI-M algorithm for identification. In this case, it is to avoid a certain type of data anomaly, rather than to detect an anomaly and roll back a transaction, so there is no step to report the anomaly and terminate the transaction.

In some embodiments, When the isolation level parameter is greater than or equal to RWC, the DSDLI-M algorithm is consistent with the HLC-based visibility determining algorithm involved in the above "transaction read-write set formation algorithm in the read-write phase". However, when the isolation level parameter <RWC, the above HLC-based visibility determining algorithm may be modified, so that a latest uncommitted version can be read, thereby achieving an RWU level.

In some embodiments, if an OCC framework is used, when the isolation level parameter is higher than RR, a second read operation in each transaction first verifies whether there is an object to be read from a read set and a write set, and if there is an object to be read, the object to be read is obtained from the read-write set; otherwise, the object to be read may be obtained from an underlying storage layer.

The data read phase of the DSDLI-M algorithm herein is similar to the data read phase of the SDLI-M algorithm as described in the previous embodiment.

4. Perform the Algorithm in the Preparation Phase when Each Operation Occurs

When each operation (read or write) of a target transaction T occurs, the preparation phase is entered and preparation is started. The preparation phase is used for performing preparation of transaction concurrent access control anomaly verification for whether the target transaction T may be committed.

In the preparation phase, a node device enters a critical zone, traverses a read set and a write set of the target transaction T, finds out transaction identifications of all concurrent transactions of the target transaction T, stores the transaction identifications in a linked list TS, and exits the critical zone after finding the transaction identifications. In a memory, each data item stores a transaction identification of a transaction that has read or written the data item but has not yet been committed.

In some embodiments, When the DSDLI-M algorithm is coupled to the OCC algorithm, an algorithm in the preparation phase corresponds to a verification phase of the OCC.

In some embodiments, if an existing linked list oldTS is not empty, a target transaction is directly added to the TS (namely, TS=oldTS+T), and a read set and a write set of the target transaction are no longer traversed, thereby reducing traversal logic of a read-write set and improving transaction processing efficiency.

The above algorithm in the preparation phase is similar to the algorithm in the preparation phase described by the above SDLI-M algorithm.

5. Sub-Node Transaction Verification Algorithm

A sub-node transaction verification algorithm provided by the DSDLI-M algorithm is similar to the improved DLI-M algorithm provided by the SDLI-M algorithm, but there are still some differences.

In some embodiments, when the DSDLI-M algorithm is coupled to the OCC algorithm, the sub-node transaction verification corresponds to the verification phase of OCC, that is, when an operation occurs, the coordinator node device starts verification immediately rather than waiting until the verification phase of the OCC is entered. This process is referred to as a "sub-node removal" process, and a purpose of this rule is to accelerate execution speeds of sub-transactions, thereby improving overall transaction response efficiency of a cluster system.

For each data node device (each sub-node), a linked list TS thereof is referred to as cTS, which is maintained in real time on the sub-node. If there is no transaction occurrence, a sub-transaction or local transaction that occurs newly is maintained to enter the cTS. A maintenance method for cTS of each sub-node is the same as a maintenance method of TS described in a stand-alone system.

In the DSDLI-M algorithm, the sub-node transaction verification algorithm still includes two different types, the first is an improved DLI and VS-based anomaly detection method, and the second is an improved upper-based anomaly detection method, which are classified and discussed below.

(1) DLI and VS-Based Sub-Node Transaction Verification Method (5.1) When each operation occurs, set initial values of some variables subordinate to an operation level: DLI=0; and VS=0.

(5.2) Take out a first transaction from a sub-node's linked list cTS and set it as $T_L$, and loop the following operations until the linked list is empty.

(5.2.1) Obtain a first set $S1=DS_R(T) \cap DS_W(T_L)$, where S1 is an intersection of a read set of a sub-transaction T corresponding to a target transaction (a parent transaction) and a write set of a concurrent transaction $T_L$. If S1 is not empty, DLI=DLI++; and if data states of a non-empty element are different in S1, VS=VS++.

(5.2.2) Obtain a second set $S2=DS_R(T_L) \cap DS_W(T)$, where S2 is an intersection between a write set of the sub-transaction T and a read set of the concurrent transaction $T_L$. If S1 is not empty, DLI=DLI++; and if data states of a non-empty element are different in S2, VS=VS++.

(5.2.3) Obtain a third set $S3=DS_W(T) \cap DS_W(T_L)$, where S3 is an intersection between the read set of the sub-transaction T and the write set of the concurrent transaction $T_L$.

(5.2.4) If S1∪S2∪S3 is an empty set (simplified calculation is: S1=∅ and S2=∅ and S3=∅), it means that $T_L$ and T are not concurrent transactions, and $T_L$ is re-added to a tail of the linked list cTS.

(5.2.5) Otherwise, S1∪S2∪S3 is not the empty set, $T_L$ and T are the concurrent transactions, and anomaly detection is performed. Once an anomaly is found, a local sub-transaction T is rolled back and a rollback message of the target transaction is returned to the parent transaction immediately. An anomaly detection process follows the following rules:

(5.2.5.1) If S3 !=∅, when any one of the following two conditions is met, a sub-node reports that a write-write anomaly occurs, and the loop is terminated Condition 1, if an isolation level parameter !=RWU (an RWU level does not forbid a dirty write anomaly), and $T_L$ is not committed and T.no_committed=1, a write-write conflict exists, and a data anomaly type is the dirty write anomaly.

Condition 2, if the isolation level parameter is greater than or equal to SH (the SH level forbids lost update to occur, so isolation levels higher than or equal to SH level report the anomaly), and $T_L$ has been committed and S1∩S3 is not the empty set, a data anomaly is reported, and a data anomaly type is a lost update anomaly.

(5.2.5.2) Otherwise, under a condition of S3=∅, if S1 !=∅ or S2 !=∅, it can be divided into the following three situations for discussion:

Situation 1. If the sub-transaction T and $T_L$ form dynamic edge intersection, an anomaly occurrence is reported and the loop is terminated. In some embodiments, when DLI is greater than or equal to 2, it is considered that the dynamic edge intersection is formed between the sub-transaction T and $T_L$. In this case, the node device may determine whether to report an anomaly occurrence and terminate the loop according to an isolation level, and determine a data anomaly type according to VS.

Optionally, if the isolation level parameter is greater than or equal to SH (forbids a read skew anomaly and a step read skew anomaly), and VS=1, an anomaly occurrence is reported and the loop is terminated. In this case, a data anomaly type is a read anomaly, which includes a read skew anomaly with two variables, and a step read skew anomaly with three or more variables (a non-repeatable read anomaly with one variable has been identified in the data read phase, and there is no need to repeat identification in the anomaly detection phase).

Optionally, if the isolation level parameter is greater than or equal to RR (forbids a write skew anomaly and sawtooth write skew anomaly), and VS is greater than or equal to 2, an anomaly occurrence is reported and the loop is terminated. In this case, the data anomaly type is a write anomaly, which includes a write skew anomaly with two variables, and a sawtooth write skew anomaly with three or more variables.

Situation 2. Otherwise, if the sub-transaction T and $T_L$ do not form dynamic edge intersection, when the isolation level parameter=S, the node device also may check whether integrity constraint exists. If data read and write by the transaction violates the integrity constraint, an anomaly occurrence is reported and the loop is terminated. A predicate write skew anomaly that cannot be resolved in the DLI-M algorithm can be detected by using the integrity constraint.

Situation 3. Otherwise, if the sub-transaction T and $T_L$ do not form dynamic edge intersection, and meet integrity constraint, there is no anomaly, and dynamic edge merging is performed on the sub-transaction T and $T_L$, and a new transaction is set as T-new.

During a process of dynamic edge merging, the node device merges the read set of the concurrent transaction $T_L$ into the read set of the sub-transaction T, and merges the write set of the concurrent transaction $T_L$ into the write set of the sub-transaction T. If the concurrent transaction $T_L$ is not committed, let a target parameter of T-new auto-increment by 1, that is, let no_committed++(auto-incrementing by 1) which represents that a new transaction obtained through merging the merger has components of read-write set of a committed transaction; and let T=T-new, assign T-new to T, and then execute the next loop.

(5.2.6) If there is still no anomaly report at the end of the loop, the transaction T may be partially committed. The sub-transaction T sends a dependency relationship of the sub-transaction T and no local anomaly information to the parent transaction (that is, an anomaly detection result of a single node).

(5.2.7) The linked list cTS of this anomaly detection is recorded, the transaction is removed from the linked list for next use, so that oldTS=cTS-T, to achieve real-time maintenance of oldTS. Optionally, the cTS may also include many merged logical transactions, so that a length of the cTS is reduced, thereby saving a storage space and helping accelerate determining of subsequent operations.

In some embodiments, an intersection or union between different sets may be obtained within linear time complexity by using a hash table as a data structure of sets.

2. Upper-Based Sub-Node Transaction Verification Method (5.1) When each operation occurs, take out a first transaction from a sub-node's linked list cTS and set it as $T_L$, and respectively initialize T.upper and $T_L$.upper, that is, set the initial values of some subordinate variables: T.upper=false; and $T_L$.upper=false.

(5.2) Loop the following operations after initializing the upper values of the two transactions T and $T_L$, until the linked list is empty:

(5.2.1) Obtain a first set $S1=DS_R(T) \cap DS_W(T_L)$, where S1 is an intersection of a read set of a sub-transaction T corresponding to a target transaction (a parent transaction) and a write set of a concurrent transaction $T_L$. For each variable x in S1, if a version of the variable x read by the sub-transaction T is greater than or equal to a version of the variable x written by the concurrent transaction $T_L$, T.upper=true is set; otherwise, $T_L$.upper=true is set.

(5.2.2) Obtain a second set $S2=DS_R(T_L) \cap DS_W(T)$, where S2 is an intersection between a write set of the sub-transaction T and a read set of the concurrent transaction $T_L$. For each variable x in S2, if a version of the variable x written by the sub-transaction T is greater than a version of the variable x read by the concurrent transaction $T_L$, T.upper=true is set; otherwise, $T_L$.upper=true is set.

(5.2.3) Obtain a third set $S3=DS_W(T) \cap DS_W(T_L)$, where S3 is an intersection between the read set of the sub-transaction T and the write set of the concurrent transaction $T_L$.

(5.2.4) Obtain a fourth set $S4=DS_R(T_L) \cap DS_R(T)$, where S4 is an intersection between the read set of the sub-transaction T and the read set of the concurrent transaction $T_L$. For each variable x in S4, if a version of the variable x read by the sub-transaction T is greater than a version of the variable x read by the concurrent transaction $T_L$, T.upper=true is set; if the version of the variable x read by the sub-transaction T is less than the version of the variable x read by the concurrent transaction $T_L$, $T_L$.upper=true is set; and if the version of the variable x read by the sub-transaction T=the version of the variable x read by the concurrent transaction $T_L$, no operation is performed.

(5.2.5) If S1∪S2∪S3∪S4 is an empty set, (simplified calculation is: S1=∅ and S2=∅ and S3=∅ and S4=∅), it means that $T_L$ and T are not concurrent transactions, and the $T_L$ is re-added to a tail of the linked list cTS.

(5.2.6) Otherwise, S1∪S2∪S3∪S4 is not the empty set, L and T are the concurrent transactions, and anomaly detection T is performed. Once an anomaly is found, a local sub-transaction T is rolled back and a rollback message of the target transaction is returned to the parent transaction immediately. An anomaly detection process follows the following rules:

(5.2.6.1) If S3 !=∅, when any one of the following two conditions is met, a node device reports that a write-write anomaly occurs, and the loop is terminated.

Condition 1, if an isolation level parameter !=RWU (an RWU level does not forbid a dirty write anomaly), and $T_L$ is not committed and T.no_committed=1, a write-write conflict exists, and a data anomaly type is the dirty write anomaly.

Condition 2, if the isolation level parameter is greater than or equal to SH (the SH level forbids lost update to occur, so isolation levels higher than or equal to SH level report the anomaly), and $T_L$ has been committed and S1∩S3 is not the empty set, a data anomaly is reported, and a data anomaly type is a lost update anomaly.

(5.2.6.2) Otherwise, under a condition of S3=∅, if S1 !=∅, S2 !=∅, or S4 !=∅, it can be divided into the following three situations for discussion:

Situation 1. If the sub-transaction T and $T_L$ form dynamic edge intersection, an anomaly occurrence is reported and the loop is terminated. In some embodiments, When T.upper=$T_L$.upper=true, it is considered that dynamic edge intersection is formed between the sub-transaction T and $T_L$. In this case, the node device may report an anomaly occurrence and terminate the loop.

Situation 2. Otherwise, if the sub-transaction T and $T_L$ do not form dynamic edge intersection, when the isolation level parameter=S, the node device also may check whether integrity constraint exists. If data read and write by the transaction violates the integrity constraint, an anomaly occurrence is reported and the loop is terminated. A predicate write skew anomaly that cannot be resolved in the DLI-M algorithm can be detected by using the integrity constraint.

Situation 3. Otherwise, if the sub-transaction T and $T_L$ do not form dynamic edge intersection, and meet integrity constraint, there is no anomaly, and dynamic edge merging is performed on the sub-transaction T and $T_L$, and a new transaction is set as T-new.

During a process of dynamic edge merging, the node device merges the read set of the concurrent transaction $T_L$ into the read set of the sub-transaction T, and merges the write set of the concurrent transaction $T_L$ into the write set of the sub-transaction T. If the concurrent transaction $T_L$ is not committed, let a target parameter of T-new auto-increment by 1, that is, let no_committed++(auto-incrementing by 1) which represents that a new transaction obtained through merging the merger has components of read-write set of a committed transaction; and let T=T-new, assign T-new to T, and then execute the next loop.

(5.2.7) If there is still no anomaly report at the end of the loop, the transaction T may be partially committed. The sub-transaction T sends a dependency relationship of the sub-transaction T and no local anomaly information to the parent transaction (that is, an anomaly detection result of a single node).

(5.2.8) The linked list cTS of this anomaly detection is recorded, the transaction is removed from the linked list for next use, so that oldTS=cTS-T, to achieve real-time maintenance of oldTS. Optionally, the cTS may also include many merged logical transactions, so that a length of the cTS is reduced, thereby saving a storage space and helping accelerate determining of subsequent operations.

In some embodiments, an intersection or union between different sets may be obtained within linear time complexity by using a hash table as a data structure of sets.

After a parent node (that is, a transaction coordinator, or a coordinator node device) summarizes the dependency relationship and the anomaly detection result of each sub-node (that is, the data node device), a parent node transaction verification algorithm may be invoked to perform global anomaly detection, so as to determine whether to finally commit or roll back the target transaction. This embodiment of this application provides two parent node transaction verification algorithms, including a DLI-M algorithm and a dependency relationship detection algorithm. The DLI-M algorithm can detect distributed anomalies except a predicate write skew anomaly, and the dependency relationship detection algorithm can detect the predicate write skew anomaly, which are introduced respectively in point 6 and 7.

6. Parent Node Transaction Verification Algorithm 1 (the DLI-M Algorithm)

According to the isolation levels of the distributed transaction (Table 8), under different isolation levels, the distributed transaction on a transaction coordinator also may respectively solve five types of distributed anomaly, including a read skew anomaly, a step read skew anomaly, a write skew anomaly, a predicate write skew anomaly, and a sawtooth write skew anomaly. In these five anomalies, except the predicate write skew anomaly, the other four types of anomalies may be resolved by using a similar DLI-M algorithm on a parent transaction, namely, a coordinator node. The predicate write skew anomaly (corresponding to an S level), may be resolved by performing integrity constraint verification on a coordinator node device in which the parent transaction is located.

Information required by the DLI-M algorithm is constructed on the parent transaction, namely, the coordinator: the parent transaction acquires information of read sets and write sets of a sub-transaction and conflicting concurrent transactions (at least one concurrent transaction) recorded on data items/variable versions, and invokes the DLI-M algorithm during a commitment phase of the transaction, to realize distributed transaction verification of different isolation levels. The distributed transaction verification is mainly to verify the read skew anomaly, the step read skew anomaly, the write skew anomaly, and the sawtooth write skew anomaly, and to check and verify the predicate write skew anomaly through an integrity constraint.

7. Parent Node Transaction Verification Algorithm 2 (the Dependency Relationship Detection Algorithm)

(7.1) When a sub-transaction has been identified and there is no data anomaly in a local node, before a sub-transaction is ready to return a message to a parent transaction, the sub-transaction may construct a dependency relationship of the concurrent transaction according to a dependency graph, and return the dependency relationship to the parent transaction.

Figure 13:
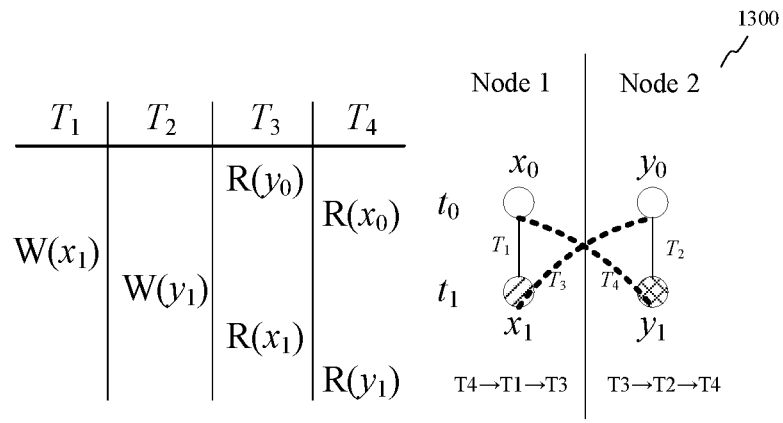
FIG. 13 is a schematic principle diagram of a read anomaly of a distributed transaction formed by four transactions on two nodes according to an embodiment of this application.

FIG. 13 is a schematic principle diagram of a read anomaly of a distributed transaction formed by four transactions on two nodes according to an embodiment of this application. As shown in 1300, on two physical nodes Node1 and Node2, four transactions $T_1$ to $T_4$ are executed concurrently, $T_4 \rightarrow T_1 \rightarrow T_3$ on Node1 forms a dependency graph, and $T_3 \rightarrow T_2 \rightarrow T_4$ on Node2 forms a dependency graph.

Figure 14:
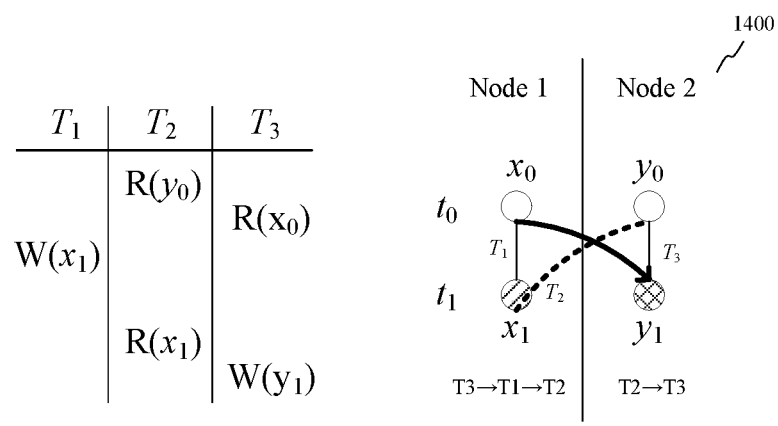
FIG. 14 is a schematic principle diagram of a write anomaly of a distributed transaction formed by three transactions on two nodes according to an embodiment of this application.

FIG. 14 is a schematic principle diagram of a write anomaly of a distributed transaction formed by three transactions on two nodes according to an embodiment of this application. As shown in 1400, on two physical nodes Node1 and Node2, three transactions $T_1$ to $T_3$ are executed concurrently, $T_3 \rightarrow T_1 \rightarrow T_2$ on Node1 forms a dependency graph, and $T_2 \rightarrow T_3$ on Node2 forms a dependency graph.

(7.2) The parent transaction constructs a global dependency graph according to the dependency graphs of at least two sub-transactions returned by sub-nodes. If there is no cycle in the global dependency graph, there is no dependency cycle in an entire distributed transaction, and the integrity constraint is not destroyed. Therefore, an S isolation level is conformed.

(7.3) Otherwise, if the integrity constraint is destroyed, an RR isolation level is conformed.

(7.4) When there is a cycle in (7.3) above:

(7.4.1) As mentioned above, in an example shown in FIG. 13, the parent transaction acquires the $T_4 \rightarrow T_1 \rightarrow T_3$ dependency graph of Node1 and the $T_3 \rightarrow T_2 \rightarrow T_4$ dependency graph of Node2, and merges the dependency graphs into the global dependency graph as $T_4 \rightarrow T_1 \rightarrow T_3 \rightarrow T_2 \rightarrow T_4$, so that both ends are $T_4$, so there is a cycle in the global dependency graph. Therefore, serializable cannot be performed, and the transactions $T_4$ are formed by two read operations, and a read skew or step read skew anomaly is detected. If an isolation level parameter is greater than or equal to SH (the isolation level is higher than or equal to snapshot history SH), the parent transaction and all sub-transactions are rolled back (that is, the target transaction is rolled back), and an anomaly is reported.

(7.4.2) As mentioned above, in an example shown in FIG. 14, the parent transaction acquires the $T_3 \rightarrow T_1 \rightarrow T_2$ dependency graph of Node1 and the $T_2 \rightarrow T_3$ dependency graph of Node2, and merges the dependency graphs into a global dependency graph as $T_3 \rightarrow T_1 \rightarrow T_2 \rightarrow T_3$, so that both ends are $T_3$, so there is a cycle in the global dependency graph. Therefore, serializable cannot be performed, and the transactions $T_3$ are formed by read and write operations respectively, and a write skew or sawtooth write skew anomaly is detected. If an isolation level parameter is greater than or equal to RR (the isolation level is higher than or equal to the repeatable read RR), the parent transaction and all sub-transactions are rolled back (that is, the target transaction is rolled back), and an anomaly is reported.

(7.4.3) The dependency relationship detection algorithm transfers related information of the dependency graphs between the parent transaction and the sub-transactions, and the read-write sets are not transferred between the parent transaction and the sub-transactions. Therefore, the dependency relationship detection algorithm has a great advantage for the realization of a serializable isolation level of a large result set transaction.

The DSDLI-M algorithm provided by the embodiments of this application may be applicable to transaction processing of a distributed transactional database system. In the DSDLI-M algorithm, an association relationship between different isolation levels and distributed transactions is described through a technology of processing isolation levels through the sub-nodes and the parent node, so that distributed transactions also have the ability to have multiple isolation levels.

All the foregoing example embodiments may be modified or combined in various ways to form additional embodiments of the present disclosure. The description already provided for the foregoing example embodiments may also apply to these additional embodiments. In the embodiments of this application, the data state consistency model is improved, and various data anomalies are formally defined according to the data state consistency model, so that the definitions of data anomalies are standardized and mathematical. According to the definitions of data anomalies provided in the embodiment of this application, a five-level isolation level system of a new stand-alone transactional database that is different from the conventional isolation level technology is proposed, and a standard for establishing the isolation levels is clearly proposed. Two basic concurrent access control algorithms (the DLI-M algorithm and the SDLI-M algorithm) suitable for the stand-alone system are proposed. With reference to the definitions of data anomalies and the definitions of isolation levels, a method of how to achieve different isolation levels is given in the algorithm. An association relationship between isolation levels of the distributed transaction and isolation levels of the stand-alone system is proposed, and a five-level isolation level system of a distributed transaction systems is defined. Based on the distributed isolation levels and the above basic algorithms, a concurrent access control technology (the DSDLI-M algorithm) suitable for distributed transaction processing is proposed. The DSDLI-M algorithm describes a process of each phase of transaction processing, and gives at least two different sub-algorithms to implement concurrency control of the parent transaction.

Figure 15:
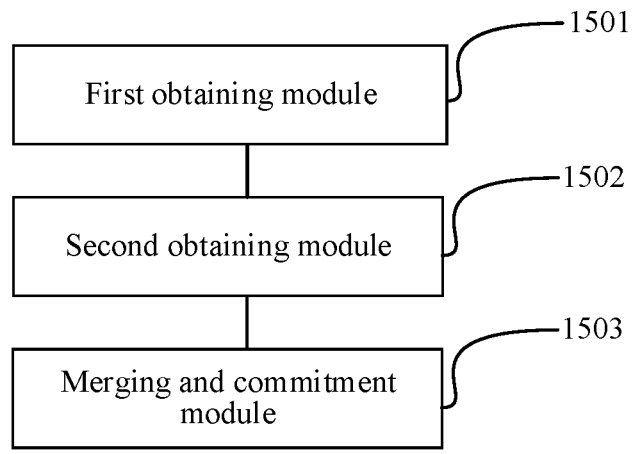
FIG. 15 is a schematic structural diagram of a transaction processing apparatus according to an embodiment of this application.

FIG. 15 is a schematic structural diagram of a transaction processing apparatus according to an embodiment of this application. Referring to FIG. 15, the apparatus includes:
- a first obtaining module 1501, configured to obtain, in a case that read and write operations of a target transaction is executed, at least one concurrent transaction of the target transaction, the at least one concurrent transaction and the target transaction performing read and write operations on a same data item during transaction execution;
- a second obtaining module 1502, configured to determine, according to read and write sets of the at least one concurrent transaction and the target transaction, whether a data anomaly exists between the at least one concurrent transaction and the target transaction; and
- a merging and commitment module, configured to merge the read and write sets of the at least one concurrent transaction and the target transaction in a case that the data anomaly does not exist between the at least one concurrent transaction and the target transaction, to commit the target transaction.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

According to the apparatus provided by the embodiments of this application, in a case that read and write operations of a target transaction are executed, at least one concurrent transaction of the target transaction is obtained, a data anomaly not existing between the at least one concurrent transaction and the target transaction is determined according to read-write sets of the at least one concurrent transaction and the target transaction, and the read-write sets of the at least one concurrent transaction and the target transaction are merged, to commit the target transaction. This method can comprehensively detect various data anomalies in the database system when operations of the target transaction are executed, to ensure data state consistency. Based on ensuring the data state consistency, the transaction processing mechanism neither completely relies on a locking technology nor completely relies on a dependency graph technology, and does not limit concurrency of the database system, thereby improving transaction processing efficiency of the database system.

In some embodiments, based on the apparatus composition of FIG. 15, the second obtaining module 1502 includes:
- an obtaining sub-module, configured to obtain, for an $L^{th}$ concurrent transaction in the at least one concurrent transaction, a target detection result between the $L^{th}$ concurrent transaction and the target transaction according to read-write sets of the $L^{th}$ concurrent transaction and the target transaction, L being a positive integer; and
- a determining sub-module, configured to perform, in a case that the target detection result is that the data anomaly does not exist, the step of obtaining the target detection result on an $(L+1)^{th}$ concurrent transaction in the at least one concurrent transaction, until target detection results of the at least one concurrent transaction are all determined as that the data anomaly does not exist, to determine that the data anomaly does not exist between the at least one concurrent transaction and the target transaction.

In some embodiments, based on the apparatus composition in FIG. 15, the obtaining sub-module includes:
- a first obtaining unit, configured to obtain a first set, a second set, and a third set, wherein the first set is an intersection between a read set of the target transaction and a write set of the $L^{th}$ concurrent transaction, the second set is an intersection between a write set of the target transaction and a read set of the $L^{th}$ concurrent transaction, and the third set is an intersection between the write set of the target transaction and the write set of the $L^{th}$ concurrent transaction;
- a second obtaining unit, configured to obtain, in a case that the third set is not an empty set, the target detection result according to commitment situations of the target transaction and the $L^{th}$ concurrent transaction, the first set, and the third set; and
- a third obtaining unit, configured to obtain, in a case that the third set is the empty set and at least one of the first set or the second set is not the empty set, the target detection result according to the first set and the second set.

In some embodiments, based on the apparatus composition in FIG. 15, the obtaining sub-module includes:
- a first obtaining unit, configured to obtain a first set, a second set, a third set, and a fourth set, wherein the first set is an intersection between a read set of the target transaction and a write set of the $L^{th}$ concurrent transaction, the second set is an intersection between a write set of the target transaction and a read set of the $L^{th}$ concurrent transaction, the third set is an intersection between the write set of the target transaction and the write set of the $L^{th}$ concurrent transaction, and the fourth set is an intersection between the read set of the target transaction and the read set of the $L^{th}$ concurrent transaction;
- a second obtaining unit, configured to obtain, in a case that the third set is not an empty set, the target detection result according to commitment situations of the target transaction and the $L^{th}$ concurrent transaction, the first set, and the third set; and a fourth obtaining unit, configured to obtain, in a case that the third set is the empty set and at least one of the first set, the second set, or the third set is not the empty set, the target detection result according to the first set, the second set, and the fourth set.

In some embodiments, the second obtaining unit is configured to:

determine, in a case that the $L^{th}$ concurrent transaction is not committed and a target parameter of the target transaction is 1, that the target detection result is that the data anomaly exists and a data anomaly type is a dirty write anomaly, the target parameter being used for representing a quantity of committed transactions corresponding to a read-write set of the target transaction; and determine, in a case that the $L^{th}$ concurrent transaction is committed and the intersection between the first set and the third set is not the empty set, that the target detection result is that the data anomaly exists and the data anomaly type is a lost update anomaly.

In some embodiments, based on the apparatus composition in FIG. 15, the third obtaining unit includes:

a first update sub-unit, configured to obtain a dynamic edge intersection value and a variable state value between the $L^{th}$ concurrent transaction and the target transaction according to the first set and the second set, where the dynamic edge intersection value is used for representing a line segment intersection situation between different data items operated by the $L^{th}$ concurrent transaction and the target transaction in a data state matrix, and the variable state value is used for representing a situation of variables with different data states on which the $L^{th}$ concurrent transaction and the target transaction operate; and a first obtaining sub-unit, configured to obtain the target detection result based on the dynamic edge intersection value and the variable state value.

In some embodiments, the first update sub-unit is configured to:

before the obtaining a dynamic edge intersection value and a variable state value between the $L^{th}$ concurrent transaction and the target transaction according to the first set and the second set, update the dynamic edge intersection value to a numerical value obtained by adding 1 to an existing value in a case that the first set is not the empty set; update the variable state value to a numerical value obtained by adding 1 to an existing value in a case that variables with different data states exist in the first set; update the dynamic edge intersection value to the numerical value obtained by adding 1 to the existing value in a case that the second set is not the empty set; and update the variable state value to the numerical value obtained by adding 1 to the existing value in a case that variables with different data states exist in the second set.

In some embodiments, based on the apparatus composition in FIG. 15, the first obtaining sub-unit includes:

a determining sub-sub-unit, configured to determine, in a case that the dynamic edge intersection value is greater than or equal to 2, that the target detection result is that the data anomaly exists; and determine a data anomaly type based on the variable state value; and an obtaining sub-sub-unit, configured to determine, in a case that the dynamic edge intersection value is greater than or equal to 2, that the target detection result is that the data anomaly exists;

In some embodiments, the determining sub-sub-unit is configured to:

determine the data anomaly type as a read anomaly in a case that the variable state value is 1; and determine the data anomaly type as a write anomaly in a case that the variable state value is greater than or equal to 2.

In some embodiments, based on the apparatus composition in FIG. 15, the fourth obtaining unit includes:

a second update sub-unit, configured to obtain a Boolean type of the $L^{th}$ concurrent transaction and a Boolean type of the target transaction according to the first set, the second set, and the fourth set, where the Boolean types are used for representing a vertical position relationship between dynamic edges formed by the corresponding transactions in a data state matrix, and initial values of the Boolean types are false; and a second obtaining sub-unit, configured to determine, in a case that both the Boolean type of the $L^{th}$ concurrent transaction and the Boolean type of the target transaction are true, that the target detection result is that the data anomaly exists; and determine, in a case that at least one of the Boolean type of the target transaction or the Boolean type of the $L^{th}$ concurrent transaction is false, that the target detection result is that the data anomaly does not exist.

In some embodiments, the second update sub-unit is configured to:

before the obtaining a Boolean type of the $L^{th}$ concurrent transaction and a Boolean type of the target transaction according to the first set, the second set, and the fourth set, in a case that the first set is not the empty set, for a variable in the first set, update the Boolean type of the target transaction to true in a case that a version number of the variable in the read set of the target transaction is greater than or equal to a version number of the variable in the write set of the $L^{th}$ concurrent transaction; and update the Boolean type of the $L^{th}$ concurrent transaction to true in a case that the version number of the variable in the read set of the target transaction is less than the version number of the variable in the write set of the $L^{th}$ concurrent transaction;

update, in a case that the second set is not the empty set, for a variable in the second set, the Boolean type of the target transaction to true in a case that a version number of the variable in the write set of the target transaction is greater than a version number of the variable in the read set of the $L^{th}$ concurrent transaction; and update the Boolean type of the $L^{th}$ concurrent transaction to true in a case that the version number of the variable in the write set of the target transaction is less than or equal to the version number of the variable in the read set of the $L^{th}$ concurrent transaction;

in a case that the fourth set is not the empty set, for a variable in the fourth set, update the Boolean type of the target transaction to true in a case that a version number of the variable in the read set of the target transaction is greater than a version number of the variable in the read set of the $L^{th}$ concurrent transaction; and update the Boolean type of the $L^{th}$ concurrent transaction to true in a case that the version number of the variable in the read set of the target transaction is less than the version number of the variable in the read set of the $L^{th}$ concurrent transaction.

In some embodiments, based on the apparatus composition in FIG. 15, the apparatus further includes:

a detection adjustment module, configured to perform integrity constraint detection on the $L^{th}$ concurrent transaction and the target transaction in a case that an isolation level of a database system is serializable; and adjust, in a case that integrity constraint is violated between the $L^{th}$ concurrent transaction and the target transaction, the target detection result to that the data anomaly exists and a data anomaly type is a predicate write skew anomaly.

In some embodiments, based on the apparatus composition in FIG. 15, the apparatus further includes:

a first determining module, configured to determine, in a case that the data anomaly exists between the at least one concurrent transaction and the target transaction, an execution result of the target transaction according to a data anomaly type and an isolation level of a database system, the execution result being used for representing committing the target transaction or rolling back the target transaction.

In some embodiments, the first determining module is configured to:

determine the execution result as rolling back the target transaction in a case that the data anomaly type includes a dirty write anomaly and the isolation level is not read/write uncommitted;

determine the execution result as rolling back the target transaction in a case that the data anomaly type includes a lost update anomaly and the isolation level is higher than or equal to snapshot history;

determine the execution result as rolling back the target transaction in a case that the data anomaly type includes a read anomaly and the isolation level is higher than or equal to the snapshot history;

determine the execution result as rolling back the target transaction in a case that the data anomaly type includes a write anomaly and the isolation level is higher than or equal to repeatable read; and determine the execution result as rolling back the target transaction in a case that the data anomaly type includes a predicate write skew anomaly and the isolation level is serializable.

In some embodiments, based on the apparatus composition in FIG. 15, the apparatus further includes:

a second determining module, configured to determine, for a read operation of the target transaction, a snapshot of the read operation; and a third determining module, configured to determine, according to a read condition of the read operation and the snapshot of the read operation, the target data item visible to the target transaction, and add the target data item to a read set of the target transaction.

In some embodiments, the second determining module is configured to:

obtain, in a case that an isolation level of a database system is lower than repeatable read, a snapshot during performing the read operation; and determine a snapshot of a first read operation of the target transaction as the snapshot of the read operation in a case that the isolation level of the database system is higher than or equal to the repeatable read.

In some embodiments, the third determining module is configured to:

determine, in a case that an isolation level of a database system is higher than or equal to read/write committed, a largest version which meets the read condition and whose commitment timestamp is less than the snapshot of the read operation as the target data item; and determine, in a case that the isolation level of the database system is lower than the read/write committed, a largest uncommitted version as the target data item in a case that uncommitted versions exist in a data item meeting the read condition.

In some embodiments, a snapshot in form of HLC is used in a distributed database system, and the snapshot in form of HLC is sent by the coordinator node device.

All the foregoing example embodiments may be modified or combined in various ways to form additional embodiments of the present disclosure. The description already provided for the foregoing example embodiments may also apply to these additional embodiments.

When the transaction processing apparatus provided in the foregoing embodiment processes a transaction, it is illustrated with an example of division of each functional module. In practical application, the function distribution may be implemented by different functional modules according to requirements, that is, an internal structure of the computer device is divided into different functional modules, to implement all or some of the functions described above. In addition, the transaction processing apparatus provided in the foregoing embodiment belongs to the same idea as the transaction processing method. For the example embodiments, reference may be made to the example transaction processing method embodiments.

Figure 16:
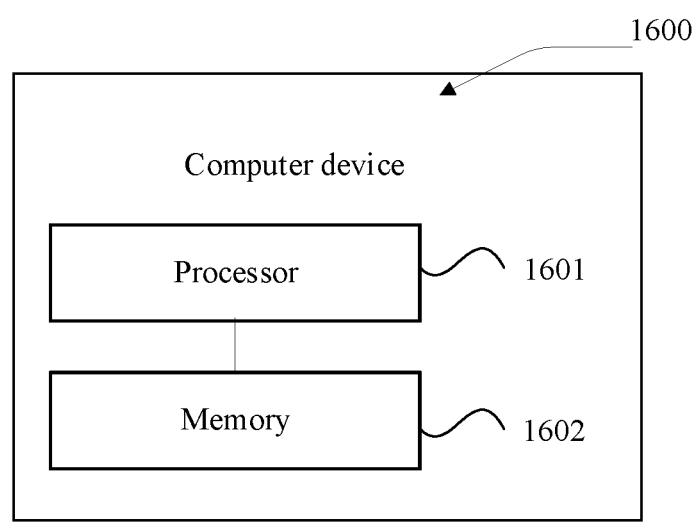
FIG. 16 is a schematic structural diagram of a computer device according to an embodiment of this application.

FIG. 16 is a schematic structural diagram of a computer device according to an embodiment of this application. The computer device 1600 may vary greatly due to different configurations or performance, and may include one or more processors (central processing units (CPUs)) 1601 and one or more memories 1602. The memory 1602 stores at least one program instruction. The at least one program instruction is loaded and executed by the processor 1601 to implement the transaction processing method provided in the foregoing embodiments. Certainly, the computer device 1600 may also have components such as a wired or wireless network interface, a keyboard, and an input/output interface for ease of input/output, and the computer device 1600 may further include other components for implementing functions of the device, which will not be described in detail herein.

In some embodiments, a computer-readable storage medium, for example, a memory including at least one piece of program code is further provided. The at least one piece of program code may be executed by a processor in a terminal to implement the transaction processing method in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

What is claimed is:

1. A transaction processing method comprising:

obtaining, when read and write operations of a target transaction are executed, at least one concurrent transaction of the target transaction, the at least one concurrent transaction and the target transaction performing read and write operations on a same data item during transaction execution;

determining whether a data anomaly exists between the at least one concurrent transaction and the target transaction based on read-write sets of the at least one concurrent transaction and the target transaction by:

obtaining, for an $L^{th}$ concurrent transaction in the at least one concurrent transaction, a target detection result of the $L^{th}$ concurrent transaction and the target transaction based on read-write sets of the $L^{th}$ concurrent transaction and the target transaction by:

obtaining a first set, a second set, and a third set;

incrementing by 1 a dynamic edge intersection value when the first set is not an empty set;

incrementing by 1 a variable state value when variables with different data states exist in the first set;

incrementing by 1 the dynamic edge intersection value when the second set is not an empty set;

incrementing by 1 the variable state value when variables with different data states exist in the second set;

wherein when the third set is not an empty set, the target detection result of the target transaction and the $L^{th}$ concurrent transaction is based on the first set and the third set, and wherein when the third set is an empty set and the first set or the second set is not an empty set, the target detection result of the transaction and the $L^{th}$ concurrent transaction is obtained based on the dynamic edge intersection value and the variable state value between the $L^{th}$ concurrent transaction and the target transaction based on the first set and the second set;

obtaining, when the target detection result indicates that the data anomaly does not exist, the target detection result of an $(L+1)^{th}$ concurrent transaction of the at least one concurrent transaction, until the target detection results of the at least one concurrent transaction all indicate that the data anomaly does not exist, indicating that the data anomaly does not exist between the at least one concurrent transaction and the target transaction; and merging, when the data anomaly does not exist, the read-write sets of the at least one concurrent transaction and the target transaction to commit the target transaction.

2. The method according to claim 1, wherein the first set is an intersection between a read set of the target transaction and a write set of the $L^{th}$ concurrent transaction, the second set is an intersection between a write set of the target transaction and a read set of the Lt concurrent transaction, and the third set is an intersection between the write set of the target transaction and the write set of the $L^{th}$ concurrent transaction.

3. The method according to claim 1, wherein the obtaining the target detection result of the target transaction and the $L^{th}$ concurrent transaction based on the first set and the third set comprises:

determining, when the $L^{th}$ concurrent transaction is not committed and a target parameter of the target transaction is 1, that the target detection result indicates that the data anomaly exists and a data anomaly type is a dirty write anomaly, the target parameter representing a quantity of committed transactions corresponding to a read-write set of the target transaction; and determining, when the $L^{th}$ concurrent transaction is committed and the intersection of the first set and the third set is not an empty set, that the target detection result indicates that the data anomaly exists and the data anomaly type is a lost update anomaly.

4. The method according to claim 1, wherein the dynamic edge intersection value represents a line segment intersection situation of different data items operated by the $L^{th}$ concurrent transaction and the target transaction in a data state matrix, and the variable state value represents a situation of variables with different data states on which the $L^{th}$ concurrent transaction and the target transaction operate.

5. The method according to claim 4, wherein the obtaining the target detection result based on the dynamic edge intersection value and the variable state value comprises:

determining, when the dynamic edge intersection value is greater than or equal to 2, that the target detection result indicates that the data anomaly exists;

determining, when the data anomaly exists, a data anomaly type based on the variable state value; and determining, when the dynamic edge intersection value is less than 2, that the target detection result indicates that the data anomaly does not exist.

6. The method according to claim 5, wherein the determining the data anomaly comprises:

determining that the data anomaly type is a read anomaly when the variable state value is 1; and determining that the data anomaly type is a write anomaly when the variable state value is greater than or equal to 2.

7. The method according to claim 1, further comprising:

determining an integrity constraint of the $L^{th}$ concurrent transaction and the target transaction when an isolation level of a database system is serializable; and adjusting, when the integrity constraint is violated, the target detection result to indicate that the data anomaly exists and a data anomaly type is a predicate write skew anomaly.

8. The method according to claim 1 further comprising:

determining, when the data anomaly exists, an execution result of the target transaction based on a data anomaly type and an isolation level of a database system, the execution result indicating committing the target transaction or rolling back the target transaction.

9. The method according to claim 8, wherein the determining the execution result comprises:

determining the execution result indicates rolling back the target transaction when the data anomaly type includes a dirty write anomaly and the isolation level is not read/write uncommitted;

determining the execution result indicates rolling back the target transaction when the data anomaly type includes a lost update anomaly and the isolation level is greater than or equal to a snapshot history;

determining the execution result indicates rolling back the target transaction when the data anomaly type includes a read anomaly and the isolation level is greater than or equal to the snapshot history;

determining the execution result indicates rolling back the target transaction when the data anomaly type includes a write anomaly and the isolation level is greater than or equal to a repeatable read; and determining the execution result indicates rolling back the target transaction when the data anomaly type includes a predicate write skew anomaly and the isolation level is serializable.

10. The method according to claim 1, further comprising:

determining, for a read operation of the target transaction, a snapshot of the read operation; and determining, based on a read condition of the read operation and the snapshot of the read operation, a target data item visible to the target transaction, and adding the target data item to a read set of the target transaction.

11. The method according to claim 10, wherein the determining the snapshot of the read operation comprises:

obtaining, when an isolation level of a database system is less than a repeatable read, a snapshot while performing the read operation; and determining, when the isolation level of the database system is greater than or equal to the repeatable read, the snapshot of the read operation is a snapshot of a first read operation of the target transaction.

12. The method according to claim 10, wherein the determining the target data item comprises:

defining, when an isolation level of a database system is greater than or equal to a read/write committed, the target data item as a largest version that meets the read condition and has a commitment timestamp less than the snapshot of the read operation; and defining, when the isolation level of the database system is less than the read/write committed, the target data item as a largest uncommitted version when uncommitted versions exist in a data item meeting the read condition.

13. A computer device, comprising a processor and a memory, the memory storing at least one instruction, at least one program, a code set, or an instruction set, and the at least one instruction, the at least one program, the code set, or the instruction set being loaded and executed by the processor to implement the transaction processing method according claim 1.

14. A non-transitory computer-readable storage medium, storing at least one instruction, at least one program, a code set, or an instruction set, the at least one instruction, the at least one program, the code set, or the instruction set being loaded and executed by a processor to implement the transaction processing method comprising:

obtaining, when read and write operations of a target transaction are executed, a concurrent transaction of the target transaction, the concurrent transaction and the target transaction performing read and write operations on a same data item during transaction execution;

determining whether a data anomaly exists between the concurrent transaction and the target transaction based on read-write sets of the concurrent transaction and the target transaction by:

obtaining, for an $L^{th}$ concurrent transaction in the at least one concurrent transaction, a target detection result of the $L^{th}$ concurrent transaction and the target transaction based on read-write sets of the $L^{th}$ concurrent transaction and the target transaction by:

obtaining a first set, a second set, and a third set;

incrementing by 1 a dynamic edge intersection value when the first set is not an empty set;

incrementing by 1 a variable state value when variables with different data states exist in the first set;

incrementing by 1 the dynamic edge intersection value when the second set is not an empty set;

incrementing by 1 the variable state value when variables with different data states exist in the second set;

wherein when the third set is not an empty set, the target detection result of the target transaction and the $L^{th}$ concurrent transaction is based on the first set and the third set, and wherein when the third set is an empty set and the first set or the second set is not an empty set, the target detection result of the transaction and the $L^{th}$ concurrent transaction is obtained based on the dynamic edge intersection value and the variable state value between the $L^{th}$ concurrent transaction and the target transaction based on the first set and the second set;

obtaining, when the target detection result indicates that the data anomaly does not exist, the target detection result of an $(L+1)^{th}$ concurrent transaction of the at least one concurrent transaction, until the target detection results of the at least one concurrent transaction all indicate that the data anomaly does not exist, indicating that the data anomaly does not exist between the at least one concurrent transaction and the target transaction; and merging, when the data anomaly does not exist, the read-write sets of the concurrent transaction and the target transaction to commit the target transaction.

15. A transaction processing method comprising:

obtaining, when read and write operations of a target transaction are executed, at least one concurrent transaction of the target transaction, the at least one concurrent transaction and the target transaction performing read and write operations on a same data item during transaction execution;

determining whether a data anomaly exists between the at least one concurrent transaction and the target transaction based on read-write sets of the at least one concurrent transaction and the target transaction by:

obtaining, for an $L^{th}$ concurrent transaction in the at least one concurrent transaction, a target detection result of the $L^{th}$ concurrent transaction and the target transaction based on read-write sets of the $L^{th}$ concurrent transaction and the target transaction by:

obtaining a first set, a second set, a third set, and a fourth set;

wherein when the third set is not an empty set, the target detection result of the target transaction and the $L^{th}$ concurrent transaction is based on the first set and the third set, and wherein when the third set is an empty set and the first set, the second set, or the third set is not an empty set, the target detection result of the transaction and the $L^{th}$ concurrent transaction is obtained based on the first set, the second set, and the fourth set by:

obtaining a Boolean type of the $L^{th}$ concurrent transaction and a Boolean type of the target transaction based on the first set, the second set, and the fourth set, wherein the Boolean types represent a vertical position relationship of dynamic edges of corresponding transactions in a data state matrix, and wherein initial values of the Boolean types are false;

determining, when the Boolean type of the $L^{th}$ concurrent transaction and the Boolean type of the target transaction are both true, that the target detection result indicates that the data anomaly exists; and determining, when the Boolean type of the target transaction or the Boolean type of the $L^{th}$ concurrent transaction is false, that the target detection result indicates that the data anomaly does not exist;

obtaining, when the target detection result indicates that the data anomaly does not exist, the target detection result of an $(L+1)^{th}$ concurrent transaction of the at least one concurrent transaction, until the target detection results of the at least one concurrent transaction all indicate that the data anomaly does not exist, indicating that the data anomaly does not exist between the at least one concurrent transaction and the target transaction; and merging, when the data anomaly does not exist, the read-write sets of the at least one concurrent transaction and the target transaction to commit the target transaction.

16. The method according to claim 15, wherein the first set is an intersection of a read set of the target transaction and a write set of the $L^{th}$ concurrent transaction, the second set is an intersection of a write set of the target transaction and a read set of the $L^{th}$ concurrent transaction, the third set is an intersection of the write set of the target transaction and the write set of the $L^{th}$ concurrent transaction, and the fourth set is an intersection of the read set of the target transaction and the read set of the $L^{th}$ concurrent transaction.

17. The method according to claim 15, wherein before the obtaining the Boolean type of the $L^{th}$ concurrent transaction and the Boolean type of the target transaction, the method further comprises:
   updating, for a variable in the first set and when the first set is not an empty set, the Boolean type of the target transaction to true when a version number of the variable in the read set of the target transaction is greater than or equal to a version number of the variable in the write set of the $L^{th}$ concurrent transaction; and updating the Boolean type of the $L^{th}$ concurrent transaction to true when the version number of the variable in the read set of the target transaction is less than the version number of the variable in the write set of the $L^{th}$ concurrent transaction;
   updating, for a variable in the second set and when the second set is not an empty set, the Boolean type of the target transaction to true when a version number of the variable in the write set of the target transaction is greater than a version number of the variable in the read set of the $L^{th}$ concurrent transaction; and updating the Boolean type of the $L^{th}$ concurrent transaction to true when the version number of the variable in the write set of the target transaction is less than or equal to the version number of the variable in the read set of the $L^{th}$ concurrent transaction; and
   updating, for a variable in the fourth set and when the fourth set is not an empty set, the Boolean type of the target transaction to true when a version number of the variable in the read set of the target transaction is greater than a version number of the variable in the read set of the $L^{th}$ concurrent transaction; and updating the Boolean type of the $L^{th}$ concurrent transaction to true when the version number of the variable in the read set of the target transaction is less than the version number of the variable in the read set of the $L^{th}$ concurrent transaction.

18. The method according to claim 15, further comprising:
   determining an integrity constraint of the $L^{th}$ concurrent transaction and the target transaction when an isolation level of a database system is serializable; and
   adjusting, when the integrity constraint is violated, the target detection result to indicate that the data anomaly exists and a data anomaly type is a predicate write skew anomaly.

19. The method according to claim 15, further comprising:
   determining, when the data anomaly exists, an execution result of the target transaction based on a data anomaly type and an isolation level of a database system, the execution result indicating committing the target transaction or rolling back the target transaction.

20. The method according to claim 15, further comprising:
   determining, for a read operation of the target transaction, a snapshot of the read operation; and
   determining, based on a read condition of the read operation and the snapshot of the read operation, a target data item visible to the target transaction, and adding the target data item to a read set of the target transaction.

* * * * *